(12) United States Patent
Satori et al.

(10) Patent No.: US 9,741,091 B2
(45) Date of Patent: Aug. 22, 2017

(54) ALL-AROUND MOVING IMAGE DISTRIBUTION SYSTEM, ALL-AROUND MOVING IMAGE DISTRIBUTION METHOD, IMAGE PROCESSING APPARATUS, COMMUNICATION TERMINAL APPARATUS, AND CONTROL METHODS AND CONTROL PROGRAMS OF IMAGE PROCESSING APPARATUS AND COMMUNICATION TERMINAL APPARATUS

(71) Applicant: UNIMOTO INCORPORATED, Tokyo (JP)

(72) Inventors: Shunichiro Satori, Tokyo (JP); Fumiaki Kobayashi, Tokyo (JP)

(73) Assignee: UNIMOTO INCORPORATED, Tokyo (JP)

( * ) Notice: Subject to any disclaimer, the term of this patent is extended or adjusted under 35 U.S.C. 154(b) by 0 days.

(21) Appl. No.: 15/311,458

(22) PCT Filed: May 14, 2015

(86) PCT No.: PCT/JP2015/063934
§ 371 (c)(1),
(2) Date: Nov. 15, 2016

(87) PCT Pub. No.: WO2015/174501
PCT Pub. Date: Nov. 19, 2015

(65) Prior Publication Data
US 2017/0169540 A1     Jun. 15, 2017

(30) Foreign Application Priority Data

May 16, 2014  (JP) .................................. 2014-102673
Oct. 6, 2014   (JP) .................................. 2014-205993

(51) Int. Cl.
*G06T 3/00*     (2006.01)
*H04N 7/18*     (2006.01)
(Continued)

(52) U.S. Cl.
CPC ................ *G06T 3/00* (2013.01); *G03B 37/00* (2013.01); *H04N 7/181* (2013.01);
(Continued)

(58) Field of Classification Search
None
See application file for complete search history.

(56) References Cited

U.S. PATENT DOCUMENTS 9,264,765 B2    2/2016  Sasaki et al.

FOREIGN PATENT DOCUMENTS

EP   0 260 995 A2   3/1988
EP   2 602 994 A1   6/2013
(Continued)

OTHER PUBLICATIONS

International Search Report (ISR) and Written Opinion (WO) dated Aug. 11, 2015 for International Application No. PCT/JP2015/063934.

(Continued)

*Primary Examiner* — Michelle Chin
(74) *Attorney, Agent, or Firm* — Ladas & Parry LLP

(57) ABSTRACT

A system of this invention is an all-around moving image distribution system for viewing an all-around moving image with realism. This all-around moving image distribution system includes an all-around camera, an all-around image generator that acquires an all-around moving image captured by the all-around camera, and generates time-series all-around frame image data, an all-around moving image data generator that encodes the time-series all-around frame image data, and generates all-around moving image data in (Continued)

a format reproducible in real time in a communication terminal apparatus, a distribution server that distributes, to the communication terminal apparatus, the all-around moving image data uploaded from the all-around moving image data generator, and an all-around moving image reproducer that reproduces, in real time, the all-around moving image data distributed from the distribution server, and displays a moving image of a range corresponding to a line-of-sight instruction by a user.

11 Claims, 43 Drawing Sheets

(51) Int. Cl.
- *H04N 21/2187* (2011.01)
- *H04N 21/278* (2011.01)
- *H04N 21/431* (2011.01)
- *H04N 21/4728* (2011.01)
- *G03B 37/00* (2006.01)

(52) U.S. Cl.
CPC ....... *H04N 21/2187* (2013.01); *H04N 21/278* (2013.01); *H04N 21/431* (2013.01); *H04N 21/4728* (2013.01)

(56) References Cited

FOREIGN PATENT DOCUMENTS

| | | |
|---|---|---|
| EP | 2 602 995 A1 | 6/2013 |
| EP | 2 624 548 A1 | 8/2013 |
| EP | 2 624 549 A1 | 8/2013 |
| JP | 9-55925 A | 2/1997 |
| JP | 2000-132673 A | 5/2000 |
| JP | 2002-94952 A | 3/2002 |
| JP | 2003-125389 A | 4/2003 |
| JP | 2003-153250 A | 5/2003 |
| JP | 2003-219389 A | 7/2003 |
| JP | 2004-12717 A | 1/2004 |
| JP | 2004-48546 A | 2/2004 |
| JP | 2004-191339 A | 7/2004 |
| JP | 2005-192057 A | 7/2005 |
| JP | 2005-217536 A | 8/2005 |
| JP | 2005-303796 A | 10/2005 |
| JP | 2010-218371 A | 9/2010 |
| JP | 2012-189551 A | 10/2012 |
| WO | 2012/011466 A1 | 1/2012 |
| WO | 2012/043357 A1 | 4/2012 |
| WO | 2014/024475 A1 | 2/2014 |

OTHER PUBLICATIONS

J-PlatPat English abstract of JP 2012-189551 A.
J-PlatPat English abstract of JP 2004-12717 A.
Espacenet English abstract of JP 2005-217536 A.
Espacenet English abstract of JP 2005-192057 A.
Espacenet English abstract of JP 2003-219389 A.
Espacenet English abstract of JP 9-55925 A.
Espacenet English abstract of JP 2004-191339 A.
Espacenet English abstract of JP 2010-218371 A.
Espacenet English abstract of JP 2003-153250 A.
J-PlatPat English abstract of JP 2004-48546 A.
J-PlatPat English abstract of JP 2003-125389 A.
J-PlatPat English abstract of JP 2000-132673 A.
J-PlatPat English abstract of JP 2005-303796 A.
J-PlatPat English abstract of JP 2002-94952 A.
Office Action mailed Jan. 8, 2015 in connection with Japanese Patent Application No. 2014-201673, with English translation.

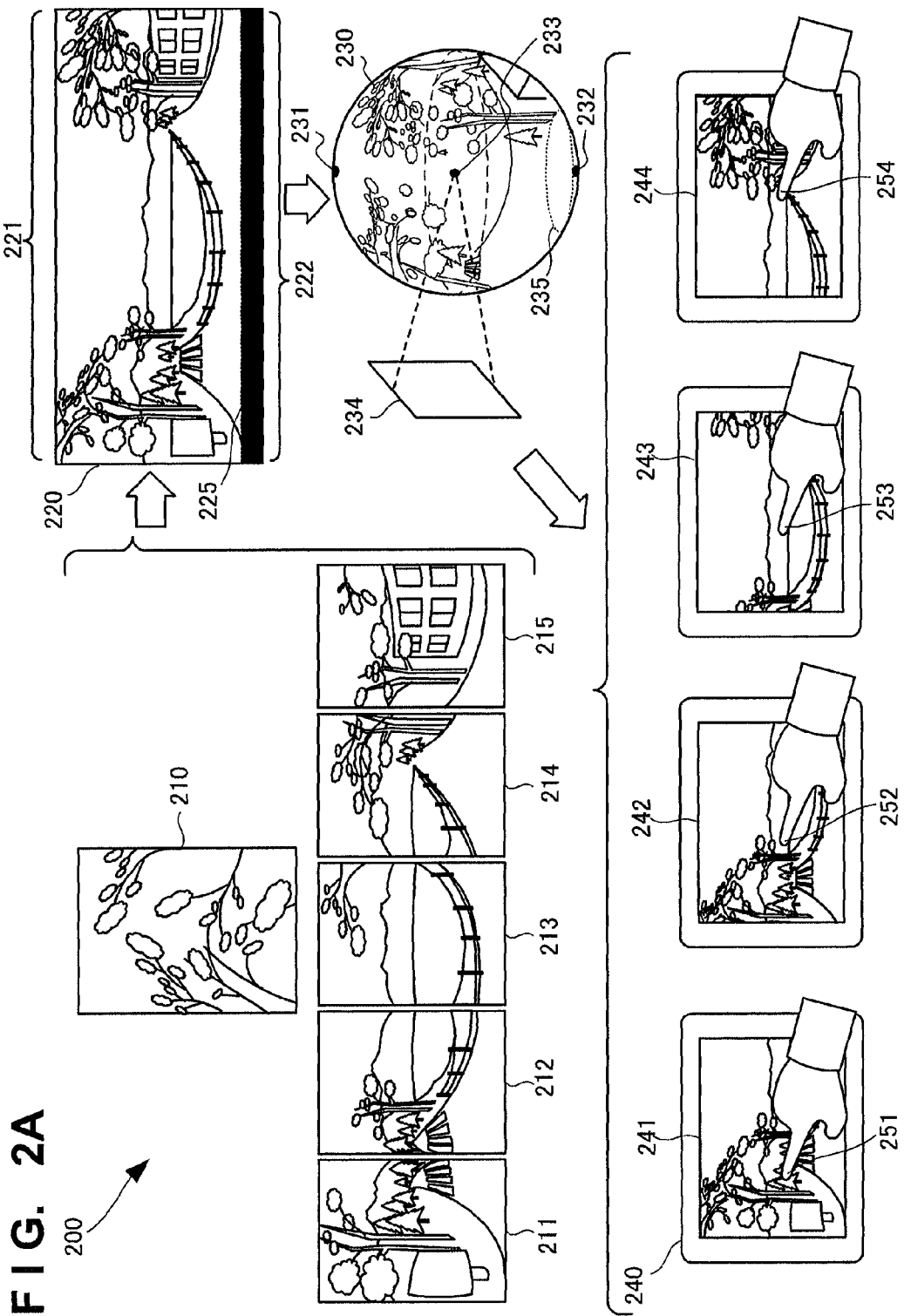

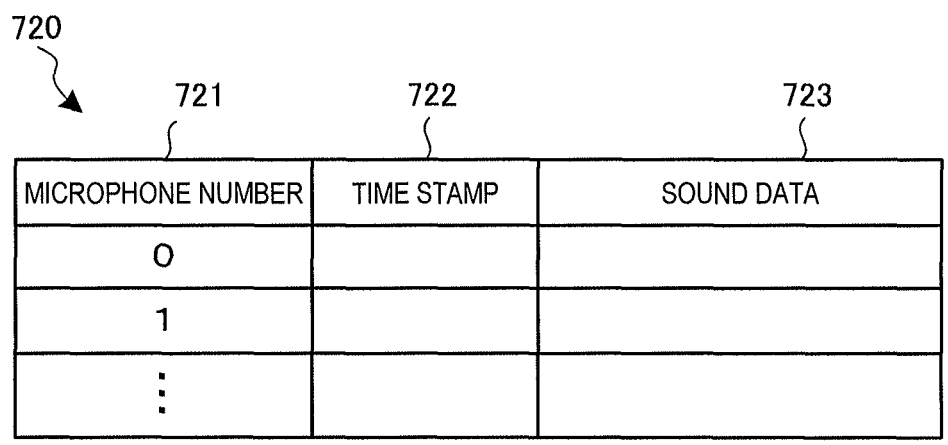
F I G. 7B

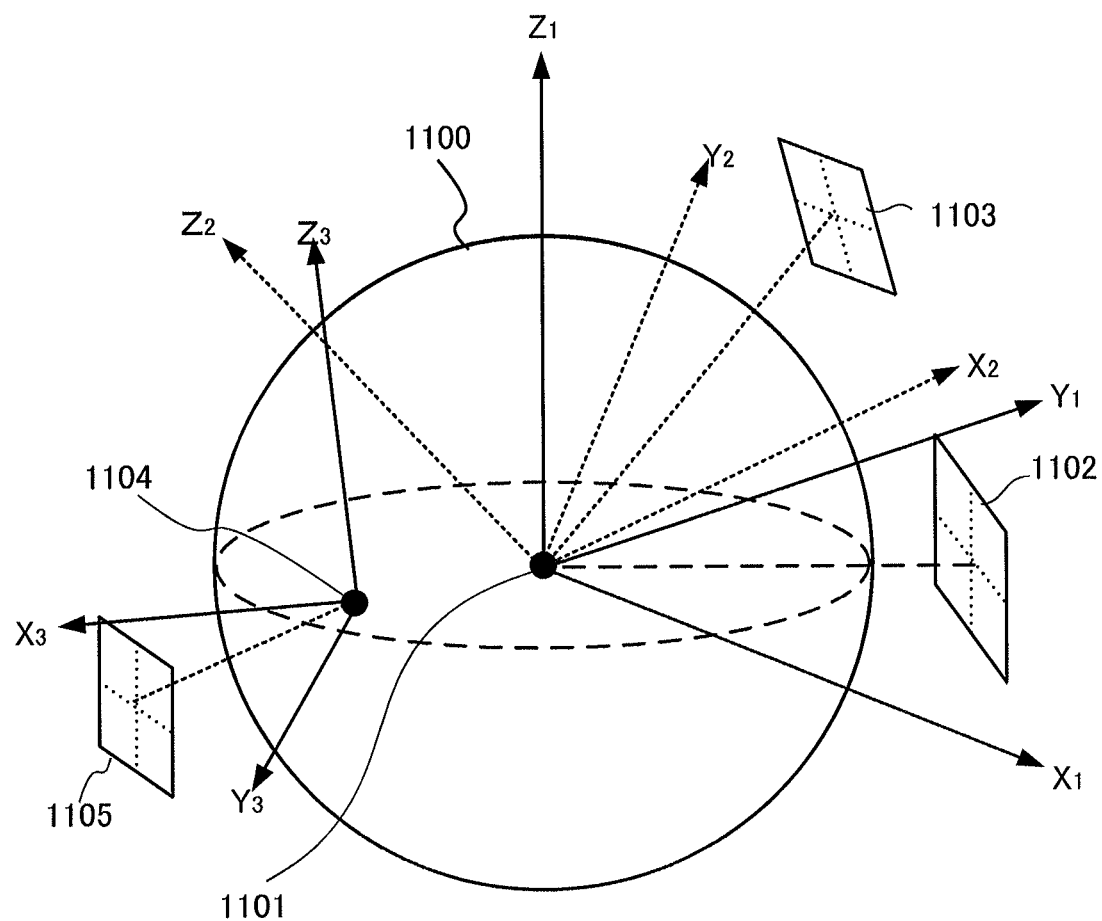
F I G. 11A

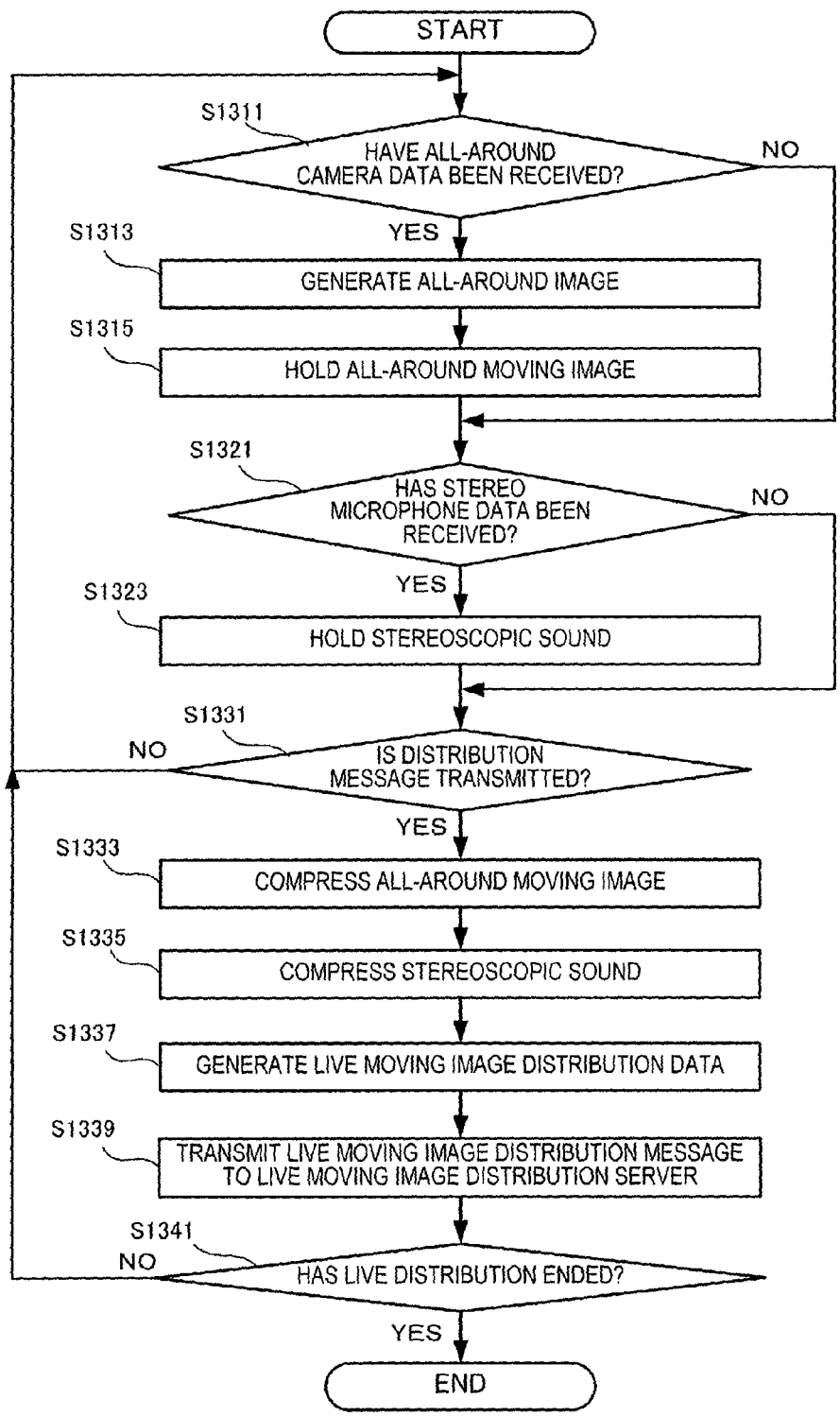
F I G. 13

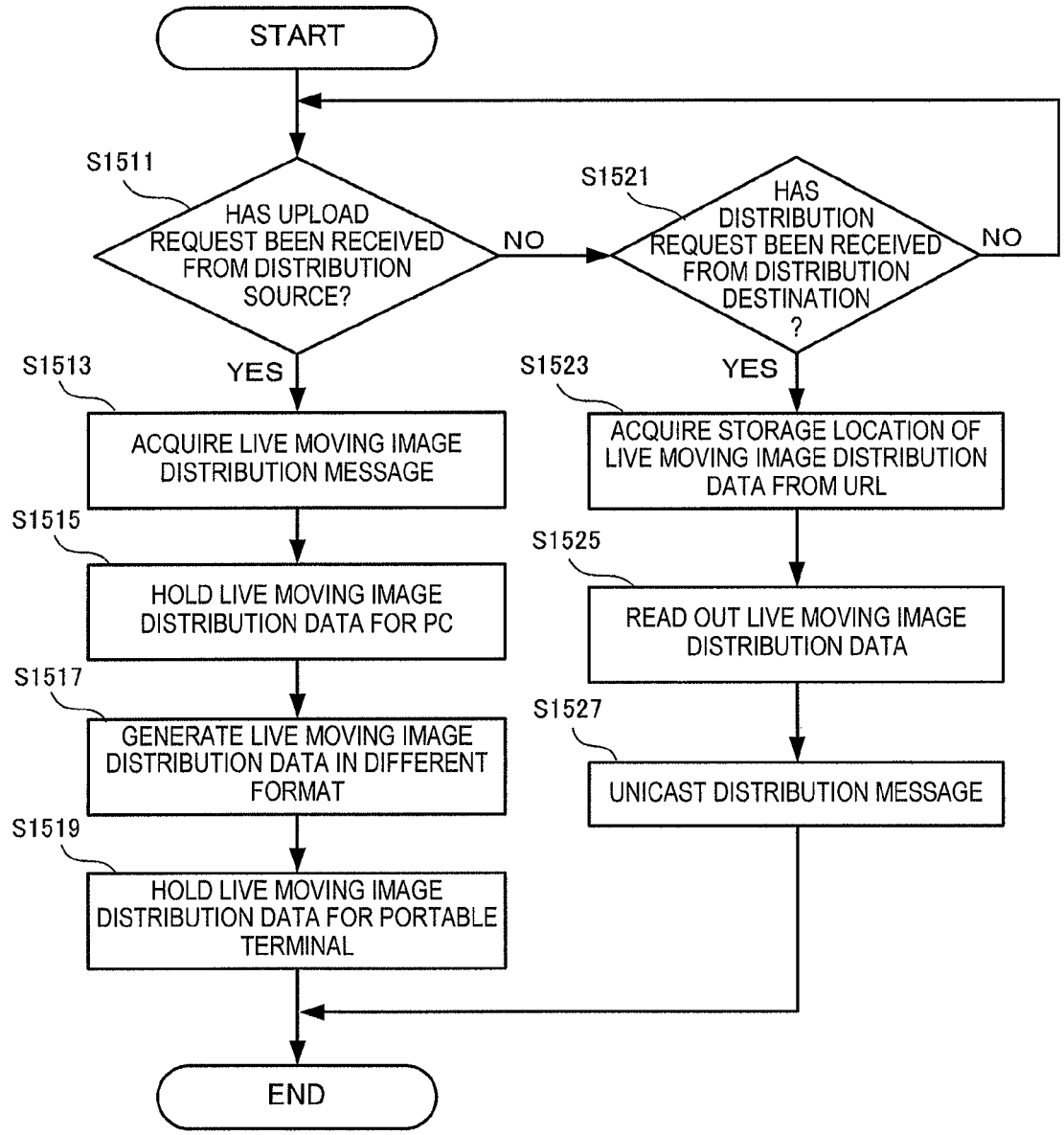
F I G. 15

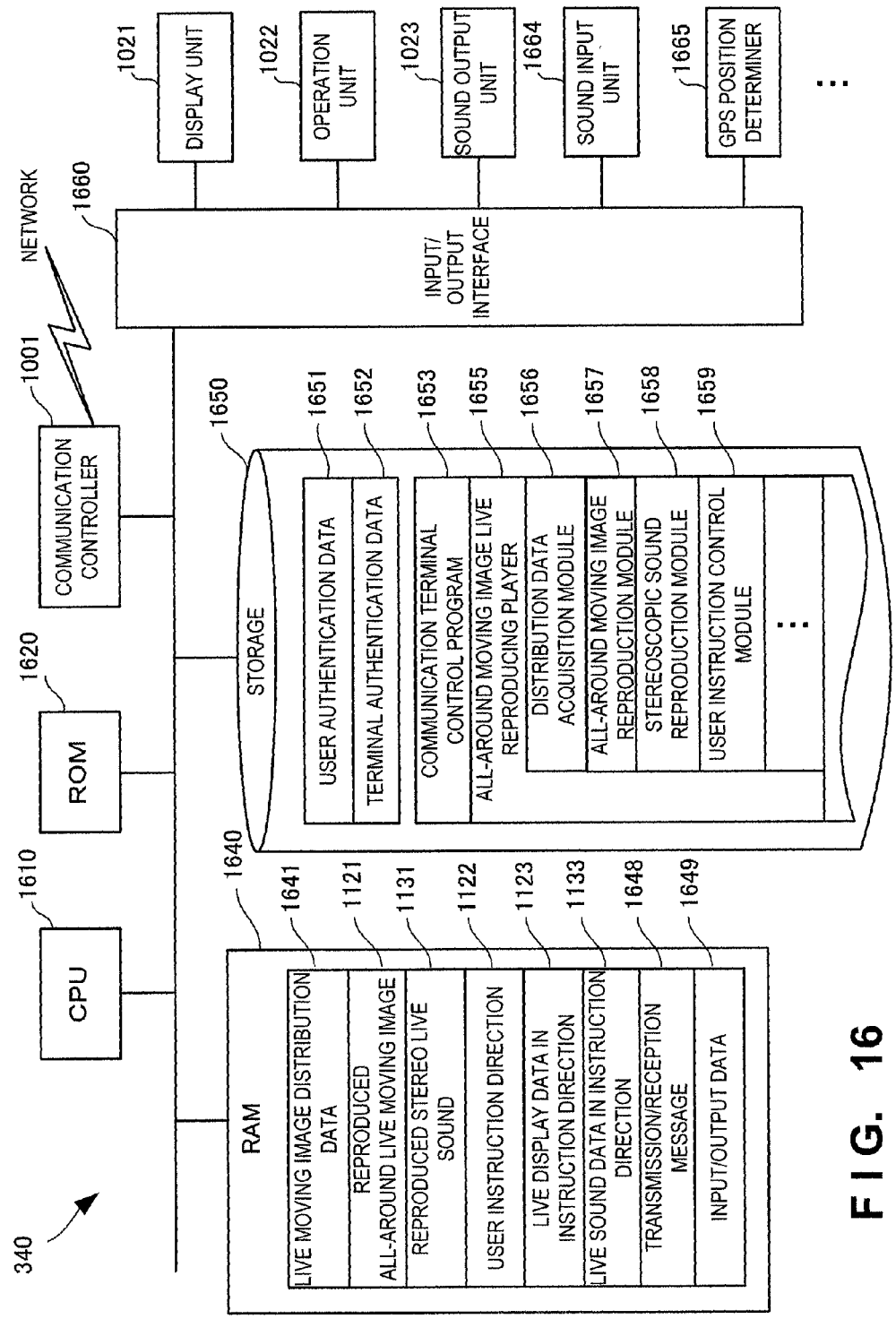
F I G. 16

| ALL-AROUND VIDEO ACQUISITION SOURCE | ACQUISITION SOURCE SELECTION FLAG | ALL-AROUND LIVE MOVING IMAGE | USER INSTRUCTION DIRECTION | ALL-AROUND LIVE DISPLAY DATA | COURSE MAP DISPLAY DATA |
|---|---|---|---|---|---|
| A(311) | 0 | | | | |
| B(312) | 1 | | | | |
| C(313) | 0 | | | | |
| ... | | | | | |

FIG. 22

| 2501 | 2502 | 2503 | 2504 | 2505 | 2506 | 2507 | 2508 |
|---|---|---|---|---|---|---|---|
| ALL-AROUND LIVE MOVING IMAGE | USER INSTRUCTION DIRECTION | ALL-AROUND LIVE DISPLAY DATA | SEARCH TARGET FEATURE | ADDITIONAL DATA | ADDITION POSITION | MATCHING FLAG | ALL-AROUND LIVE ADDITIONAL DISPLAY DATA |
| | | | | | | | |
| | | | ... | | | | |
| | | | | | | | |

FIG. 25

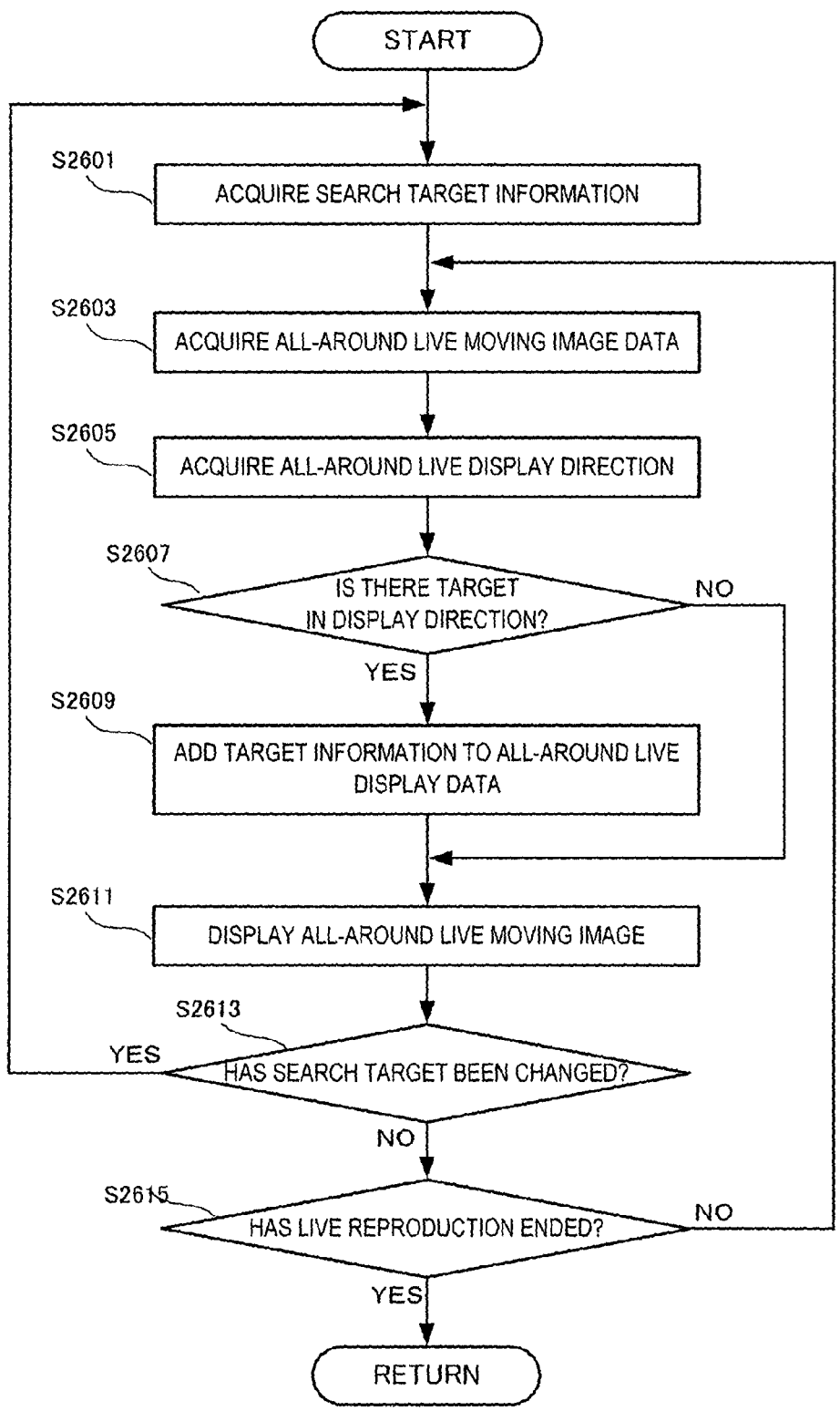
F I G. 26

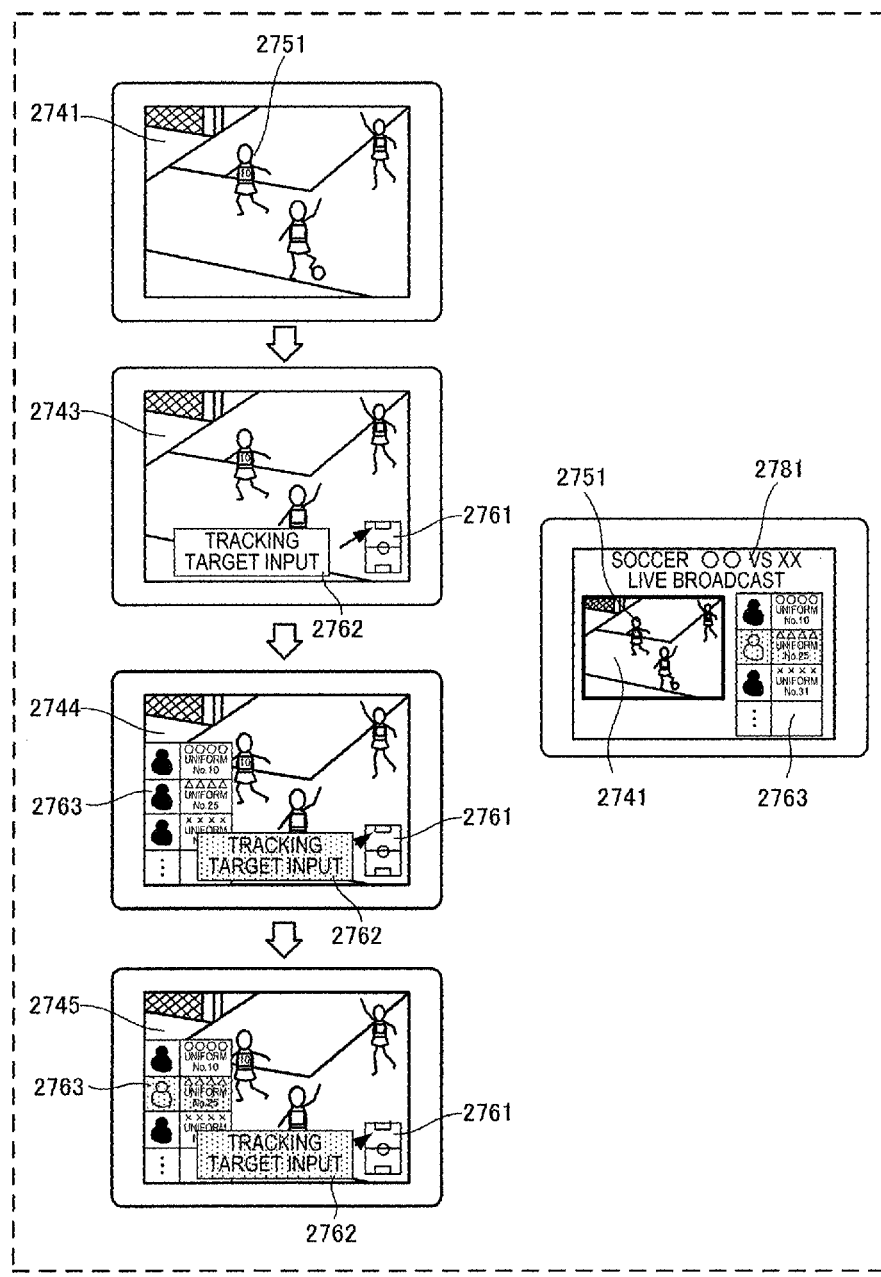
F I G. 27B

2800

| TRACKING TARGET FEATURE | MATCHING LIVE MOVING IMAGE | MATCHING DIRECTION | ALL-AROUND LIVE DISPLAY DATA | ZOOM-IN/OUT |
|---|---|---|---|---|
| | | | | |

2801  2802  2803  2804  2805

F I G. 28

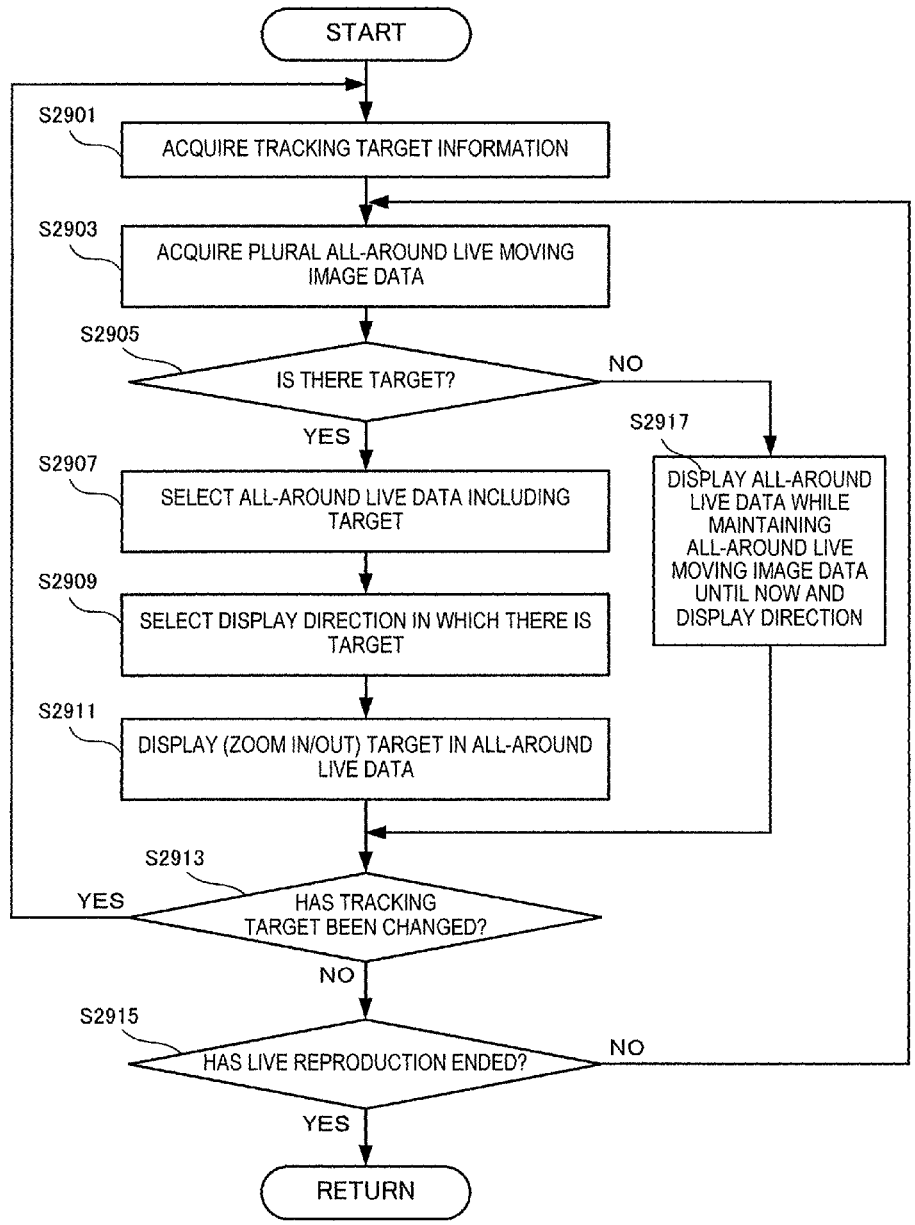
F I G. 29

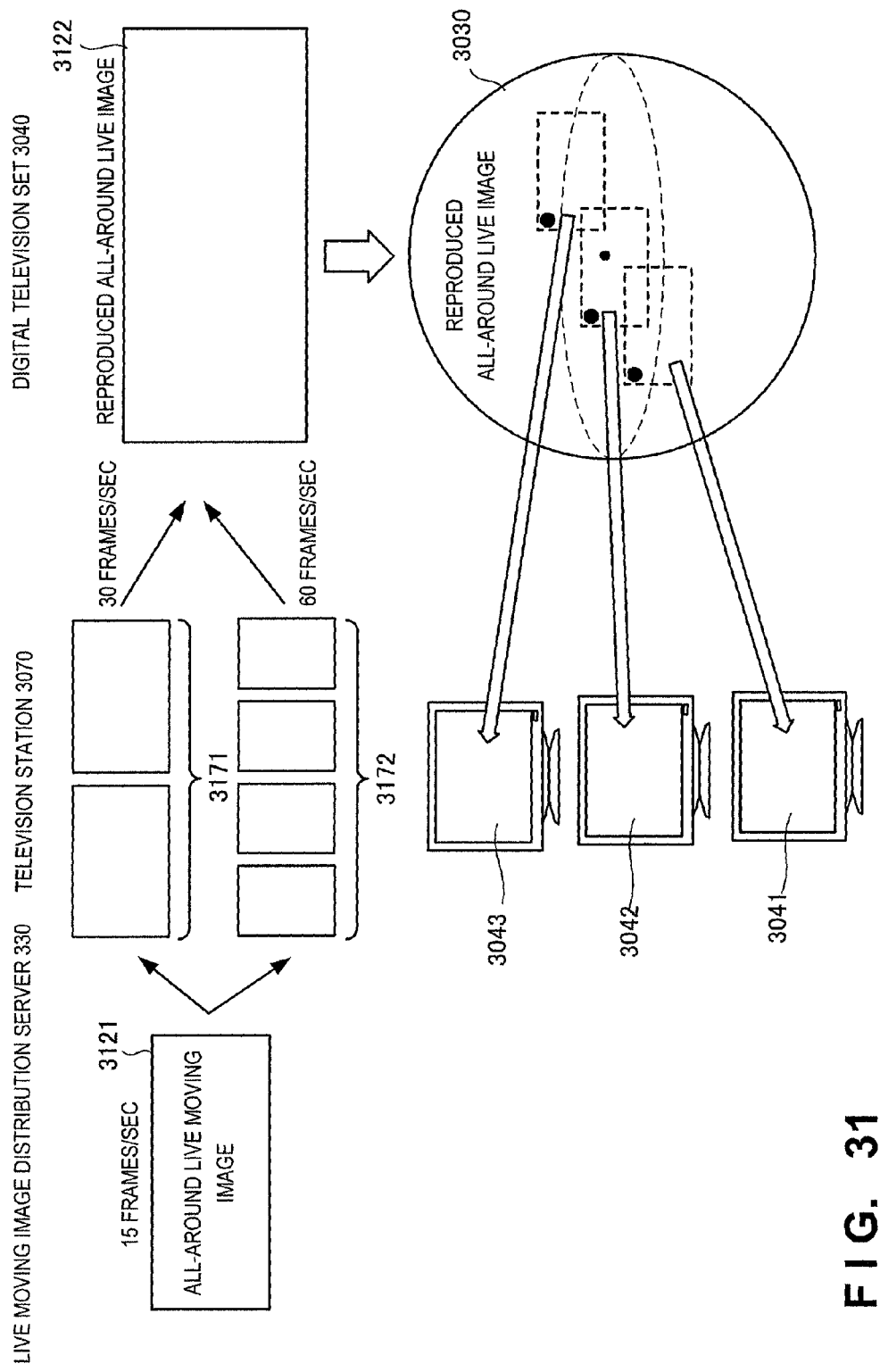
F I G. 31

ALL-AROUND MOVING IMAGE DISTRIBUTION SYSTEM, ALL-AROUND MOVING IMAGE DISTRIBUTION METHOD, IMAGE PROCESSING APPARATUS, COMMUNICATION TERMINAL APPARATUS, AND CONTROL METHODS AND CONTROL PROGRAMS OF IMAGE PROCESSING APPARATUS AND COMMUNICATION TERMINAL APPARATUS

RELATED APPLICATION

This application is an application under 35 U.S.C. 371 of International Application No. PCT/JP2015/063934 filed on May 14, 2015, the entire contents of which are incorporated herein by reference.

TECHNICAL FIELD

The present invention relates to a technique of enabling distribution of an all-around moving image acquired by an all-around camera.

BACKGROUND ART

In the above technical field, patent literature 1 discloses a technique for generating an all-around moving image based on a moving image captured by an all-around camera formed from a plurality of cameras. Furthermore, patent literature 2 discloses a technique for reproducing an all-around moving image from an all-around camera formed from one image sensor.

CITATION LIST

Patent Literature

Patent literature 1: Japanese Patent Laid-Open No. 2012-189551
Patent literature 2: Japanese Patent Laid-Open No. 2004-012717

SUMMARY OF THE INVENTION

Technical Problem

In the techniques described in the above literatures, however, it is impossible to view an all-around moving image with realism.

The present invention enables to provide a technique of solving the above-described problem.

Solution to Problem

One aspect of the present invention provides an all-around moving image distribution system comprising:
an all-around camera;
an all-around image generator that acquires an all-around moving image captured by said all-around camera and generates time-series all-around frame image data;
microphones that acquire a stereoscopic sound in synchronism with image capturing of said all-around camera;
a stereoscopic sound data generator that generates time-series stereoscopic sound data from the stereoscopic sound, and uploads the time-series stereoscopic sound data;
an all-around moving image data generator that encodes the time-series all-around frame image data, generates all-around moving image data, and uploads the all-around moving image data;
a distribution server that distributes the all-around moving image data uploaded from said all-around moving image data generator and the stereoscopic sound data uploaded from said stereoscopic sound data generator; and
an all-around moving image reproducer that reproduces the all-around moving image data distributed from said distribution server, displays a moving image of a range selected from a reproduced all-around moving image in accordance with an instruction of changing a line-of-sight by a user, and reproduces and outputs a stereoscopic sound corresponding to a display direction of the moving image from the stereoscopic sound data distributed from said distribution server,
wherein said all-around moving image reproducer performs one of a zoom-in operation and a zoom-out operation of the moving image, and reproduces and outputs a stereoscopic sound corresponding to one of the zoom-in operation and the zoom-out operation of the moving image from the stereoscopic sound data.

Another aspect of the present invention provides an all-around moving image distribution system comprising:
at least two all-around cameras;
an all-around image generator that acquires an all-around moving image captured by said all-around camera and generates time-series all-around frame image data;
an all-around moving image data generator that encodes the time-series all-around frame image data, and generates all-around moving image data;
a first selector that selects a piece of all-around moving image data from at least two pieces of all-around moving image data generated based on the all-around moving image obtained from the at least two all-around camera, wherein the piece of all-around moving image data includes feature matching with feature of a tracking object set by a user and is selected by the user from a display of a direction of a line-of-sight capturing the tracking object;
a second selector that selects a moving image of a range including feature matching with feature of the tracking object from all-around moving image reproduced from the all-around moving image data; and
a moving image reproducer that reproduces and displays the moving image including the tracking object.

Another aspect of the present invention provides an all-around moving image distribution method comprising:
acquiring an all-around moving image captured by an all-around camera, and generating time-series all-around frame image data, by an all-around image generator;
encoding the time-series all-around frame image data, and generating all-around moving image data in a format reproducible in real time in a communication terminal apparatus, by an all-around moving image data generator;
distributing the uploaded all-around moving image data to the communication terminal apparatus, by a distribution server; and
reproducing, in real time, the all-around moving image data distributed from the distribution server, and displaying a moving image moving image of a range corresponding to a line-of-sight instruction by a user, by the communication terminal apparatus.

Still other aspect of the present invention provides an image processing apparatus comprising:

an all-around image generator that acquires an all-around moving image captured by an all-around camera, and generates time-series all-around frame image data;

an all-around moving image data generator that encodes the time-series all-around frame image data, and generates all-around moving image data in a format reproducible in real time in a communication terminal apparatus; and an uploader that uploads the all-around moving image data to a distribution server.

Still other aspect of the present invention provides a control method of an image processing apparatus, comprising:

acquiring an all-around moving image captured by an all-around camera, and generating time-series all-around frame image data, by an all-around image generator;

encoding the time-series all-around frame image data, and generating all-around moving image data in a format reproducible in real time in a communication terminal apparatus, by an all-around moving image data generator; and uploading the all-around moving image data to a distribution server, by an uploader.

Still other aspect of the present invention provides a control program of an image processing apparatus, for causing a computer to execute a method, comprising:

acquiring an all-around moving image captured by an all-around camera, and generating time-series all-around frame image data;

encoding the time-series all-around frame image data, and generating all-around moving image data in a format reproducible in real time in a communication terminal apparatus; and uploading the all-around moving image data to a distribution server.

Still other aspect of the present invention provides a communication terminal apparatus comprising:

an all-around moving image data receiver that receives, from a distribution server that distributes an all-around moving image, all-around moving image data in a format reproducible in real time in said communication terminal apparatus;

an all-around moving image developer that decodes the received all-around moving image data, and develops, in real time, for each all-around frame image, the received all-around moving image data onto a three-dimensional mapping surface including a viewpoint inside; and an all-around moving image reproducer that displays a display range in the developed all-around frame images in accordance with an instruction of a user.

Still other aspect of the present invention provides a control method of a communication terminal apparatus, comprising:

receiving, from a distribution server distributing an all-around moving image, all-around moving image data in a format reproducible in real time in the communication terminal apparatus, by an all-around moving image data receiver;

decoding the received all-around moving image data, and developing, in real time, for each all-around frame image, the received all-around moving image data onto a three-dimensional mapping surface including a viewpoint inside, by an all-around moving image developer; and displaying a display range in the developed all-around frame images in accordance with an instruction of a user, by an all-around moving image reproducer.

Still other aspect of the present invention provides a control program of a communication terminal apparatus, for causing a computer to execute a method, comprising:

receiving, from a distribution server distributing an all-around moving image, all-around moving image data in a format reproducible in real time in the communication terminal apparatus;

decoding the received all-around moving image data, and developing, in real time, for each all-around frame image, the received all-around moving image data onto a three-dimensional mapping surface including a viewpoint; and displaying a display range in the developed all-around frame images in accordance with an instruction of a user.

ADVANTAGEOUS EFFECTS OF INVENTION

According to the present invention, it is possible to view an all-around moving image with realism.

BRIEF DESCRIPTION OF DRAWINGS

FIG. 2A is a view showing an outline of the processing of an all-around moving image live distribution system according to the second embodiment of the present invention;

FIG. 7B is a table showing the sound data structure of the image capturing/distribution PC according to the second embodiment of the present invention;

FIG. 11A is a view for explaining mapping of an all-around live moving image in the communication terminal according to the second embodiment of the present invention;

FIG. 13 is a flowchart illustrating the processing procedure of the image capturing/distribution PC according to the second embodiment of the present invention;

FIG. 15 is a flowchart illustrating the processing procedure of the live moving image distribution server according to the second embodiment of the present invention;

FIG. 16 is a block diagram showing the hardware arrangement of the communication terminal according to the second embodiment of the present invention;

FIG. 22 is a table showing the structure of the processing data of a communication terminal according to the fourth embodiment of the present invention;

FIG. 25 is a table showing the structure of the processing data of a communication terminal according to the fifth embodiment of the present invention;

FIG. 26 is a flowchart illustrating the processing procedure of an all-around moving image live reproducing player according to the fifth embodiment of the present invention;

FIG. 27B is a view showing an outline of the operation of the all-around moving image live distribution system according to the sixth embodiment of the present invention;

FIG. 28 is a table showing the structure of the processing data of a communication terminal according to the sixth embodiment of the present invention;

FIG. 29 is a flowchart illustrating the processing procedure of an all-around moving image live reproducing player according to the sixth embodiment of the present invention;

FIG. 31 is a view showing conversion of processing data in a television station according to the seventh embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In this specification, "data" indicates raw information which is unprocessed for communication between apparatuses. For example, "video data" indicates information of a video obtained by capturing an image by a camera, performing digital quantization for the image, and executing pixel processing, image processing, or vectorization for the quantized image. Furthermore, "sound data" indicates information of a sound obtained by collecting a sound by a microphone, performing digital quantization for the sound, and executing voice processing or vectorization for the quantized sound. "Moving image data" indicates information of a moving image including "video data" and "sound data" which are synchronized with each other in time series. A "message" indicates information which has been converted into a predetermined format (data which is communicated with a header including a communication source/communication destination, and compression coding or encryption is included, as needed) allowed by a desired protocol for defining communication between apparatuses in order to communicate these "data" between the apparatuses. Note that a "message" in this specification indicates information obtained by converting, into the format, fragmentary real-time data for providing live distribution, unlike a so-called "file" representing a set of video contents, images, or moving image contents. In addition, "all-around" used in an "all-around camera", "all-around moving image", "all-around frame", and the like indicates an entire region surrounding a viewpoint (image capturing position).

[First Embodiment]

An information processing apparatus 100 according to the first embodiment of the present invention will be described with reference to FIG. The information processing apparatus 100 is an apparatus for performing live reproduction of an all-around moving image.

Figure 1:
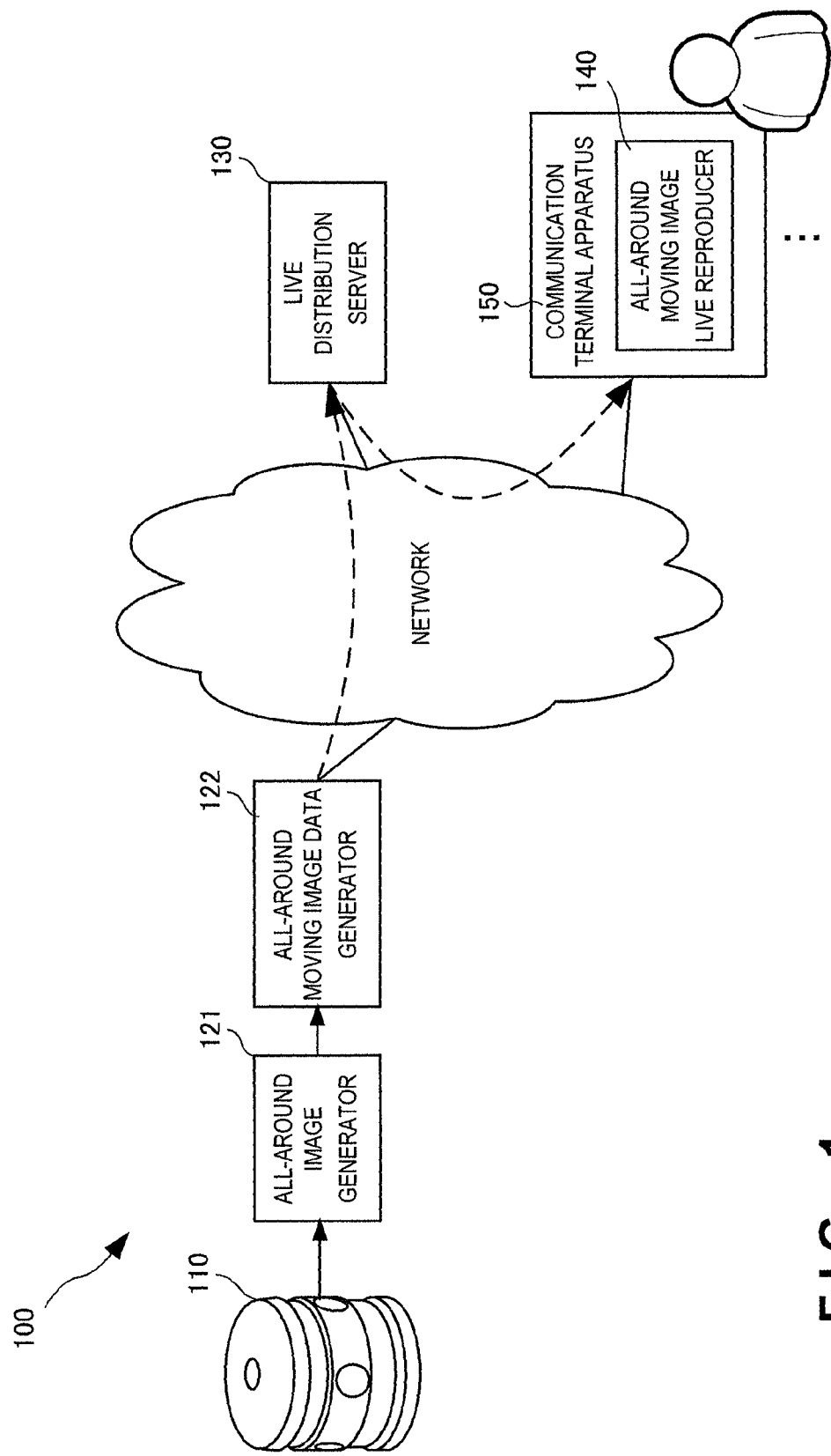
FIG. 1 is a block diagram showing the configuration of an all-around moving image live distribution system according to the first embodiment of the present invention.

As shown in FIG. 1, the information processing apparatus 100 includes an all-around camera 110, an all-around image generator 121, an all-around moving image data generator 122, a live distribution server 130, and a moving image live reproducer 140. The all-around camera 110 captures an all-around moving image. The all-around image generator 121 acquires an all-around moving image captured by the all-around camera 110 to generate time-series all-around frame image data. The all-around moving image data generator 122 encodes the time-series all-around frame image data to generate all-around moving image data in a format reproducible in real time in a communication terminal apparatus 150. The live distribution server 130 distributes, to the communication terminal apparatus 150, the all-around moving image data uploaded from the all-around moving image data generator 122. The moving image live reproducer 140 reproduces, in real time, the all-around moving image data distributed from the live distribution server 130, and displays a moving image of a range corresponding to a line-of-sight instruction by the user.

According to this embodiment, by forming an all-around moving image from an all-around camera to be distributed live, the user can view an all-around moving image live.

[Second Embodiment]

An all-around moving image live distribution system according to the second embodiment of the present invention will be described next. The all-around moving image live distribution system according to this embodiment generates all-around image data for each frame from a moving image captured by an all-around camera, generates data in a format which can undergo moving image live reproduction in a communication terminal, and uploads the generated data to a moving image live distribution server. The moving image live distribution server distributes a message in real time in accordance with a protocol receivable by the communication terminal. The communication terminal performs live reproduction of an all-around moving image from the distributed message, and performs live display of the all-around moving image in a desired direction in accordance with a user instruction. Furthermore, the communication terminal performs live reproduction of a sound in a direction corresponding to the display direction of the all-around moving image by a stereoscopic sound. Note that a stereoscopic sound corresponding to the live display of the all-around moving image is not limited to a live sound collected by a stereo microphone, and may be another stereoscopic sound associated with the all-around moving image displayed live, or an artificially generated stereoscopic sound. In this embodiment, an output example of a stereo sound based on stereo sound data is used as a stereoscopic sound. However, a stereoscopic sound based on 5.1-channel stereoscopic sound data may be used.

<<All-Around Moving Image Live Distribution System>>

The processing of the all-around moving image live distribution system according to this embodiment will be described with reference to FIGS. 2A to 3C.

(Outline of Processing)

FIG. 2A is a view showing an outline of the processing of an all-around moving image live distribution system 200 according to this embodiment.

In the all-around moving image live distribution system 200, an all-around camera, formed from five image sensors for capturing moving images in five directions in the whole periphery and one image sensor for capturing a moving image from immediately above, captures moving images in six directions at the same time. Therefore, this all-around camera is also called an all-sky camera. Note that the number of image sensors of the all-around camera is not limited to this. Referring to FIG. 2A, a moving image 210 is a moving image from immediately above, and moving images 211 to 215 are moving images covering the whole periphery. In this embodiment, based on the moving images 210 to 215, image adjustment for adjusting the overlapping portions of the moving images is performed to generate an all-around image frame 220 by connecting the whole periphery. Note that image data of a predetermined distance region 225 from a lower side 222 of the all-around image frame 220 is data for complementing an immediately lower region below the all-around camera, which cannot be captured.

A live moving image formed from the all-around image frame 220 is obtained by converting the all-around moving image into data in a format reproducible live in a communication terminal 240. For example, the FLV (Flash Video) format is desirably used. The present invention, however, is not limited to this. Depending on the pattern of data (so-called stream data) to be transmitted, conversion into the FLV format is not always necessary. In this case, conversion into the FLV format may be deleted.

In accordance with a predetermined moving image distribution protocol, the all-around moving image converted into the FLV format is reproduced, via the live moving image distribution server, by the communication terminal 240 in which the all-around moving image live reproducing player of this embodiment operates. In the communication terminal 240 shown in FIG. 2A, the all-around image frame 220 is projected onto a sphere 230. An upper side 221 of the all-around image frame 220 is projected onto a top 231 of the sphere. The lower side 222 of the all-around image frame 220 is projected onto a bottom 232 of the sphere. Note that a portion from a cutting circle 235 to the bottom 232 corresponds to the immediately lower region which cannot be captured by the all-around camera. If the all-around moving image projected onto the sphere 230 is projected from a center 233 of the sphere 230 onto a plane 234, a moving image of a region corresponding to a line of sight in the all-around moving image is reproduced live in the communication terminal 240. The direction of the all-around moving image reproduced live rotates in accordance with sliding of touches 251 to 254 of the user, as indicated by moving images 241 to 244. FIG. 2A assumes that the center 233 of the sphere 230 is set as a viewpoint. However, by changing the position of the viewpoint, zoom-in or zoom-out processing can be performed by changing a region or size to be reproduced live. The zoom-in or zoom-out processing can be implemented by enlarging or reducing a moving image without changing the position of the viewpoint.

Note that FIG. 2A illustrates no stereo acoustic. For example, a stereo microphone is arranged at the same position as that of the all-around camera, stereo acoustic is collected in synchronism with the all-around moving image, and output in synchronism with live distribution and reproduction of the all-around moving image. If live reproduction is performed by synchronizing the all-around moving image and the stereo acoustic, a sound changes by changing the line of sight and viewpoint in an outdoor event such as a festival, or an indoor live concert hall or exhibition hall, and thus the user can view a live moving image with realism. That is, the user can listen to stereo acoustic (stereoscopic sound) which changes in accordance with the view direction and a distance by zoom-in/zoom-out processing of the all-around moving image. Stereo acoustic such as an explanation of paintings in an art museum, which is different from a live sound, can be synchronized with live reproduction of the all-around moving image. A solid onto which the all-around image frame is projected is not limited to the sphere, and may be an ellipsoid, a cylinder, a polyhedron, or the like.

(Outline of Operation)

Figure 2B:
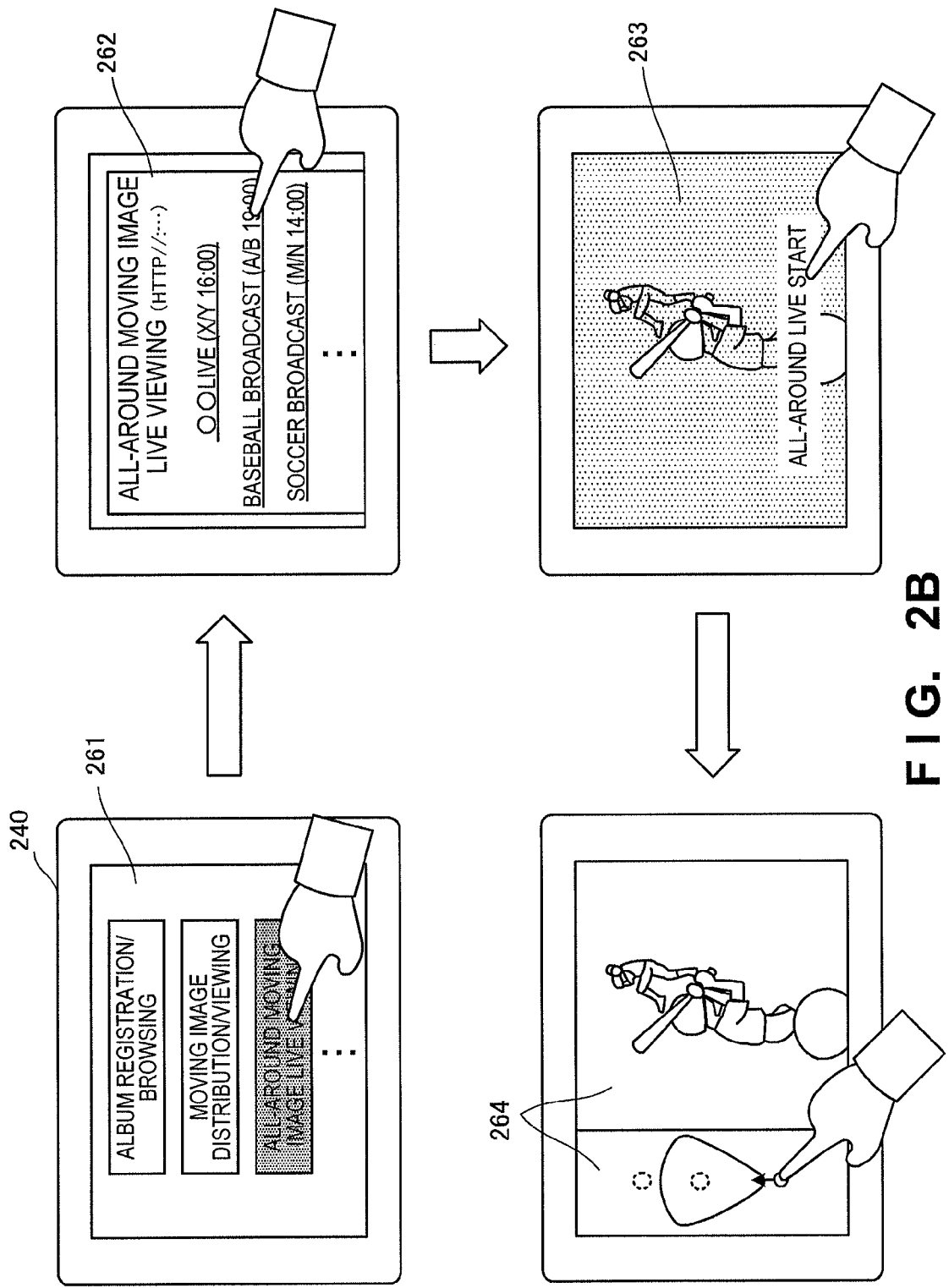
FIG. 2B is a view showing an outline of the operation of the all-around moving image live distribution system according to the second embodiment of the present invention.

FIG. 2B is a view showing an outline of the operation of the all-around moving image live distribution system 200 according to this embodiment.

In the communication terminal 240, a service desired by the user is selected from a service menu in a screen 261. In this example, an "all-around moving image live viewing" service is selected. An "all-around moving image live viewing" homepage is opened in a screen 262, and a plurality of all-around moving image live programs are displayed. In this example, a baseball broadcast is selected from the plurality of all-around moving image live programs. The communication terminal 240 acquires a URL (Uniform Resource Locator) for obtaining an all-around moving image live moving image from the live moving image distribution server based on the HTML tag of the baseball broadcast from a data distribution server, and accesses the all-around moving image live moving image of the baseball broadcast on the live moving image distribution server. An all-around live start screen 263 is displayed on the communication terminal 240. In response to an all-around live start instruction, the all-around live moving image and a position 264 of the all-around camera are displayed. The outline of the operation in FIG. 2B is merely an example, and the present invention is not limited to this.

(System Configuration)

Figure 3A:
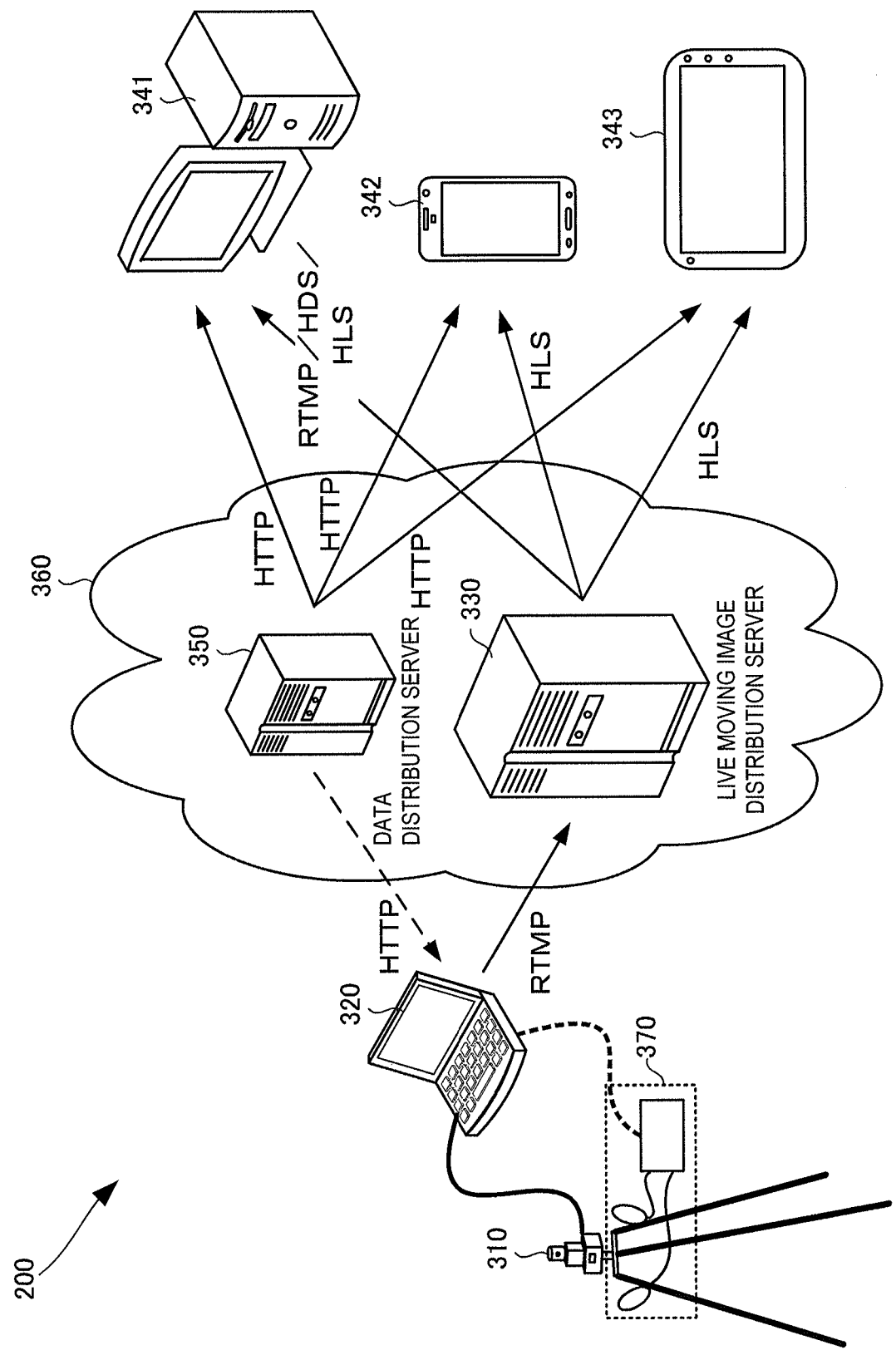
FIG. 3A is a block diagram showing the configuration of the all-around moving image live distribution system according to the second embodiment of the present invention.

FIG. 3A is a block diagram showing the configuration of the all-around moving image live distribution system 200 according to this embodiment.

The all-around moving image live distribution system 200 includes an all-around camera 310, an optional stereo microphone 370, an image capturing/distribution personal computer (to be referred to as a PC hereinafter) 320, a live moving image distribution server 330, and communication terminals 341 to 343. The all-around moving image live distribution system 200 also includes a data distribution server 350. Note that the live moving image distribution server 330 and the data distribution server 350 are communicably connected to the image capturing/distribution PC 320 and the communication terminals 341 to 343 via a network 360.

The all-around camera 310 captures all-sky moving images by the six image sensors, as described above. The all-around camera 310 adjusts a distortion and brightness/darkness caused by a lens or the like, thereby outputting each digital image frame to the image capturing/distribution PC 320. The stereo microphone 370 collects a stereoscopic sound synchronized with the moving images captured by the all-around camera 310. Note that in FIG. 3A, the sound of the stereo microphone 370 is combined with one data stream, and input to the image capturing/distribution PC 320. However, the image capturing/distribution PC 320 may perform combining processing. If no sound is necessary, the stereo microphone 370 need not be connected.

Based on the moving image data of the six image sensors from the all-around camera 310, the image capturing/distribution PC 320 generates all-around image data for each frame by making the boundaries of respective images consistent. Next, the all-around image data undergoes compression coding, and is then converted into data in the FLV format reproducible live. If there is stereo acoustic to be synchronized, it undergoes compression coding, and is added to the data in the FLV format.

The data in the FLV format is uploaded to the live moving image distribution server 330 in accordance with RTMP (Real Time Messaging Protocol). In the live moving image distribution server 330, for example, data embedded in advance in a Web page using an HTML (Hyper Text Markup Language) tag is stored at an allocated storage position so as to be referred to using an URL. The live moving image distribution server 330 encodes or encrypts the data, as needed, so that each of the communication terminals 341 to 343 can decode the data.

On the other hand, each of the communication terminals 341 to 343 that views the live reproduction of an all-around moving image opens a Web page for providing a service of viewing the live reproduction of the all-around moving image in accordance with the data distribution server (Web server) 350 and HTTP (Hypertext Transfer Protocol). If an all-around moving image live distribution tag embedded in the Web page is instructed, each communication terminal accesses the corresponding IP address of the live moving image distribution server 330. The live moving image distribution server 330 performs live distribution of all-around moving images sequentially stored at secured storage positions. Note that the live distribution destination of the all-around moving images is the smartphone of the communication terminal 342 or the tablet of the communication terminal 343, the distribution standard is changed to HLS (HTTP Live Streaming) to perform distribution. On the other hand, if the live distribution destination of the all-around moving images is the PC of the communication terminal 341, RTMP remains unchanged to perform distribution or the distribution standard is changed to HLS or HDS (HTTP Dynamic Streaming) to perform distribution.

(Operation Example)

Figure 3B:
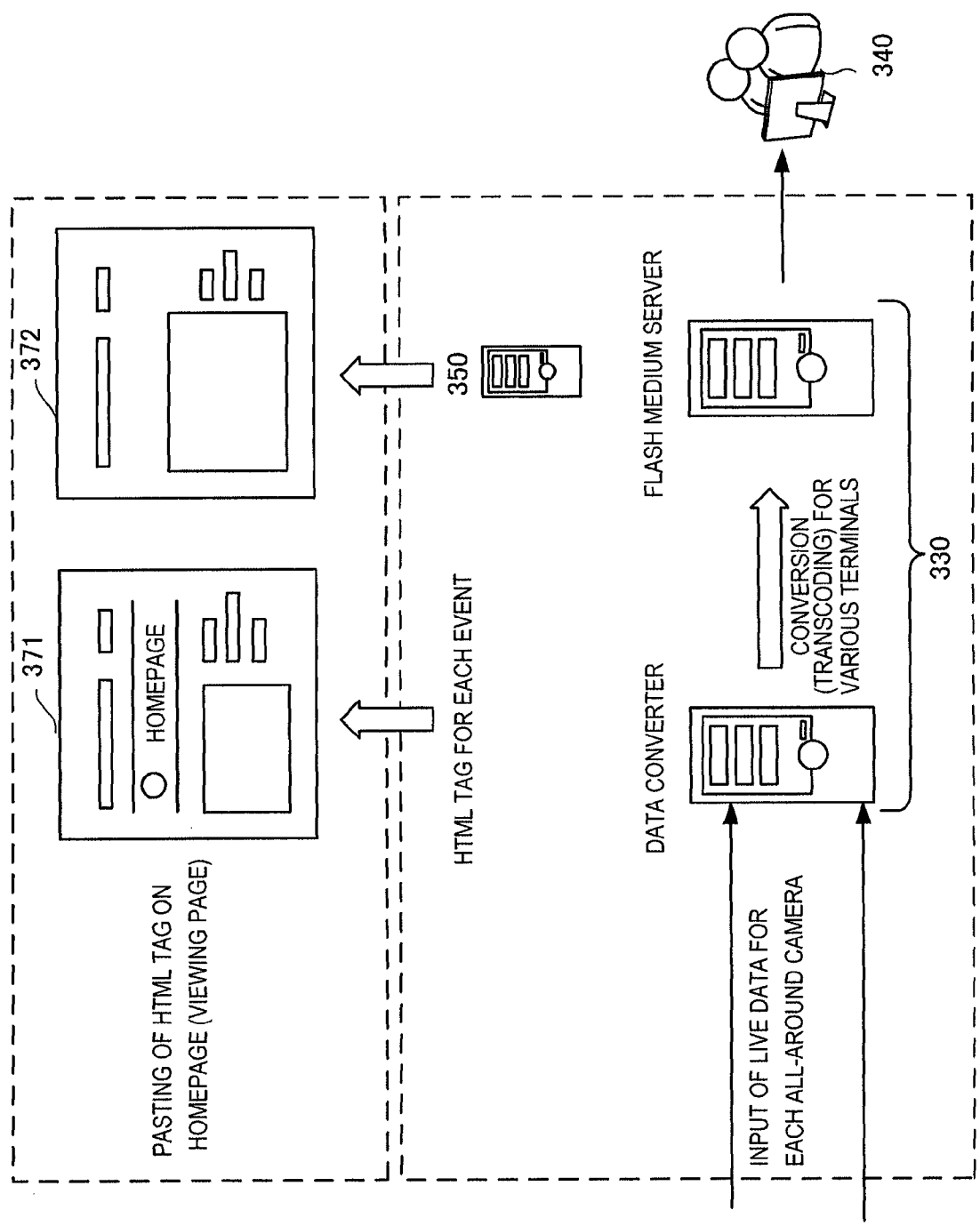
FIG. 3B is a view showing an example of the operation of the all-around moving image live distribution system according to the second embodiment of the present invention.

FIG. 3B is a view showing an example of the operation of the all-around moving image live distribution system 200 according to this embodiment. Note that FIG. 3B visually shows an operation of embedding an HTML tag in FIG. 3A.

Referring to FIG. 3B, a data converter and a flash medium server correspond to the live moving image distribution server 330 shown in FIG. 3A. An HTML tag for each live content or each event is pasted on homepages 371 and 372, and then the user views the live reproduction of an all-around moving image using a communication terminal 340 by accessing the live moving image distribution server 330 from the HTML tag to access live data from the all-around camera.

Note that this embodiment has exemplified a case in which an HTML tag for each live content or each event is pasted on the homepages 371 and 372, and an all-around moving image is reproduced live. However, it is possible to directly access the live moving image distribution server 330 from each of the communication terminals 341 to 343 to view the live reproduction of the all-around moving image.

(Operation Procedure)

Figure 3C:
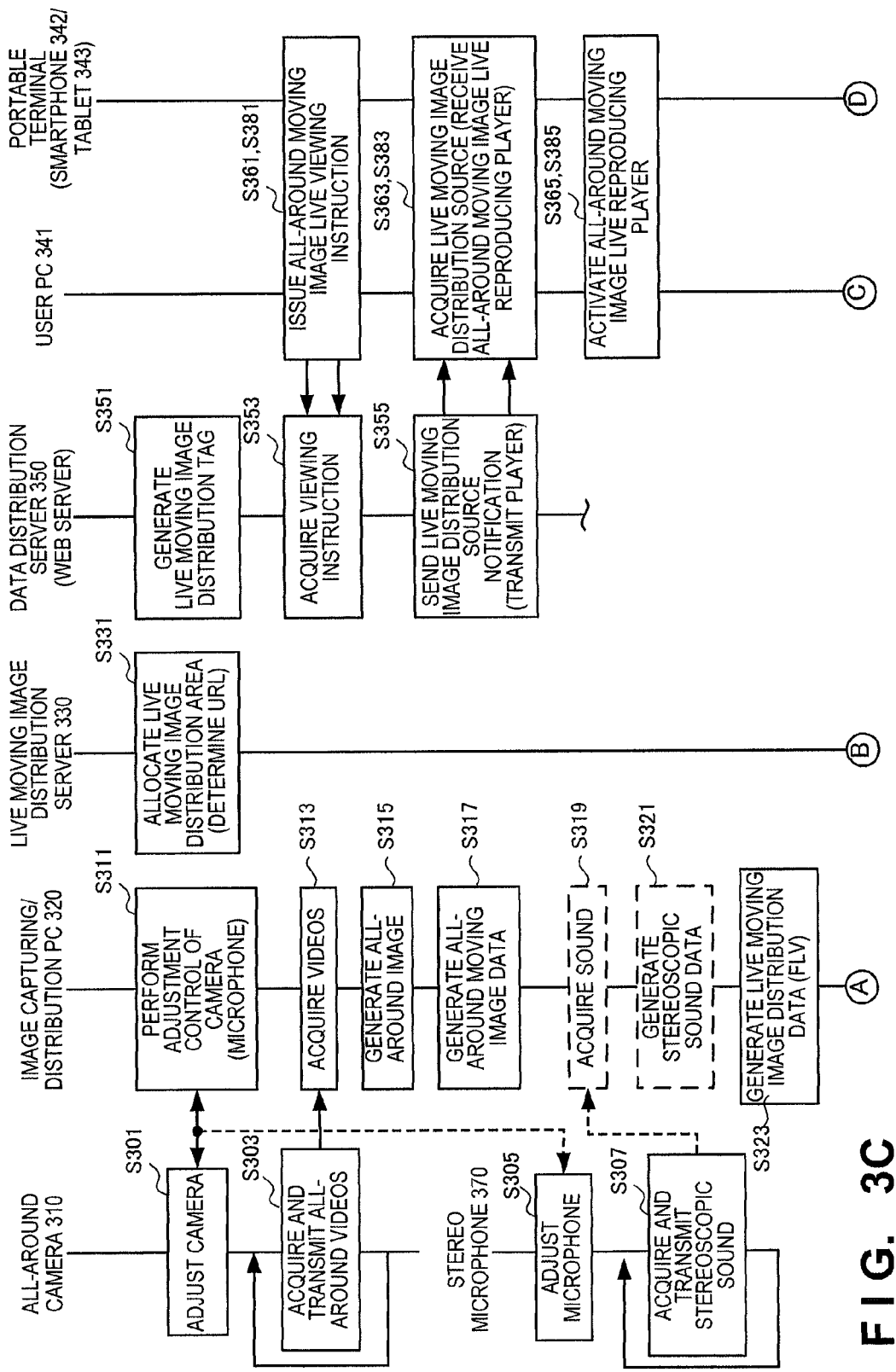
FIG. 3C and FIG. 3D are sequence charts showing the operation procedure of the all-around moving image live distribution system according to the second embodiment of the present invention.
Figure 3D:
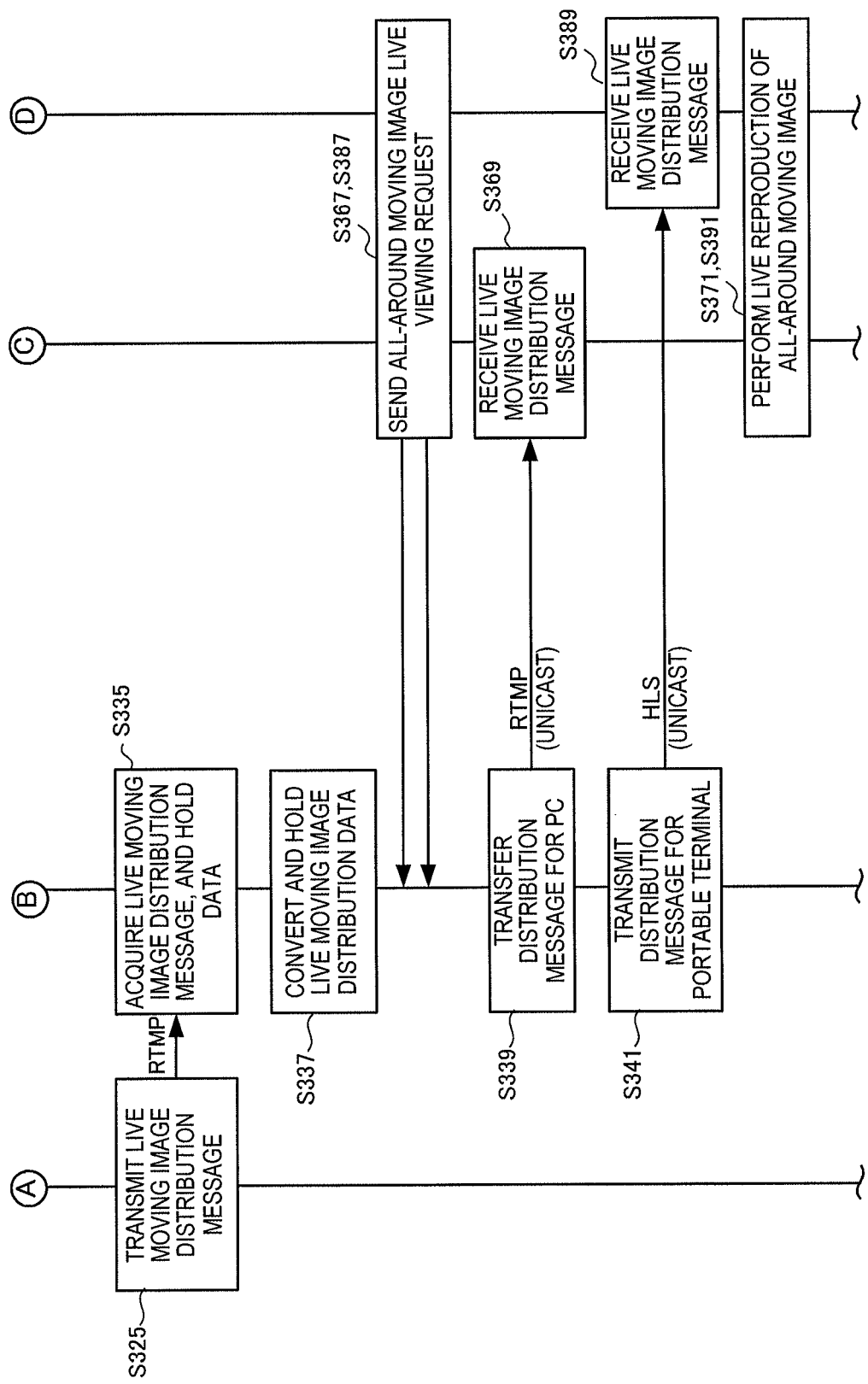

FIG. 3C and FIG. 3D are sequence charts showing the operation procedure of the all-around moving image live distribution system 200 according to this embodiment. Note that in FIG. 3C and FIG. 3D, some of steps for the user PC 341 and the communication terminals 342 and 343 are commonly indicated by the same boxes in order to avoid cumbersomeness but are different steps. User authentication processing and the like are not illustrated in FIG. 3C and FIG. 3D. To perform user authentication, an authentication server is additionally provided, in which the user or communication terminal is registered in advance.

In step S311, the image capturing/distribution PC 320 performs adjustment control of a camera or microphone. In step S301, the all-around camera 310 adjusts the camera under the control of the image capturing/distribution PC 320. In step S303, the all-around camera 310 acquires all-around videos by the six image sensors, adds the position IDs of the image sensors to the videos, and transmits the videos to the image capturing/distribution PC 320. Note that in step S305, the stereo microphone 370 adjusts the microphone. In step S307, the stereo microphone 370 acquires a stereoscopic sound, adds a microphone ID to the sound, and transmits the sound to the image capturing/distribution PC 320.

In step S313, the image capturing/distribution PC 320 acquires, from the all-around camera 310, the video data captured by the six image sensors. In step S315, the image capturing/distribution PC 320 generates an all-around image frame by combining the acquired video data. In step S317, the image capturing/distribution PC 320 generates all-around moving image data for live distribution. At this time, for example, moving image compression complying with H.264 is performed. Note that moving image compression is not limited to H.264. However, a compression method for which the players of many communication terminals can perform decompression is desirable. In addition to H.264, H.263, WMV, DivX, VP6, VP7, VP8, VP9, Theora, WebM, MPEG1, MPEG2, MPEG4, DV, and the like can be used as a moving image compression method.

On the other hand, in step S319, with respect to a sound, the image capturing/distribution PC 320 acquires sound data from the stereo microphone. In step S321, the image capturing/distribution PC 320 creates sound data for live distribution. At this time, for example, sound compression complying with MP3 is performed. Note that sound compression is not limited to MP3. However, a compression method for which the players of many communication terminals can perform decompression is desirable. In addition to MP3, AAC, HE-AAC, Vorbis, FLAC, Nellymoser, Speex, Apple Lossless, uncompressed WAV, and the like can be used as a sound compression method.

In step S323, the image capturing/distribution PC 320 generates live moving image distribution data so that the all-around moving image data and sound data which have respectively undergone the desired compression processes can be synchronously reproduced. In this example, data in the above-described FLV format is generated. In step S325, in this example, the image capturing/distribution PC 320 uploads the generated data in the FLV format to the live moving image distribution server 330 by a live moving image distribution message complying with RTMP.

On the other hand, in step S331, the live moving image distribution server 330 determines a live moving image distribution URL, and allocates a live moving image distribution area. In step S351, the data distribution server 350 pastes an all-around moving image live distribution tag on a Web page. Assume that in step S361 or S381, each of the communication terminals 341 to 343 issues an all-around moving image live viewing instruction from the Web page. In step S353, the data distribution server 350 acquires the viewing instruction from each of the communication terminals 341 to 343. In step S355, the data distribution server 350 notifies each of the communication terminals 341 to 343 of the live moving image distribution source. At this time, an all-around moving image live reproducing player for performing live reproduction of the all-around moving image is transmitted to each of the communication terminals 341 to 343. That is, in fact, a player URL is designated by the all-around moving image live distribution tag, and the live moving image distribution URL can be embedded in the player, can be separately acquired by the player, or can be included in the all-around moving image live distribution tag.

In step S363 or S383, each of the communication terminals 341 to 343 acquires the live moving image distribution source, and also receives the all-around moving image live reproducing player. In step S365 or S385, each of the communication terminals 341 to 343 activates the all-around moving image live reproducing player. In step S367 or S387, each of the communication terminals 341 to 343 requests viewing of the live reproduction of the all-around moving image of the live moving image distribution server 330 by designating an URL corresponding to each communication terminal.

If the image capturing/distribution PC 320 uploads the all-around live moving image distribution data in accordance with RTMP, the live moving image distribution server 330 acquires the all-around live moving image distribution data and temporarily holds it in a live moving image storage area in step S335. In step S337, the live moving image distribution server 330 converts the all-around live moving image distribution message into a format (for example, HLS) for the smartphone or tablet, and temporarily holds the message. If another format is necessary, format conversion is performed, and the resultant data is temporarily held.

If the distribution destination of the all-around live moving image is the PC of the communication terminal 341, the live moving image distribution server 330 performs, in step S339, live distribution of the all-around moving image to the communication terminal 341 as the distribution destination in accordance with RTMP. In this case, if there are a plurality of distribution destinations, the all-around live moving image is distributed to the distribution destinations at the same time by unicast. The communication terminal 341 receives the all-around live moving image distribution message in step S369, and performs live reproduction of the all-around moving image and stereoscopic sound in step S371. Note that multicasting by RTMFP (Real Time Media Flow Protocol) is also possible for the PC.

On the other hand, if the distribution destination of the all-around live moving image is the smartphone of the communication terminal 342 or the tablet of the communication terminal 343, the live moving image distribution server 330 performs, in step S341, live distribution of the all-around moving image to the communication terminal 342 or 343 as the distribution destination by HLS. In this case, if there are a plurality of distribution destinations, the all-around moving image is sequentially distributed to the distribution destinations by unicast. The communication terminal 342 or 343 receives the all-around live moving image distribution message in step S389, and performs live reproduction of the all-around moving image and the stereoscopic sound in step S391.

In the example, a procedure in which conversion for the smartphone or tablet is performed when data is uploaded to the live moving image distribution server 330 has been explained. However, conversion may be performed after access from the communication terminal 342 or 343 is made. In this case, an additional time is required to start reproduction but the processing load can be suppressed when there is no access from the smartphone or tablet. As the live moving image distribution message from the live moving image distribution server 330 to each of the communication terminals 341 to 343, the RTMP, HLS, HDS, RTSP, MMS, Microsoft Smooth Streaming, or MPEG-DASH protocol is often generally used. However, different protocols and proprietary protocols can also be used.

<<Functional Arrangement of All-Around Camera>>

Figure 4A:
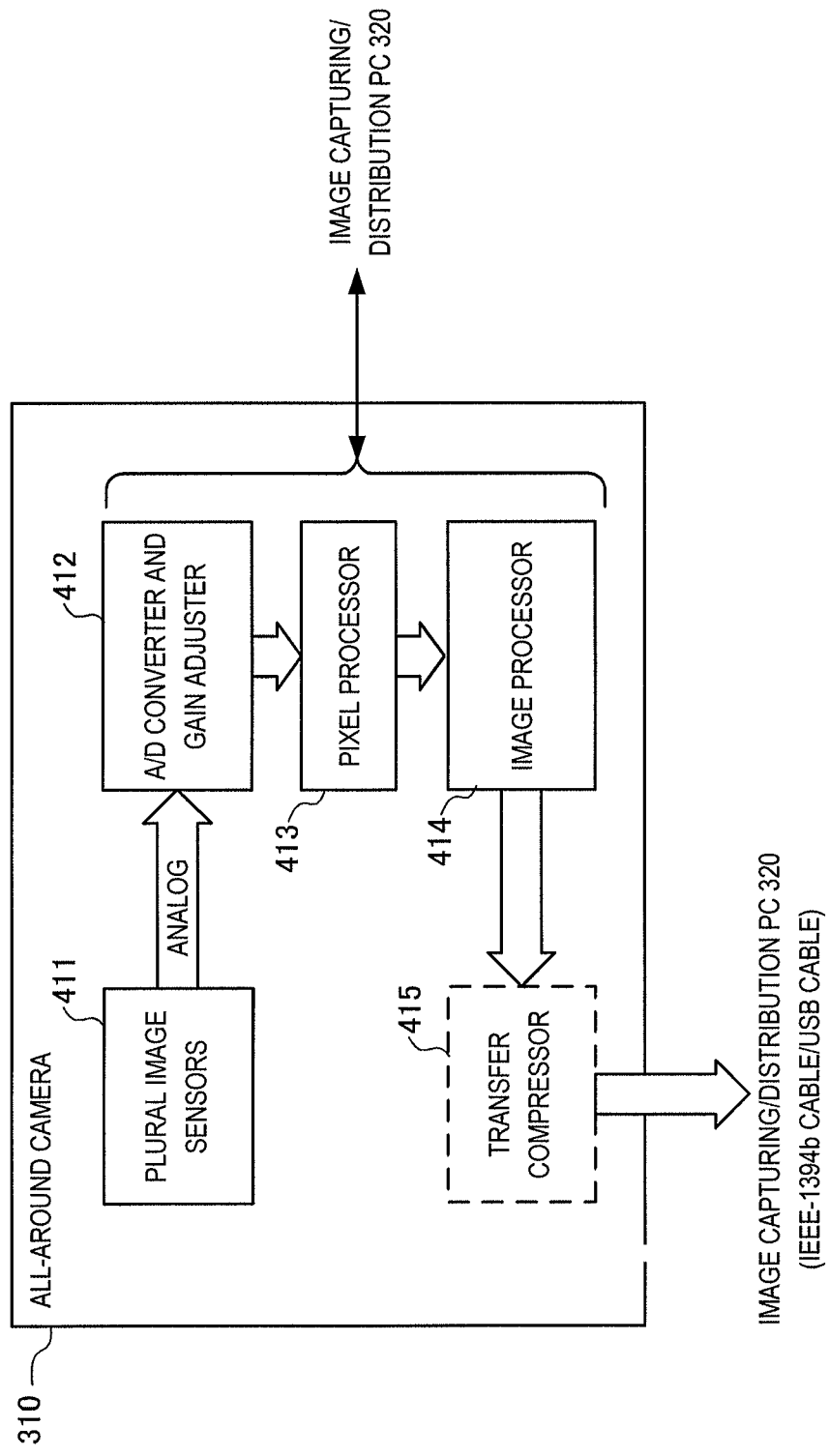
FIG. 4A is a block diagram showing the functional arrangement of an all-around camera according to the second embodiment of the present invention.

FIG. 4A is a block diagram showing the functional arrangement of the all-around camera 310 according to this embodiment.

The all-around camera 310 includes a plurality of image sensors 411, an A/D converter and gain adjuster 412, a pixel processor 413, an image processor 414, and an optional transfer compressor 415.

The plurality of image sensors 411 are the above-described six image sensors in this example. The A/D converter and gain adjuster 412 converts the analog signals of moving images output from the plurality of image sensors 411 into digital data, and also adjusts gains to appropriate ones so the analog signals do not become saturated. The pixel processor 413 performs pixel-based adjustment. The image processor 414 adjusts brightness/darkness of the whole image and the like. The optional transfer compressor 415 is a compressor for transferring, in real time, at high speed, the moving image data from the plurality of image sensors 411, which are output from the all-around camera 310. The moving image data in each of which a distortion has been compensated by the components and structure of the all-around camera 310 are externally output via, for example, an IEEE-1394b cable or USB cable. In this embodiment, the image capturing/distribution PC 320 is connected and the moving image data are transmitted.

Figure 4B:
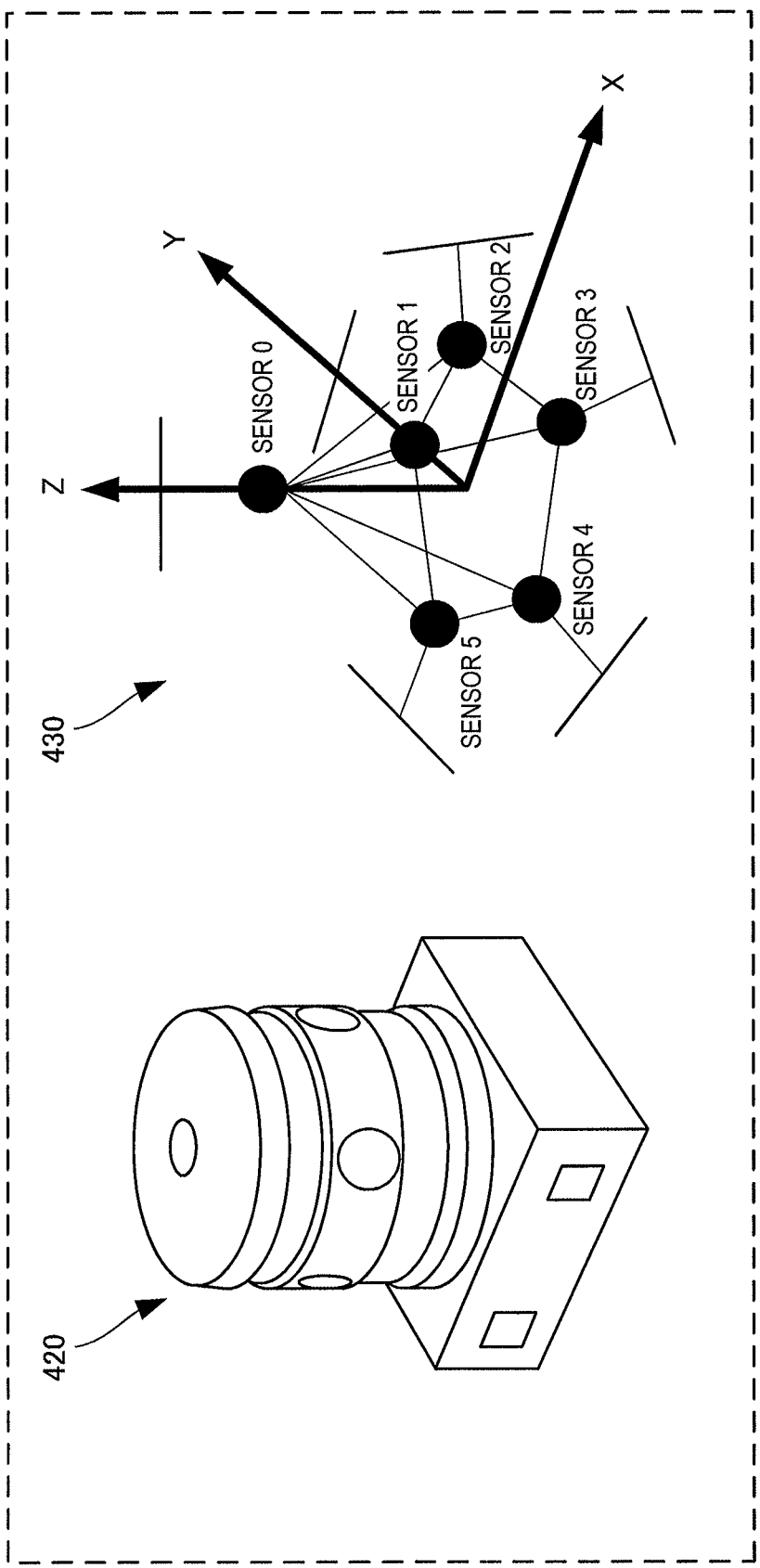
FIG. 4B is a view for explaining an example of the structure of the all-around camera according to the second embodiment of the present invention.

FIG. 4B is a view for explaining an example of the structure of the all-around camera 310 according to this embodiment.

An all-around camera outer appearance 420 shown in FIG. 4B indicates the practical structure of the all-around camera 310. Furthermore, image capturing positions 430 of the image sensors in FIG. 4B indicate the positional relationship between the six image sensors of the all-around camera 310, and the image capturing directions of the image sensors.

(Data Structure)

Figure 5:
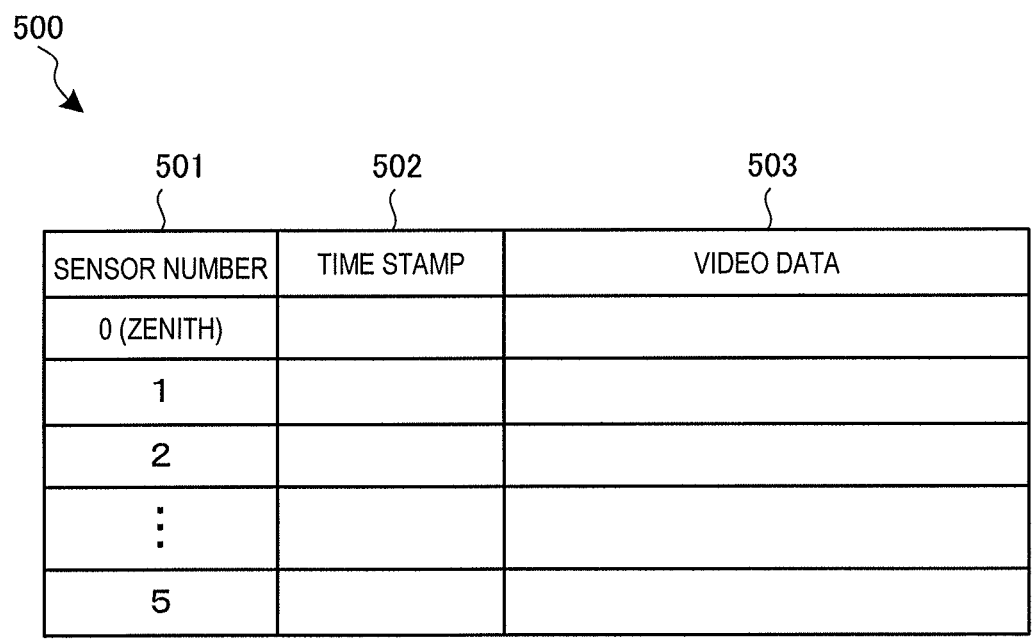
FIG. 5 is a table showing the data structure of the all-around camera according to the second embodiment of the present invention.

FIG. 5 is a table showing a data structure 500 of the all-around camera 310 according to this embodiment. The data structure 500 in FIG. 5 indicates the structure of captured data externally output from the all-around camera 310. Note that the data structure is not limited to that shown in FIG. 5.

The data structure 500 includes a sensor number 501 for identifying an image sensor which has captured data, a time stamp 502 indicating an image capturing time, and video data 503, and is stored in the all-around camera 310 (see 210 to 215 of FIG. 2A). Note that the video data 503 may be compressed data.

<<Functional Arrangement of Image Capturing/Distribution PC>>

Figure 6:
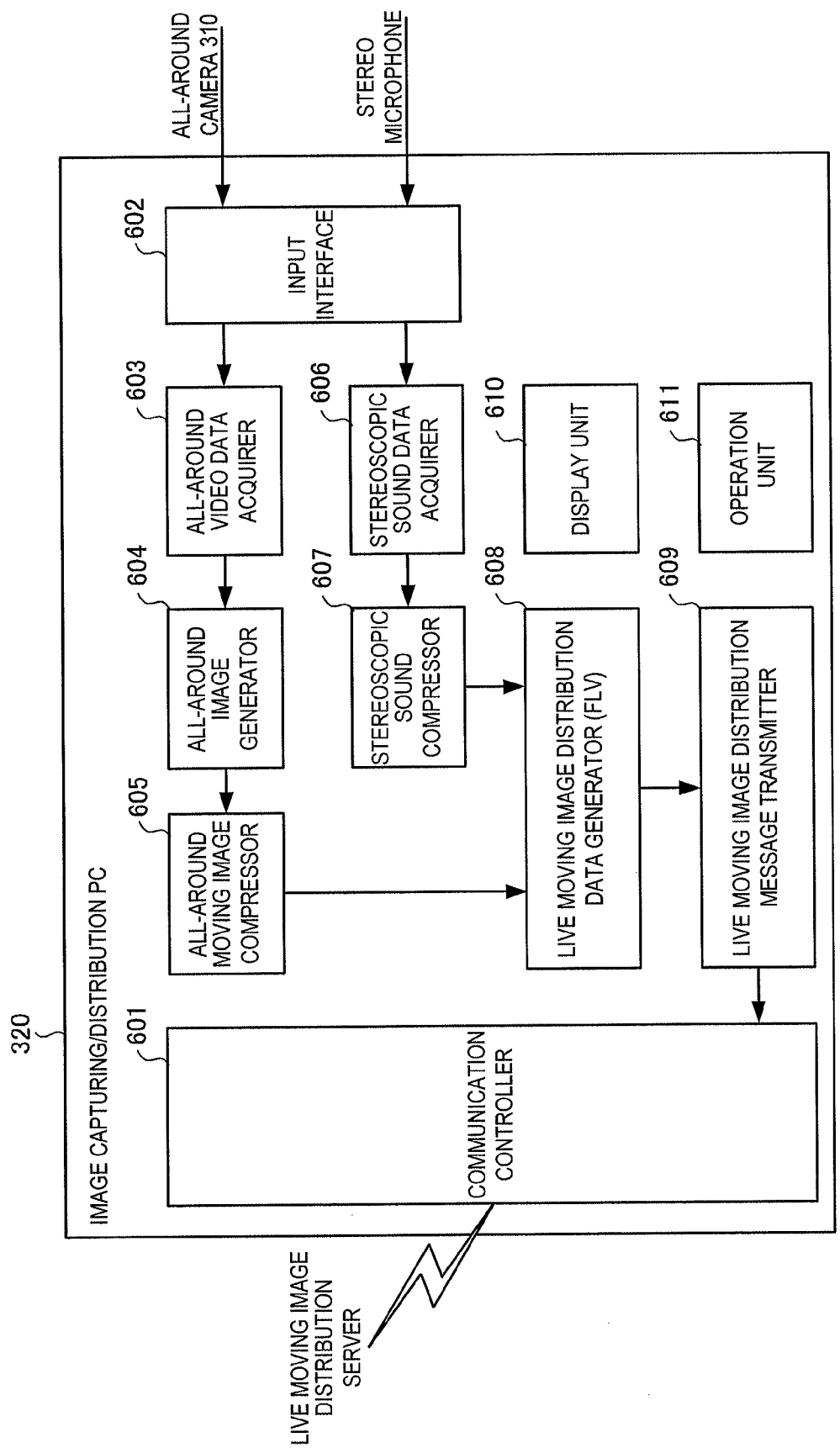
FIG. 6 is a block diagram showing the functional arrangement of an image capturing/distribution PC according to the second embodiment of the present invention.

FIG. 6 is a block diagram showing the functional arrangement of the image capturing/distribution PC 320 according to this embodiment. Note that the image capturing/distribution PC 320 is a general PC incorporating software for image capturing/distribution according to this embodiment.

The image capturing/distribution PC 320 includes a communication controller 601 and an input interface 602. Furthermore, the image capturing/distribution PC 320 includes an all-around video data acquirer 603, an all-around image generator 604, an all-around moving image compressor 605, a stereoscopic sound data acquirer 606, and a stereoscopic sound compressor 607. The image capturing/distribution PC 320 also includes a live moving image distribution data generator 608, a live moving image distribution message transmitter 609, a display unit 610, and an operation unit 611.

The communication controller 601 communicates with the live moving image distribution server 330 and an external communication apparatus via a network. The input interface 602 controls the input of the moving image data from the all-around camera 310 and/or the sound data from the stereo microphone.

The all-around video data acquirer 603 acquires, from the all-around camera 310, moving image data obtained by capturing the whole periphery. The all-around image generator 604 compensates for distortions in the boundary regions of the six moving image data acquired by the all-around video data acquirer 603, and adjusts the moving image data, thereby generating an all-around image for each frame (see 220 in FIG. 2A). The all-around moving image compressor 605 distributes all-around live moving image data formed from the all-around images for the respective frames, which have been generated by the all-around image generator 604, and generates all-around image compression data in a format in which an all-around moving image can be reproduced live. In this case, the all-around live moving image data undergoes compression coding by a desired method for every predetermined length. In this example, H.264 is used as a moving image compression method. The present invention, however, is not limited to this. Other usable moving image compression methods have been described above.

The stereoscopic sound data acquirer 606 acquires stereoscopic sound data from the stereo microphone. The stereoscopic sound compressor 607 distributes the stereoscopic sound data acquired by the stereoscopic sound data acquirer 606, thereby generating stereoscopic sound compression data in a format in which stereo acoustic can be reproduced. In this case, the stereoscopic sound data undergoes compression coding by a desired method for every predetermined length. In this case, MP3 is used as a sound compression method. The present invention, however, is not limited to this. Other usable sound compression methods have been described above. The stereoscopic sound data acquirer 606 and the stereoscopic sound compressor 607 function as a stereoscopic data generator.

The live moving image distribution data generator 608 generates live distribution data for performing live distribution of the all-around moving image compression data generated by the all-around moving image compressor 605 and the stereoscopic sound compression data generated by the stereoscopic sound compressor 607. At this time, the all-around moving image and the stereoscopic sound can be synchronously reproduced. In this example, the FLV format is used. The present invention, however, is not limited to this. For example, Windows® Media, Real Media®, Quick Time®, or the like may be used. The live moving image distribution message transmitter 609 uploads the live moving image distribution data generated by the live moving image distribution data generator 608 to the live moving image distribution server 330 by a live moving image distribution message.

The display unit 610 displays the operation status of the image capturing/distribution PC 320. Furthermore, the operation unit 611 instructs activation and control of each storage component described above.

(Data Structure)

Figure 7A:
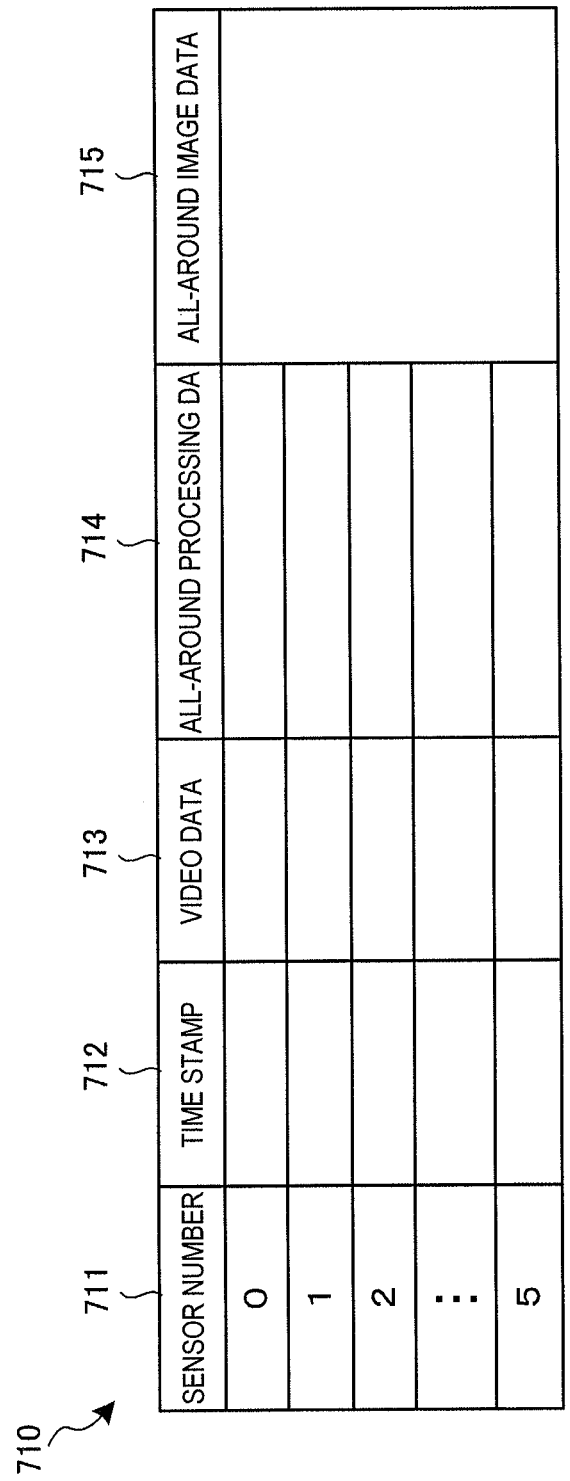
FIG. 7A is a table showing the moving image data structure of the image capturing/distribution PC according to the second embodiment of the present invention.

FIG. 7A is a table showing a moving image data structure 710 of the image capturing/distribution PC 320 according to this embodiment. The moving image data structure 710 in FIG. 7A is a storage structure for generating all-around image data from the moving image data acquired from the all-around camera 310.

The moving image data structure 710 stores, in association with a sensor number 711 of each moving image sensor, a time stamp 712 of an image capturing time, video data 713 acquired from the all-around camera 310 and all-around processing data 714 processed to be combined into an all-around image. The moving image data structure 710 stores all-around image data 715 obtained by combining the moving image data of the six image sensors (see 220 in FIG. 2A).

FIG. 7B is a table showing a sound data structure 720 of the image capturing/distribution PC 320 according to this embodiment. The sound data structure 720 in FIG. 7B is a structure for storing sound data acquired from the stereo microphone.

The sound data structure 720 stores a time stamp 722 of an sound collecting time and sound data 723 in association with a microphone number 721.

Figure 7C:
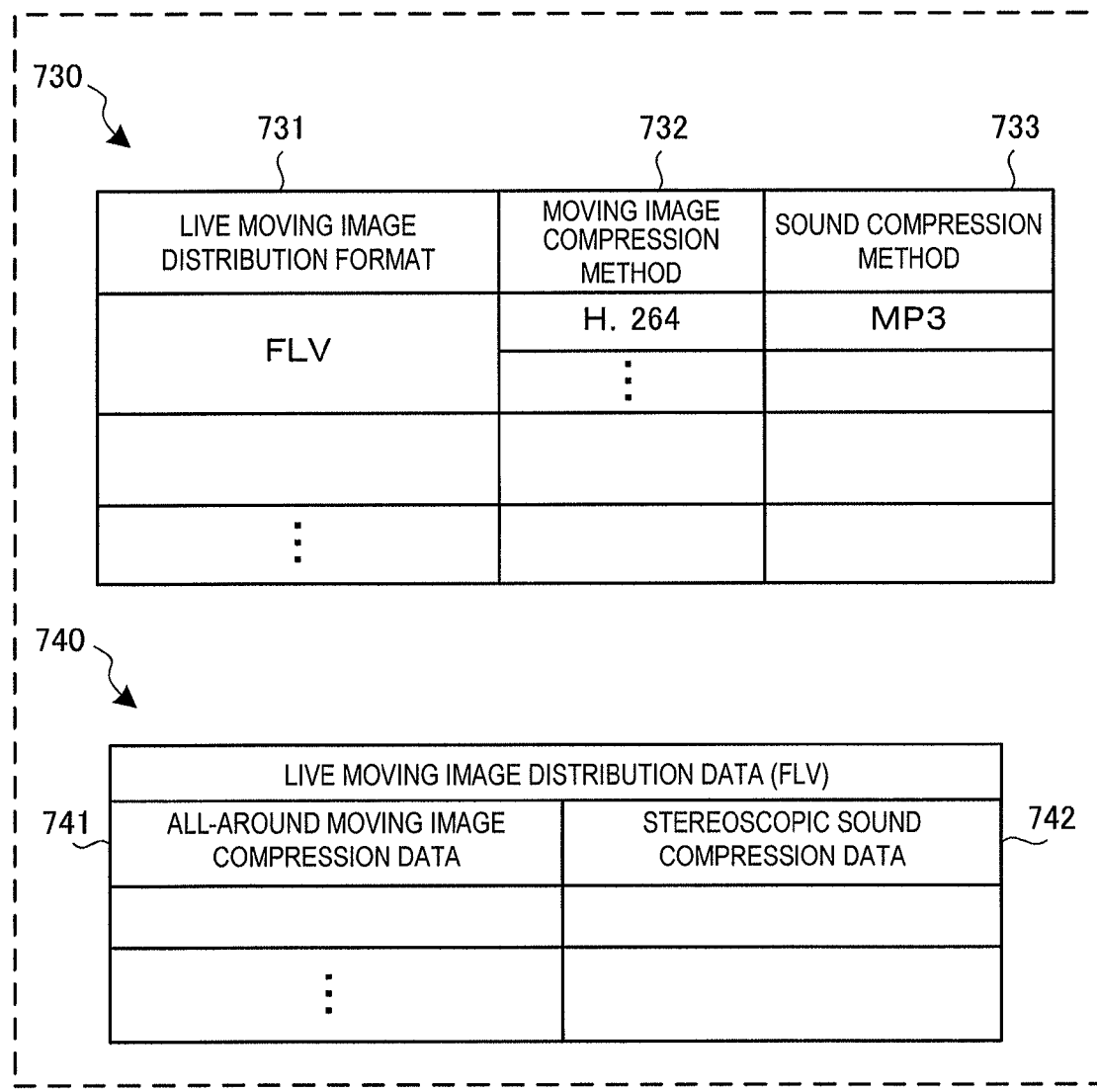
FIG. 7C shows tables of the live distribution data format and live distribution data of the image capturing/distribution PC according to the second embodiment of the present invention.

FIG. 7C shows tables of a live distribution data format 730 and live moving image distribution data 740 of the image capturing/distribution PC 320 according to this embodiment. The live distribution data format 730 is a table for designating a live distribution data format to be generated. The live moving image distribution data 740 is data generated in accordance with the live distribution data format 730.

The live distribution data format 730 stores a moving image compression method 732 and sound compression method 733 to be used, in correspondence with a live moving image distribution format 731. The live moving image distribution data 740 stores live moving image distribution data including all-around moving image compression data 741 and stereoscopic sound compression data 742, which have been compressed and generated in accordance with the live distribution data format 730, so as to be synchronously reproducible. In this example, FLU is used as a live moving image distribution message format.

<<Functional Arrangement of Live Video Distribution Server>>

Figure 8:
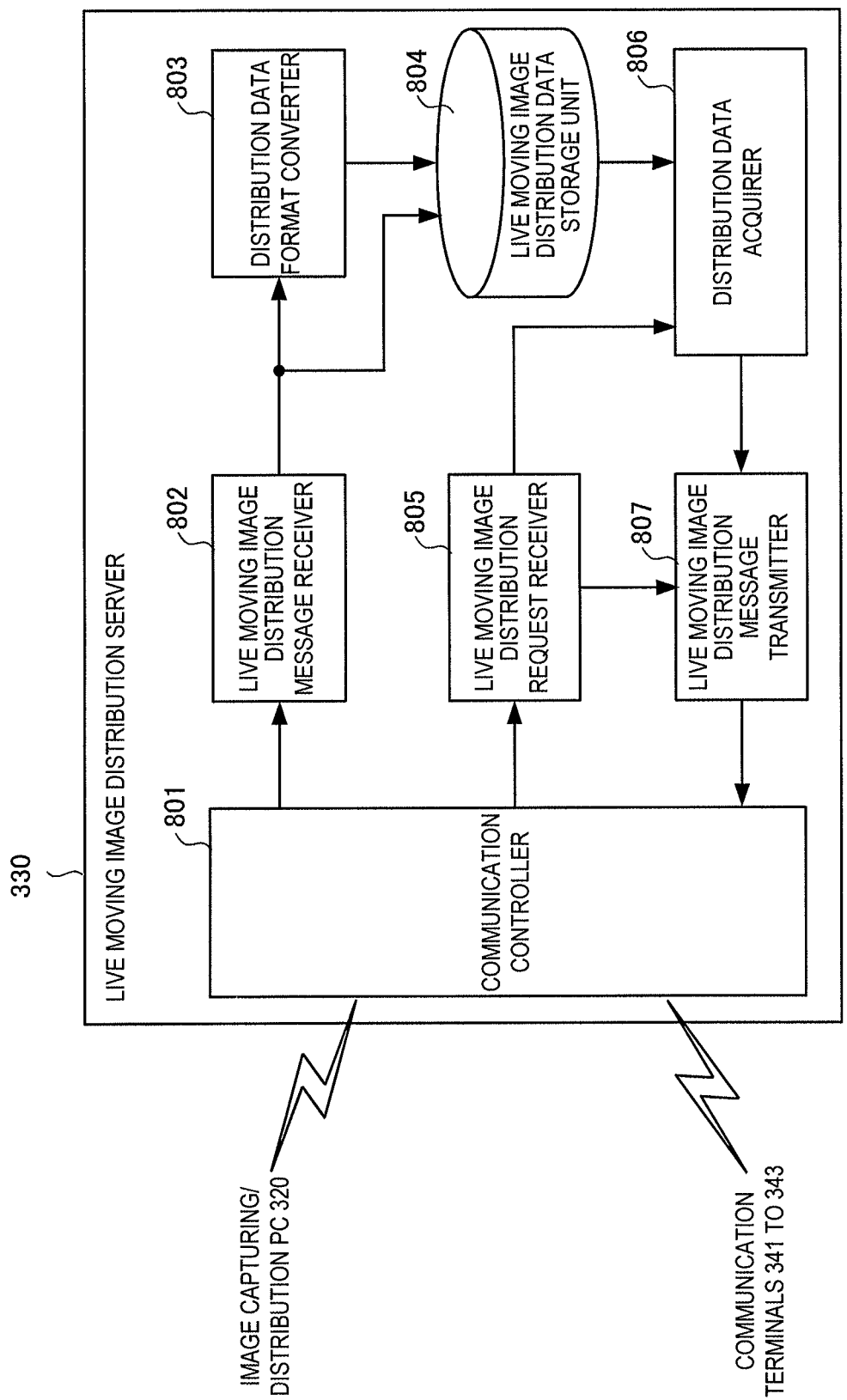
FIG. 8 is a block diagram showing the functional arrangement of a live moving image distribution server according to the second embodiment of the present invention.

FIG. 8 is a block diagram showing the functional arrangement of the live moving image distribution server 330 according to this embodiment.

The live moving image distribution server 330 includes a communication controller 801, a live moving image distribution message receiver 802, a distribution data format converter 803, and a live moving image distribution data storage unit 804. The live moving image distribution server 330 also includes a live moving image distribution request receiver 805, a distribution data acquirer 806, and a live moving image distribution message transmitter 807.

The communication controller 801 controls, via the network, reception of the live distribution message uploaded from the image capturing/distribution PC 320 and transmission of the live distribution message to each of the communication terminals 341 to 343. The live moving image distribution message receiver 802 receives the live distribution message uploaded from the image capturing/distribution PC 320. The distribution data format converter 803 converts the live distribution message into the HLS format for a case in which the distribution destination is a smartphone/tablet. If another format is necessary, format conversion is performed. The live moving image distribution data storage unit 804 temporarily holds live distribution data so as to identify data having undergone no format conversion and data having undergone format conversion. Each live distribution data is associated with URLs from the distribution source and distribution request destination. Note that the live moving image distribution data storage unit 804 may be in a temporary memory or may be a storage medium such as a disk.

The live moving image distribution request receiver 805 receives a live distribution message request from the communication terminal, and sends a notification of the acquisition area of the distribution data acquirer 806 and the transmission destination of the live moving image distribution message transmitter 807. The distribution data acquirer 806 acquires the live distribution data from the storage area of the live moving image distribution data storage unit 804 in correspondence with the URL from the communication terminal. The live moving image distribution message transmitter 807 transmits, by unicast, the live distribution data to the communication terminal which has requested the live distribution data by the live moving image distribution message. Note that the fact that multicasting is also possible when the distribution destination is a PC has been described above.

(URL and Data Conversion)

Figure 9:
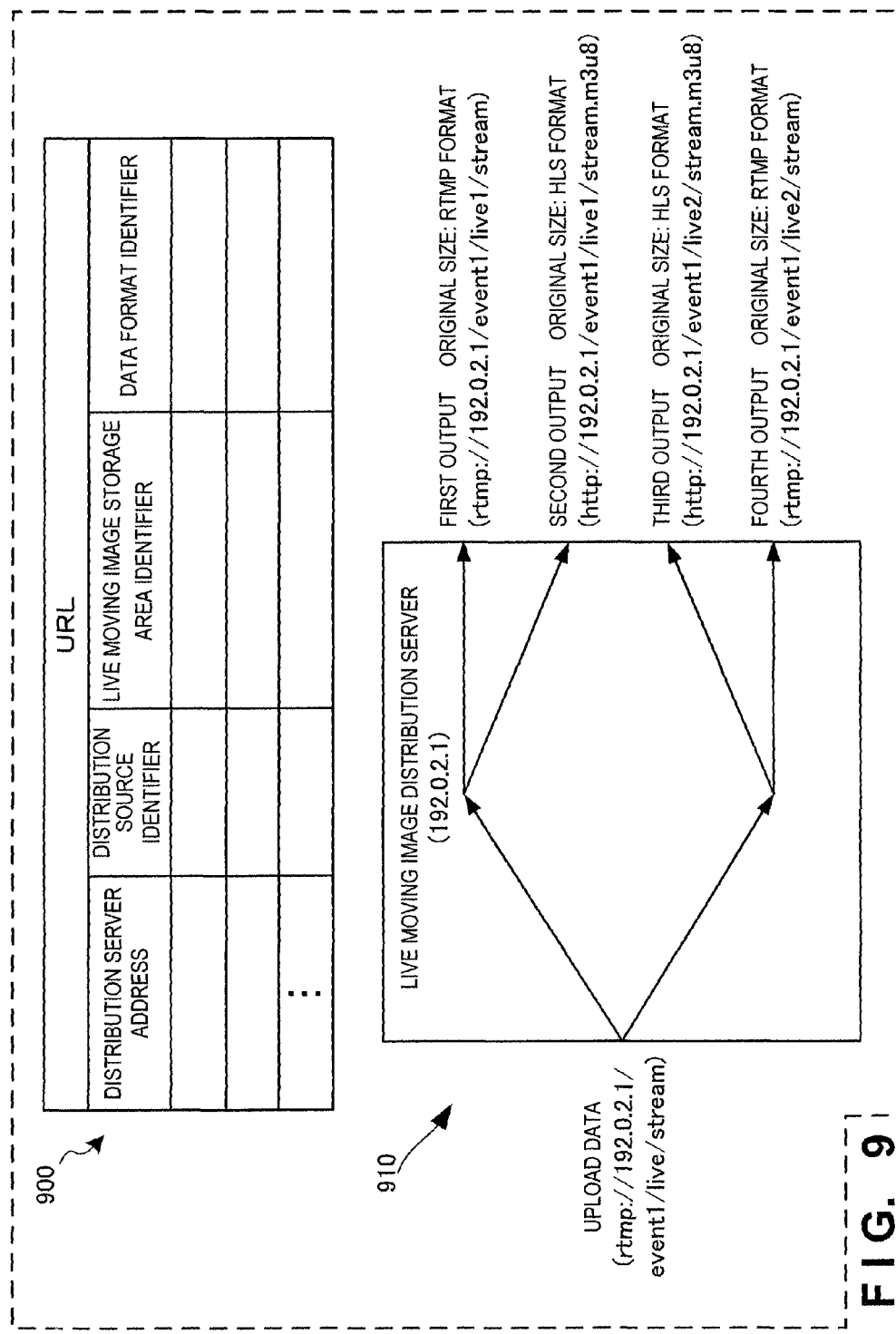
FIG. 9 is a view showing an example of the structure of a URL to the live moving image distribution server, and an example of data conversion according to the second embodiment of the present invention.

FIG. 9 is a view showing a structure 900 of a URL to the live moving image distribution server 330 and data conversion 910 according to this embodiment.

The structure 900 of the URL according to this embodiment basically includes the IP address of the live moving image distribution server 330, a distribution source (or event) identifier, a live moving image storage area identifier, and a data format identifier.

The data conversion 910 in the live moving image distribution server 330 according to this embodiment will be described in more detail. Note that data conversion in the live moving image distribution server 330 is not limited to this. Note that a description will be provided by assuming the server name or IP address of the live moving image distribution server 330 is "192.0.2.1". Furthermore, a plurality of all-around moving image live distribution sources or events are identified by "eventX", original all-around moving image live data is identified by "live", all-around moving live data derived by conversion are identified by "liveX", the RTMP format is identified by "stream", and the HLS format is identified by "stream.m3u8".

<Procedure of Authenticating Distribution Source, and Storing Received Live Moving Image Data in Buffer>

(1) Live moving image data is transmitted from the image capturing/distribution PC 320 to a URL "rtmp://192.0.2.1/event1/live/stream" on the live moving image distribution server 330.

(2) The live moving image distribution server 330 confirms that the received live moving image data is from an authorized distribution source, and stores it in a buffer area.

<Procedure of Converting Live Moving Image Data in Buffer into Format Reproducible in Each Terminal>

(3) The live moving image data is loaded from "rtmp://192.0.2.1/event1/live/stream" in the live moving image distribution server 330, and re-input to a URL "rtmp://192.0.2.1/event1/live1/stream" on the live moving image distribution server 330.

(4) The live moving image data is loaded from "rtmp://192.0.2.1/event1/live/stream" in the live moving image distribution server 330, a moving image resolution is reduced by performing code conversion, and resultant data is re-input to a URL "rtmp://192.0.2.1/event1/live2/stream" on the live moving image distribution server 330.

(5) With respect to (3) and (4) described above, the live moving image distribution server 330 confirms that the received live moving image data is from an authorized distribution source (=live moving image distribution server 330 itself), and stores it in the buffer area.

(6) With respect to (3) and (4) described above, the live moving image distribution server 330 sequentially creates files (files with consecutive numbers) in the HLS format from the live moving image data in the buffer area, and saves them in a temporary area in an HDD. This temporary area can be accessed by a URL "http://192.0.2.1/event1/live1/stream.m3u8" or "http://192.0.2.1/event1/live2/stream.m3u8".

<Procedure of Distributing Live Moving Image Data in Buffer in RTMP Format in Response to Distribution Request from Communication Terminal>

(7) The communication terminal which receives the live moving image data in the RTMP format accesses the URL "rtmp://192.0.2.1/event1/live1/stream" or "rtmp://192.0.2.1/event1/live2/stream" on the live moving image distribution server 330.

(8) The live moving image distribution server 330 distributes the live moving image data in the buffer area in (5) to the communication terminal.

<Procedure of Distributing Live Moving Image Data in Buffer in HLS Format in Response to Distribution Request from Communication Terminal>

(9) The communication terminal which receives the live moving image data in the HLS format accesses the data distribution server 350 to acquire a "master.m3u8" file. In this file, a URL indicating files in the temporary area for HLS on the live moving image distribution server 330 is described.

(10) The communication terminal which receives data in the HLS format analyzes the acquired "master.m3u8" file in accordance with the normal HLS format moving image reproduction procedure, and accesses the files at the URL "http://192.0.2.1/event1/live1/stream.m3u8" or "http://192.0.2.1/event1/live2/stream.m3u8" in the temporary area for HLS on the live moving image distribution server 330.

(11) The live moving image distribution server 330 distributes the files in the temporary area in correspondence with the request URL from the communication terminal.

<Procedure After Distribution>

(12) The live moving image distribution server 330 deletes, from the buffer area, the live moving image data after the lapse of a predetermined time.

(13) The live moving image distribution server 330 deletes, from the temporary area, the file in the HLS format after the lapse of a predetermined time.

Note that if the RTMP format is simply converted into the HLS format without performing conversion of a moving image resolution, a codec, or the like, the processes in (3) to (5) above are not necessary. In this case, the processing in (6) above is performed for (2) above. If a plurality of all-around live moving images are distributed via the live moving image distribution server 330, they can be discriminated by changing the part of "eventX" of each URL.

<<Functional Arrangement of Communication Terminal>>

Figure 10:
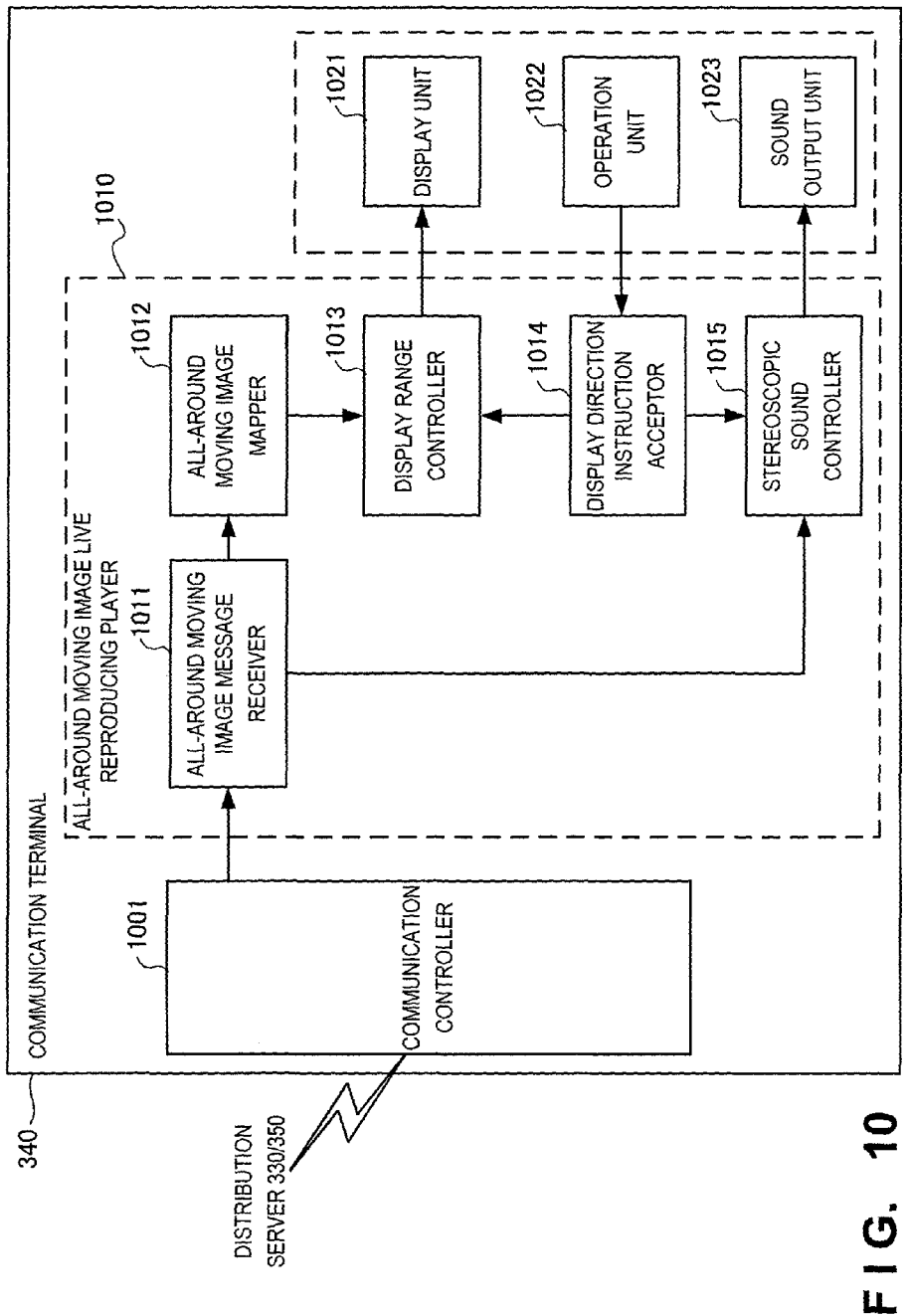
FIG. 10 is a block diagram showing the functional arrangement of a communication terminal according to the second embodiment of the present invention.

FIG. 10 is a block diagram showing the functional arrangement of each of the communication terminals 341 to 343 according to this embodiment. The communication terminals 341 to 343 will be collectively referred to as the communication terminal 340 hereinafter. Note that the communication terminal 340 is a general PC or smartphone/tablet.

The communication terminal 340 includes a communication controller 1001, an all-around moving image live reproducing player 1010, a display unit 1021, an operation unit 1022, and a sound output unit 1023.

The communication controller 1001 controls communication with the live moving image distribution server 330 and the data distribution server (Web server) 350 via the network. The all-around moving image live reproducing player 1010 is an application for reproducing an image or moving image from a distributed image or moving image message. In this embodiment, the all-around moving image live reproducing player 1010 is an application for performing live reproduction of an all-around moving image. The all-around moving image live reproducing player 1010 includes an all-around moving image message receiver 1011, an all-around moving image mapper 1012, a display range controller 1013, a display direction instruction acceptor 1014, and a stereoscopic sound controller 1015.

The all-around moving image message receiver 1011 for receiving all-around moving image data receives an all-around moving image message distributed from the live moving image distribution server 330. The all-around moving image mapper 1012 performs live mapping of an all-around moving image from the all-around moving image data of the distributed all-around moving image message. The display range controller 1013 controls to display a moving image in a direction which has been designated from the all-around moving image having undergone the live mapping by the all-around moving image mapper 1012. The display direction instruction acceptor 1014 accepts an instruction of the display direction of the all-around moving image from the user. The stereoscopic sound controller 1015 controls to output stereo acoustic in correspondence with the display direction of the all-around moving image. Note that although not shown, the display direction instruction acceptor 1014 or the similar functional component also accepts a display range instruction, that is, a zoom-in or zoom-out instruction to control to output the moving image display of the accepted instruction range and stereo acoustic corresponding to the instruction range.

The display unit 1021 displays data including the live display of the all-around moving image. The operation unit 1022 instructs driving or control of each functional component. The sound output unit 1023 outputs stereo acoustic.

(Mapping of All-Around Live Video)

FIG. 11A is a view for explaining mapping of an all-around live moving image in the communication terminal 340 according to this embodiment.

Referring to FIG. 11A, the respective all-around image frames of the all-around moving image included in the distributed all-around moving image data are sequentially pasted on a sphere 1100 to cover the spherical surface. Images 1102, 1103, and 1105 obtained by projecting, from an internal viewpoint 1101, the all-around image frames covering the sphere 1100 onto a display plane indicating the screen of the communication terminal are displayed on the display screen of the communication terminal. If the line-of-sight direction from the viewpoint 1101 rotates about the axis of the sphere 1100, the image 1102 also rotates along with the rotation of the line-of-sight direction. If the viewpoint 1101 moves in the vertical direction, the range of the image 1102 also moves in the vertical direction along with the vertical movement of the viewpoint 1101. If the line-of-sight direction faces up/down, a screen which is looked up/down is obtained. If the viewpoint 1101 moves away from the center of the sphere to a viewpoint 1104, a zoom-in operation is performed in a direction closer to the sphere 1100, and a zoom-out operation is performed in a direction away from the sphere 1100. Note that the zoom-in or zoom-out operation is not limited to the movement of the viewpoint 1104, and can be implemented by enlarging or reducing the display image to be displayed on the screen.

As described above, it is possible to implement broad viewing of the live reproduction of the all-around moving image by changing the viewpoint position and line-of-sight direction, thereby implementing live viewing of the all-around moving image with realism. Note that a stereoscopic sound change can be corresponded to the reproduction direction and reproduction range (zoom-in/zoom-out) based on the intersection point of the line-of-sight vector and the sphere 1100 in FIG. 11A, and the distance from the viewpoint to the intersection point. That is, the stereoscopic sound change corresponding to the zoom-in or zoom-out operation can be implemented by strength/weakness corresponding to the distance from the viewpoint to the intersection point. Furthermore, to perform synchronization in terms of the reproduction range, a sound outside the display range is turned down, and a sound in the central portion within the display range is emphasized, thereby improving realism. To combine an artificial moving image different from a live moving image, it is only necessary to provide another sphere and paste an image on the sphere. For example, if an artificial image is displayed on a live moving image, another sphere is provided inside the sphere 1100. On the other hand, if an artificial background is added, another sphere is provided outside the sphere 1100. In a three-dimensional moving image, a difference in distance from the viewpoint to the sphere can be represented as a depth. Note that even if a solid onto which the all-around image frames are projected is an ellipsoid, a cylinder, or the like, the same processing can be performed.

(Data Structure)

Figure 11B:
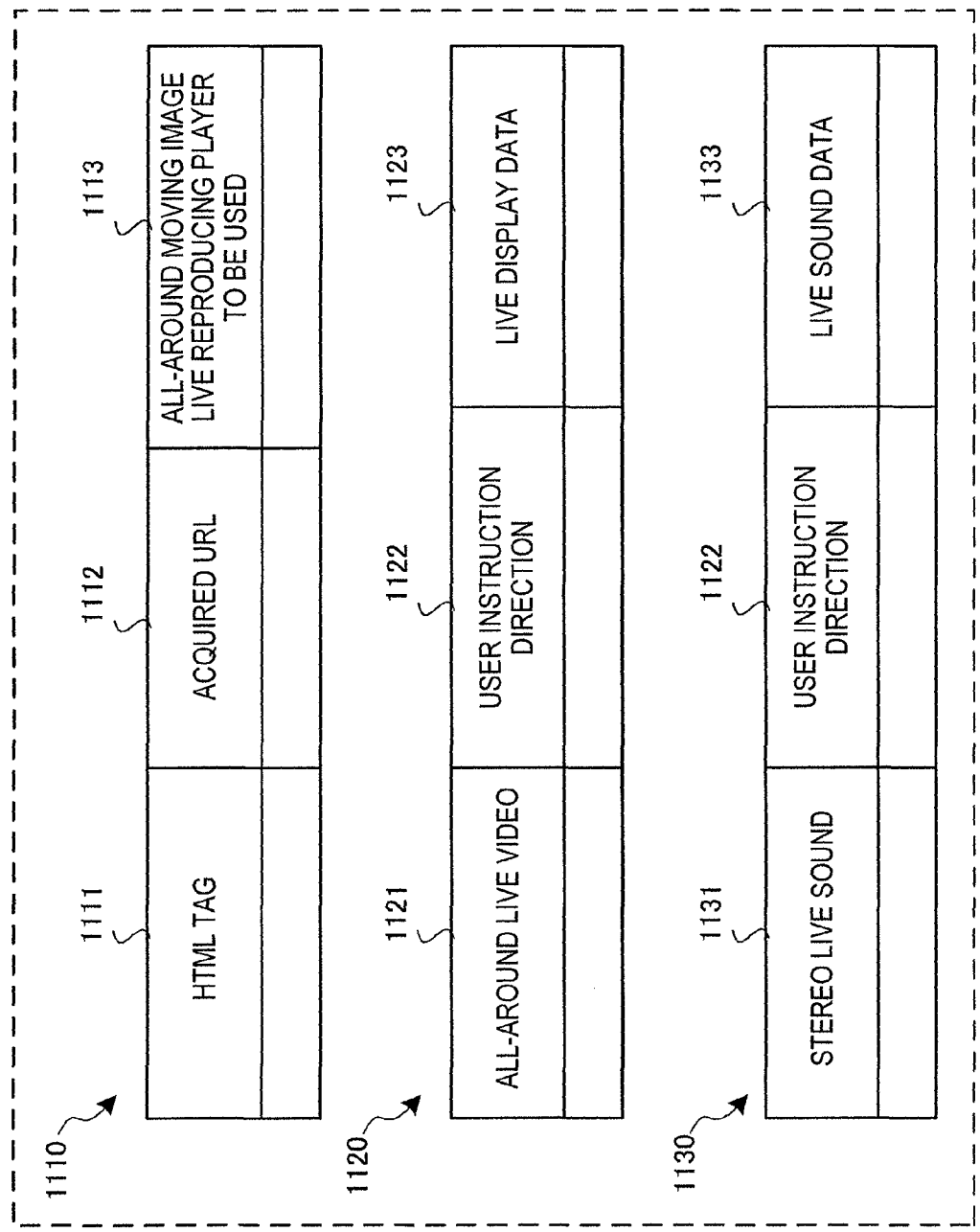
FIG. 11B shows tables of the live reproduction information, the moving image data structure, and sound data structure of an all-around moving image of the communication terminal according to the second embodiment of the present invention.

FIG. 11B shows tables of live reproduction information 1110, a moving image data structure 1120, and a sound data structure 1130 of the all-around moving image of the communication terminal 340 according to this embodiment. The live reproduction information 1110 in FIG. 11B is information for implementing all-around moving image live reproduction from a homepage. The moving image data structure 1120 in FIG. 11B is the storage structure of the all-around live moving image. The sound data structure 1130 in FIG. 11B is the storage structure of the stereoscopic sound.

The live reproduction information 1110 stores an HTML tag 1111 pasted on the homepage, and a URL 1112 for accessing the live moving image data acquired from the data distribution server 350 based on the HTML tag 1111. The live reproduction information 1110 also stores an all-around moving image live reproducing player 1113 to be used to perform all-around moving image live reproduction in the communication terminal 340. The moving image data structure 1120 stores live display data 1123 which has been selected from an all-around live video 1121 pasted on the sphere 1100 shown in FIG. 11A in accordance with a user instruction direction (line-of-sight direction) 1122. The sound data structure 1130 stores live sound data 1133 whose mixing ratio has been changed in accordance with the user instruction direction (line-of-sight direction) 1122 from a distributed stereo live sound 1131.

Note that live moving image display and live sound output can be synchronized with each other using time stamps although a detailed description thereof will be omitted. If a user instruction of a display range by a zoom-in or zoom-out operation is sent, the user instruction range (zoom-in/zoom-out) is stored, and the live display data 1123 and the live sound data 1133 store data corresponding to the user instruction direction and user instruction range.

<<Hardware Arrangement of Image Capturing/Distribution PC>>

Figure 12:
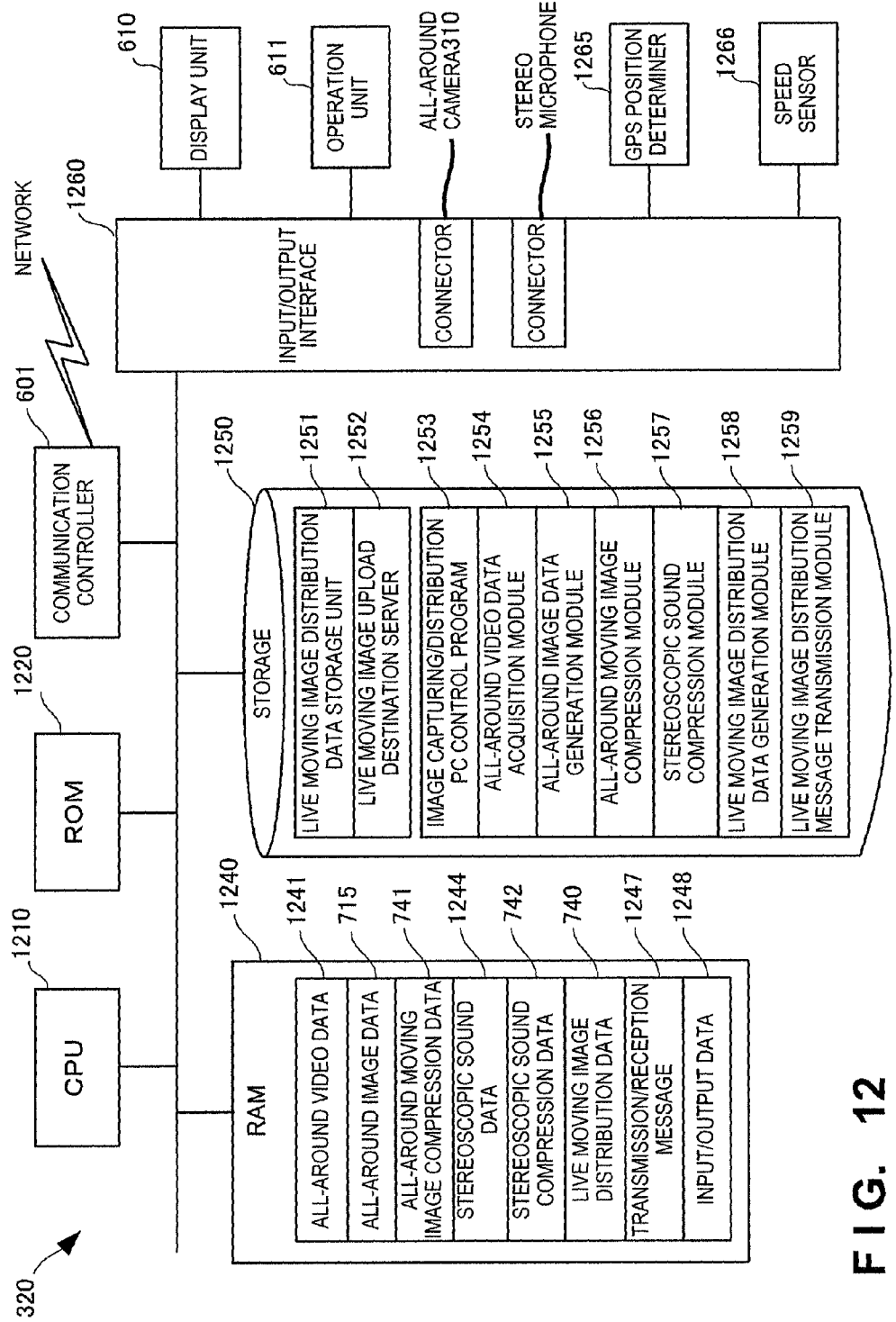
FIG. 12 is a block diagram showing the hardware arrangement of the image capturing/distribution PC according to the second embodiment of the present invention.

FIG. 12 is a block diagram showing the hardware arrangement of the image capturing/distribution PC 320 according to this embodiment.

Referring to FIG. 12, a CPU 1210 is an arithmetic control processor, and implements the functional components of the image capturing/distribution PC 320 shown in FIG. 6 by executing programs. A ROM (Read Only Memory) 1220 stores permanent data such as initial data and programs. The communication controller 601 communicates with another communication terminal and each server via a network. Note that the number of CPUs 1210 is not limited to one, and a plurality of CPUs or a GPU for image processing may be included. The communication controller 601 also desirably includes a CPU independent of the CPU 1210 and writes or reads transmission/reception data in or from an area of a RAM 1240. In addition, a DMAC (not shown) which transfers data between the RAM 1240 and a storage 1250 is desirably provided. Furthermore, an input/output interface 1260 desirably includes a CPU independent of the CPU 1210 and writes or reads input/output data in or from an area of the RAM 1240. Therefore, the CPU 1210 recognizes that data is received by or transferred to the RAM 1240, and processes the data. The CPU 1210 prepares a processing result in the RAM 1240, and leaves the subsequent transmission or transfer to the communication controller 601, the DMAC, or the input/output interface 1260.

The RAM 1240 is a random access memory used by the CPU 1210 as a work area for temporary storage. An area to store data necessary for implementation of the embodiment is allocated to the RAM 1240. All-around video data 1241 are moving image data from the six image sensors, which have been acquired from the all-around camera 310. The all-around image data 715 is the all-around data of one frame generated from the all-around video data 1241. The all-around moving image compression data 741 is moving image data obtained by performing, for the all-around image data 715, predetermined compression coding which allows live reproduction. Stereoscopic sound data 1244 are sound data acquired from a plurality of microphones. The stereoscopic sound compression data 742 is sound data obtained by performing, for the stereoscopic sound data 1244, predetermined compression coding which allows live reproduction. The live moving image distribution data 740 includes the all-around moving image compression data 741 and the stereoscopic sound compression data 742, and is distribution data in a format which can be distributed live. A transmission/reception message 1247 is a message transmitted/received via the communication controller 601. Input/output data 1248 is data input/output via the input/output interface 1260.

The storage 1250 stores databases, various kinds of parameters, and the following data and programs necessary for implementation of the embodiment. A live moving image distribution data storage unit 1251 is a database which identifiably stores the live moving image distribution data 740 to be uploaded to the live moving image distribution server 330. A live moving image upload destination server 1252 indicates the address of the live moving image distribution server 330 to which the image capturing/distribution PC 320 uploads the live moving image distribution data 740.

The storage 1250 stores the following programs. An image capturing/distribution PC control program 1253 is a control program for controlling the overall image capturing/distribution PC 320. An all-around video data acquisition module 1254 is a module for acquiring the all-around video data 1241 from the all-around camera 310. An all-around image data generation module 1255 is a module for generating all-around image data for each frame based on the acquired all-around video data 1241. An all-around moving image compression module 1256 is a module for compressing an all-around moving image formed from the all-around image data. A stereoscopic sound compression module 1257 is a module for generating the stereoscopic sound compression data 742 based on the stereoscopic sound data 1244 acquired from the stereo microphone. A live moving image distribution data generation module 1258 is a module for generating the live moving image distribution data 740 which includes the all-around moving image compression data 741 and the stereoscopic sound compression data 742 and can be distributed live. A live moving image distribution message transmission module 1259 is a module for uploading the generated live moving image distribution data 740 to the live moving image distribution server 330 using the information of the live moving image upload destination server 1252 by the live moving image distribution message.

The input/output interface 1260 interfaces input/output data with an input/output device. The input/output interface 1260 includes an IEEE-1394b connector or USB connector for connection to the all-around camera 310, and a connector connectable to the stereo microphone. The input/output interface 1260 is connected to the display unit 610 and the operation unit 611. The input/output interface 1260 may also be connected to a GPS position determiner 1265, and connected to a speed sensor 1266 for measuring a moving speed when the image capturing/distribution PC 320 moves along with the movement of the all-around camera 310.

Note that FIG. 12 shows the arrangement in which the moving image data from the all-around camera 310, the sound data from the stereo microphone, GPS position information, or information of the speed sensor or the like is acquired via the input/output interface 1260. However, these pieces of information may be acquired by communication via the communication controller 601. Note that programs and data which are associated with the general-purpose functions of the image capturing/distribution PC 320 and other feasible functions are not shown in the RAM 1240 or the storage 1250 of FIG. 12.

<<Processing Procedure of Image Capturing/Distribution PC>>

FIG. 13 is a flowchart illustrating the processing procedure of the image capturing/distribution PC 320 according to this embodiment. This flowchart is executed by the CPU 1210 of FIG. 12 using the RAM 1240, thereby implementing the functional components of FIG. 6.

In step S1311, the image capturing/distribution PC 320 determines whether moving image data have been received from the all-around camera 310. If the moving image data have been received, the image capturing/distribution PC 320 generates, in step S1313, all-around image data of one frame from the received six moving image data. In step S1315, the image capturing/distribution PC 320 holds, as an all-around moving image, in a frame order, a length of the all-around image data which can be distributed live. If no moving image data have been received from the all-around camera 310, the image capturing/distribution PC 320 advances to step S1321 to determine a sound input.

In step S1321, the image capturing/distribution PC 320 determines whether sound data has been received from the stereo microphone 370. If the sound data has been received, the image capturing/distribution PC 320 holds, in step S1323, a length of the received stereoscopic sound data which can be distributed live. Note that the held length is desirably a length corresponding to the frame length of the all-around image data. If no sound data has been received, the image capturing/distribution PC 320 advances to step S1331.

In step S1331, the image capturing/distribution PC 320 determines whether the current timing is the transmission timing of the live moving image distribution message. If the current timing is not the transmission timing of the live moving image distribution message which allows live moving image distribution, the image capturing/distribution PC 320 returns to step S1311 to receive and hold the moving image data or sound data; otherwise, the image capturing/distribution PC 320 generates, in step S1333, an all-around moving image message from the held all-around moving image data. In step S1335, the image capturing/distribution PC 320 generates a stereoscopic sound message from the held stereoscopic sound data. In step S1337, the image capturing/distribution PC 320 generates a live moving image distribution message including the all-around moving image message and the stereoscopic sound message. In step S1339, the image capturing/distribution PC 320 uploads the generated live moving image distribution message to the live moving image distribution server 330. In step S1341, the image capturing/distribution PC 320 determines whether live distribution has ended. If live distribution has not ended, the image capturing/distribution PC 320 returns to step S1311 to repeat reception of all-around camera data and live moving image distribution.

<<Hardware Arrangement of Live Video Distribution Server>>

Figure 14:
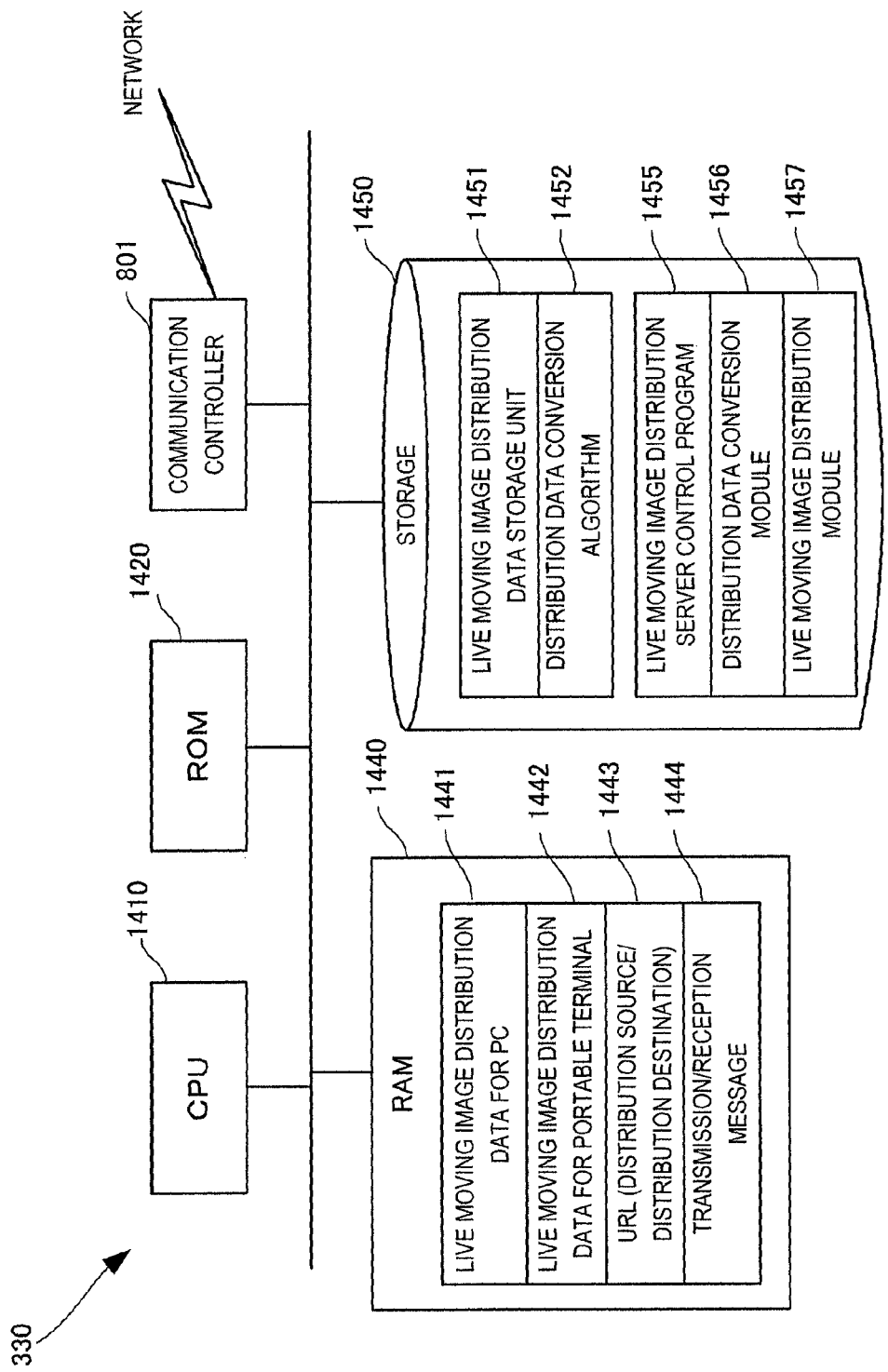
FIG. 14 is a block diagram showing the hardware arrangement of the live moving image distribution server according to the second embodiment of the present invention.

FIG. 14 is a block diagram showing the hardware arrangement of the live moving image distribution server 330 according to this embodiment.

Referring to FIG. 14, a CPU 1410 is an arithmetic control processor, and implements the functional components of the live moving image distribution server 330 shown in FIG. 8 by executing programs. A ROM 1420 stores permanent data such as initial data and programs. The communication controller 801 communicates with the communication terminal and the image capturing/distribution PC via a network. Note that the number of CPUs 1410 is not limited to one, and a plurality of CPUs or a GPU for image processing may be included. The communication controller 801 desirably includes a CPU independent of the CPU 1410 and writes or reads transmission/reception data in or from an area of a RAM 1440. In addition, a DMAC (not shown) which transfers data between the RAM 1440 and a storage 1450 is desirably provided. Therefore, the CPU 1410 recognizes that data is received by or transferred to the RAM 1440, and processes the data. The CPU 1410 prepares a processing result in the RAM 1440, and leaves the subsequent transmission or transfer to the communication controller 801 or the DMAC.

The RAM 1440 is a random access memory used by the CPU 1410 as a work area for temporary storage. An area to store data necessary for implementation of the embodiment is allocated to the RAM 1440. Live moving image distribution data 1441 for a PC is data which is uploaded from the image capturing/distribution PC 320 and distributed for a PC. Live moving image distribution data 1442 for a portable terminal is data which is uploaded from the image capturing/distribution PC 320 and distributed for a portable terminal. In this embodiment, the live moving image distribution data 1441 for the PC is the data uploaded from the image capturing/distribution PC 320, and the live moving image distribution data 1442 for the portable terminal is data converted into the HLS format. A URL (distribution source/ distribution destination) 1443 is information for associating a URL from a distribution source as the image capturing/distribution PC 320 or a URL from a distribution destination as each of the communication terminals 341 to 343 with the storage position of the live moving image distribution data 1441 or 1442. A transmission/reception message 1444 is a message transmitted/received via the communication controller 801.

The storage 1450 stores databases, various kinds of parameters, and the following data and programs necessary for implementation of the embodiment. A live moving image distribution data storage unit 1451 is an area to store the live moving image distribution data uploaded from the image capturing/distribution PC 320 so as to be accessed by a URL. A distribution data conversion algorithm 1452 is an algorithm for converting the live moving image distribution data into the HLS format.

The storage 1450 stores the following programs. A live moving image distribution server control program 1455 is a control program for controlling the overall live moving image distribution server 330. A distribution data conversion module 1456 is a module for changing the compression coding method of the live moving image distribution data and performing conversion into the HLS format when the distribution destination is a portable terminal such as a smartphone or tablet. A live moving image distribution module 1457 is a module for distributing the live moving image distribution message to the distribution destination.

Note that programs and data which are associated with the general-purpose functions of the live moving image distribution server 330 and other feasible functions are not shown in the RAM 1440 or the storage 1450 of FIG. 14.

<<Processing Procedure of Live Video Distribution Server>>

FIG. 15 is a flowchart illustrating the processing procedure of the live moving image distribution server 330 according to this embodiment. This flowchart is executed by the CPU 1410 of FIG. 14 using the RAM 1440, thereby implementing the functional components of FIG. 8.

In step S1511, the live moving image distribution server 330 determines whether a live moving image distribution data upload request has been received from the image capturing/distribution PC 320 as the distribution source. If the live moving image distribution data upload request has been received from the distribution source, the live moving image distribution server 330 acquires a live moving image distribution message in step S1513. In step S1515, the live moving image distribution server 330 holds the live moving image distribution data as live moving image distribution data for a PC based on the URL. In step S1517, the live moving image distribution server 330 generates live moving image distribution data in a different format corresponding to another model. The live moving image distribution server 330 then holds, as live moving image distribution data for a portable terminal, the live moving image distribution data generated based on the URL.

If no live moving image distribution message has been received from the image capturing/distribution PC 320 as the distribution source, the live moving image distribution server 330 determines, in step S1521, whether a live moving image distribution message distribution request has been received from the communication terminal 340 as the distribution destination. If the live moving image distribution message distribution request has been received from the communication terminal 340 as the distribution destination, the live moving image distribution server 330 acquires, in step S1523, the storage location of the live moving image distribution data from the URL. In step S1525, the live moving image distribution server 330 reads out the live moving image distribution data. In step S1527, the live moving image distribution server 330 distributes the live moving image distribution message to the distribution destination by unicast.

<<Hardware Arrangement of Communication Terminal>>

FIG. 16 is a block diagram showing the hardware arrangement of the communication terminal 340 according to this embodiment.

Referring to FIG. 16, a CPU 1610 is an arithmetic control processor, and implements the functional components of the communication terminal 340 shown in FIG. 10 by executing programs. A ROM 1620 stores permanent data such as initial data and programs. The communication controller 1001 communicates with another communication terminal and each server via a network. Note that the number of CPUs 1610 is not limited to one, and a plurality of CPUs or a GPU for image processing may be included. The communication controller 1001 desirably includes a CPU independent of the CPU 1610 and writes or reads transmission/reception data in or from an area of a RAM 1640. In addition, a DMAC (not shown) which transfers data between the RAM 1640 and a storage 1650 is desirably provided. Furthermore, an input/output interface 1660 desirably includes a CPU independent of the CPU 1610 and writes or reads input/output data in or from an area of the RAM 1640. Therefore, the CPU 1610 recognizes that data is received by or transferred to the RAM 1640, and processes the data. The CPU 1610 prepares a processing result in the RAM 1640, and leaves the subsequent transmission or transfer to the communication controller 1001, the DMAC, or the input/output interface 1660.

The RAM 1640 is a random access memory used by the CPU 1610 as a work area for temporary storage. An area to store data necessary for implementation of the embodiment is allocated to the RAM 1640. Live moving image distribution data 1641 is data distributed from the live moving image distribution server 330. The reproduced all-around live video 1121 is a live moving image reproduced from the live moving image distribution data 1641, and corresponds to the all-around live moving image in FIG. 11B. The reproduced stereo live sound 1131 is a live sound reproduced from the live moving image distribution data 1641. The user instruction direction 1122 is the viewing direction of the all-around moving image of the user instructed from the operation unit 1022. The live display data 1123 in the instruction direction is display data selected and displayed from the reproduced all-around live video 1121 in accordance with the user instruction direction 1122. The live sound data 1133 in the instruction direction is sound data mixed and changed from the reproduced stereo live sound 1131 in accordance with the user instruction direction 1122. A transmission/reception message 1648 is a message transmitted/received via the communication controller 1001. Input/output data 1649 is data input/output via the input/output interface 1660. Note that although not shown, due to a change in display range (zoom-in/zoom-out), the RAM 1640 stores the user instruction range, the live display data 1123 in the instruction direction stores the instruction direction and the live display data of the instruction range, and the live sound data 1133 in the instruction direction stores the instruction direction and the live sound data of the instruction range.

The storage 1650 stores databases, various kinds of parameters, and the following data and programs necessary for implementation of the embodiment. User authentication data 1651 is user authentication data used to activate the all-around moving image live reproducing player from the communication terminal 340 or determine whether to allow access to the live moving image itself. Terminal authentication data 1652 is terminal authentication data used to activate the all-around moving image live reproducing player from the communication terminal 340.

The storage 1650 stores the following programs. A communication terminal control program 1653 is a control program for controlling the overall communication terminal 340. An all-around moving image live reproducing player 1655 is an application for performing live reproduction of the all-around moving image distributed from the live moving image distribution server 330. The all-around moving image live reproducing player 1655 includes a distribution data acquisition module 1656, an all-around moving image reproduction module 1657, a stereoscopic sound reproduction module 1658, and a user instruction control module 1659. The distribution data acquisition module 1656 is a module for acquiring data distributed from the live moving image distribution server 330. The all-around moving image reproduction module 1657 is a module for performing live reproduction of the all-around moving image from the distributed data. The stereoscopic sound reproduction module 1658 is a module for reproducing a stereoscopic sound from the distributed data in synchronism with the live reproduction of the all-around moving image. The user instruction control module 1659 is a module for controlling the display direction and display range (zoom-in/zoom-out) of the all-around moving image in accordance with a user instruction.

The input/output interface 1660 interfaces input/output data with an input/output device. The input/output interface 1660 is connected to the display unit 1021, the operation unit 1022, and the sound output unit 1023. The input/output interface 1660 is also connected to a sound input unit 1664 and a GPS position determiner 1665.

Note that programs and data which are associated with the general-purpose functions of the communication terminal 340 and other feasible functions are not shown in the RAM 1640 or the storage 1650 of FIG. 16.

<<Processing Procedure of Communication Terminal>>

Figure 17A:
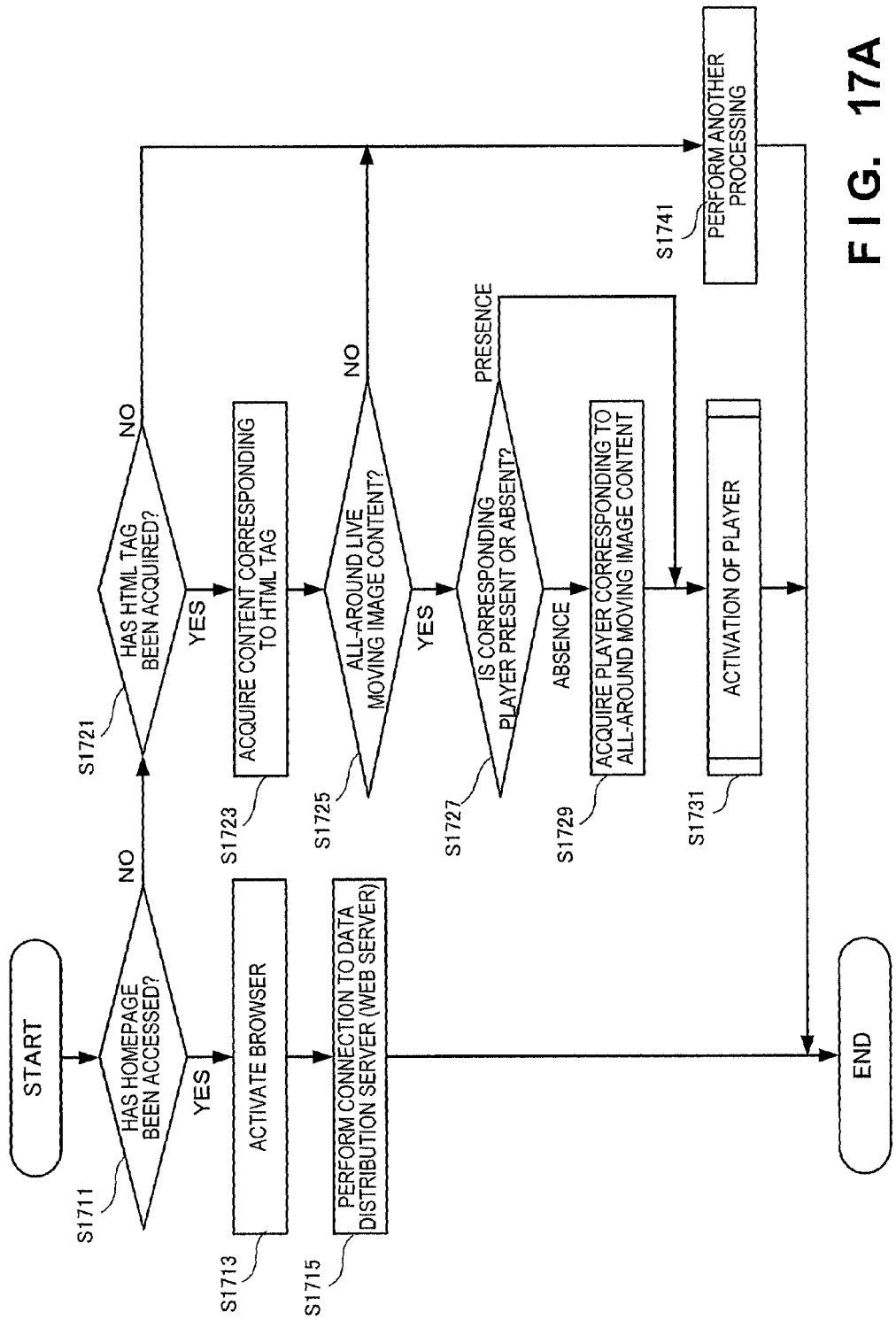
FIG. 17A is a flowchart illustrating the processing procedure of the communication terminal according to the second embodiment of the present invention.

FIG. 17A is a flowchart illustrating the processing procedure of the communication terminal 340 according to this embodiment. This flowchart is executed by the CPU 1610 of FIG. 16 using the RAM 1640, thereby implementing the functional components of FIG. 10.

In step S1711, the communication terminal 340 determines whether the homepage has been accessed. If the homepage has been accessed, the communication terminal 340 activates a browser in step S1713. In step S1715, the communication terminal 340 is connected to the data distribution server 350.

If the homepage has not been accessed, the communication terminal 340 determines in step S1721, whether an HTML tag has been acquired. This example assumes that an HTML tag pasted on the homepage of a desired site has been clicked. However, a reproduction request operation is not limited to this.

If the HTML tag has been acquired, the communication terminal 340 acquires a content corresponding to the HTML tag in step S1723. In step S1725, the communication terminal 340 determines whether the acquired content is an all-around live moving image content. If the acquired content is an all-around live moving image content, the communication terminal 340 determines, in step S1727, the presence/absence of an appropriate player to reproduce the all-around live moving image content in real time. If an appropriate player is included, the communication terminal 340 advances to step S1731 to activate the all-around moving image live reproducing player; otherwise, the communication terminal 340 acquires, in step S1729, an all-around moving image live reproducing player having a function corresponding to the all-around live moving image content to be reproduced. Note that the number of correspondences between all-around live moving image contents and players is not limited to one. In the communication terminal, the information of the all-around live moving image content is desirably associated with a maximally usable player. Note that as described above, if an optimum player is installed on the terminal, it is not necessary to newly acquire a player. The user may select a player to be used.

In step S1731, the communication terminal 340 activates the acquired all-around moving image live reproducing player. The all-around moving image live reproducing player activated by the communication terminal 340 receives distribution of a desired all-around live moving image content from the live moving image distribution server 330 and the data distribution server 350 based on the HTML tag, and outputs a moving image in a direction corresponding to a user instruction from the all-around moving image reproduced live.

If the homepage has not been accessed and the HTML tag has not been acquired, or the acquired content is not the all-around live moving image content, the communication terminal 340 performs another processing in step S1741.

(Processing Procedure of All-Around Moving Image Live Reproducing Player)

Figure 17B:
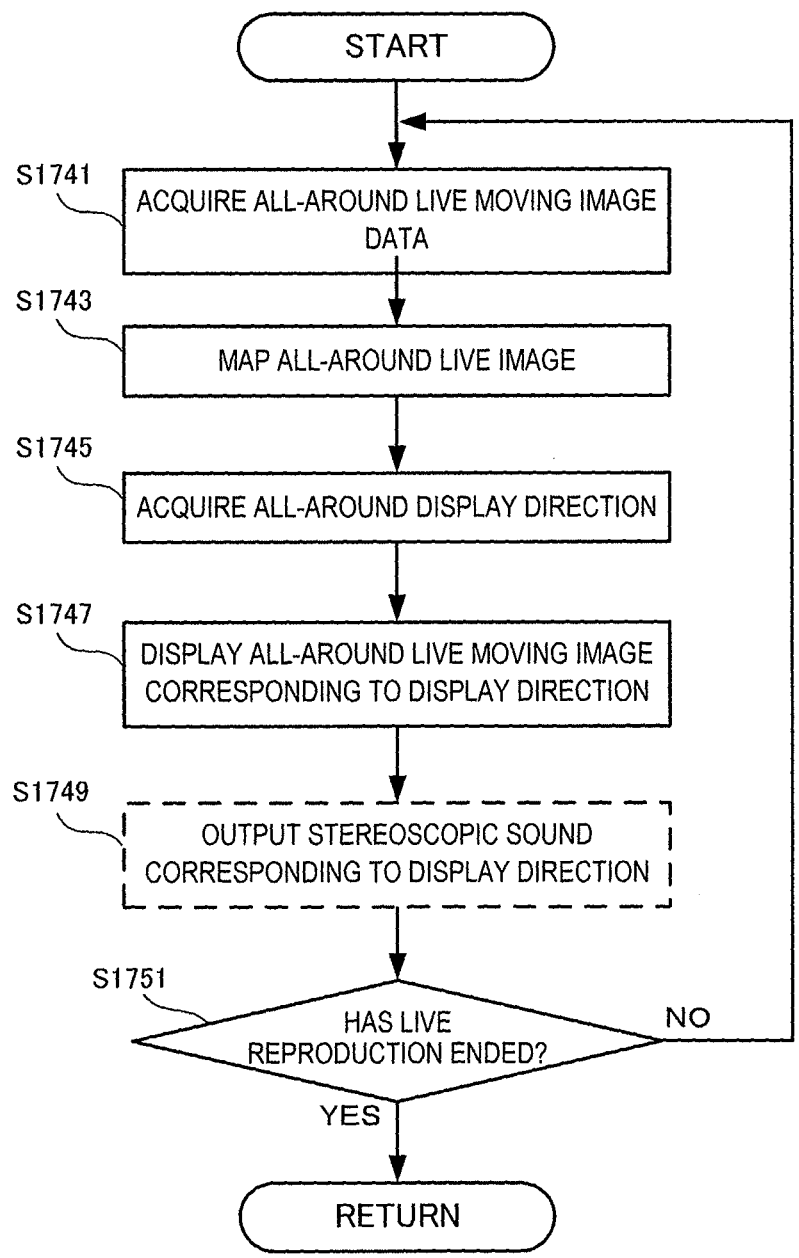
FIG. 17B is a flowchart illustrating the processing procedure of an all-around moving image live reproducing player according to the second embodiment of the present invention.

FIG. 17B is a flowchart illustrating the detailed procedure of the processing in step S1731 by the all-around moving image live reproducing player 1010 according to this embodiment. This flowchart is also executed by the CPU 1610 of FIG. 16 using the RAM 1640 but will be described below as the processing procedure of the all-around moving image live reproducing player 1010.

In step S1741, the all-around moving image live reproducing player 1010 acquires the all-around live moving image data from the live moving image distribution server 330. In step S1743, the all-around moving image live reproducing player 1010 maps the all-around images of the respective frames of the all-around moving image in the acquired all-around live moving image data on the sphere surrounding the user's viewpoint by 360°. In step S1745, the all-around moving image live reproducing player 1010 acquires the display direction of the all-around moving image instructed by the user. In step S1747, the all-around moving image live reproducing player 1010 displays the live moving image in the display direction instructed by the user in the all-around image sequence mapped on the sphere. If a stereoscopic sound is synchronously output, the all-around moving image live reproducing player 1010 adjusts, in step S1749, the stereoscopic sound to that when facing in the display direction, and outputs the adjusted stereoscopic sound in synchronism with the live moving image in the display direction instructed by the user. Note that if the display range (zoom-in/zoom-out) is instructed, the all-around moving image live reproducing player 1010 acquires, in step S1745, the display range of the all-around moving image instructed by the user, and displays, in step S1747, a live moving image of the instruction range in the instructed displayed direction. In step S1749, the all-around moving image live reproducing player 1010 adjusts the stereoscopic sound to that corresponding to the display direction and display range, and outputs the adjusted stereoscopic sound in synchronism with the displayed live moving image.

In step S1751, the all-around moving image live reproducing player 1010 determines whether live reproduction has ended (the player has stopped). If live reproduction has not ended, the all-around moving image live reproducing player 1010 returns to step S1741 to repeat live reproduction of the all-around moving image.

According to this embodiment, when an all-around moving image from the all-around camera is formed to be distributed live, and the display direction is changed in accordance with a line-of-sight direction instruction of the user, the user views the all-around moving image live in accordance with the line-of-sight direction, thereby allowing moving image viewing with realism.

[Third Embodiment]

An all-around moving image live distribution system according to the third embodiment of the present invention will be described next. The all-around moving image live distribution system according to this embodiment is different from that of the second embodiment in that an all-around camera and an image capturing/distribution PC perform live distribution of an all-around moving image while moving. Note that this embodiment will describe an example in which an all-around camera is installed in an escort vehicle following a runner in a marathon race and an image capturing/distribution PC performs distribution. The remaining components and operations are the same as those in the second embodiment. Hence, the same reference numerals denote the same components and operations, and a detailed description thereof will be omitted.

<<All-Around Moving Image Live Distribution System>>

Figure 18:
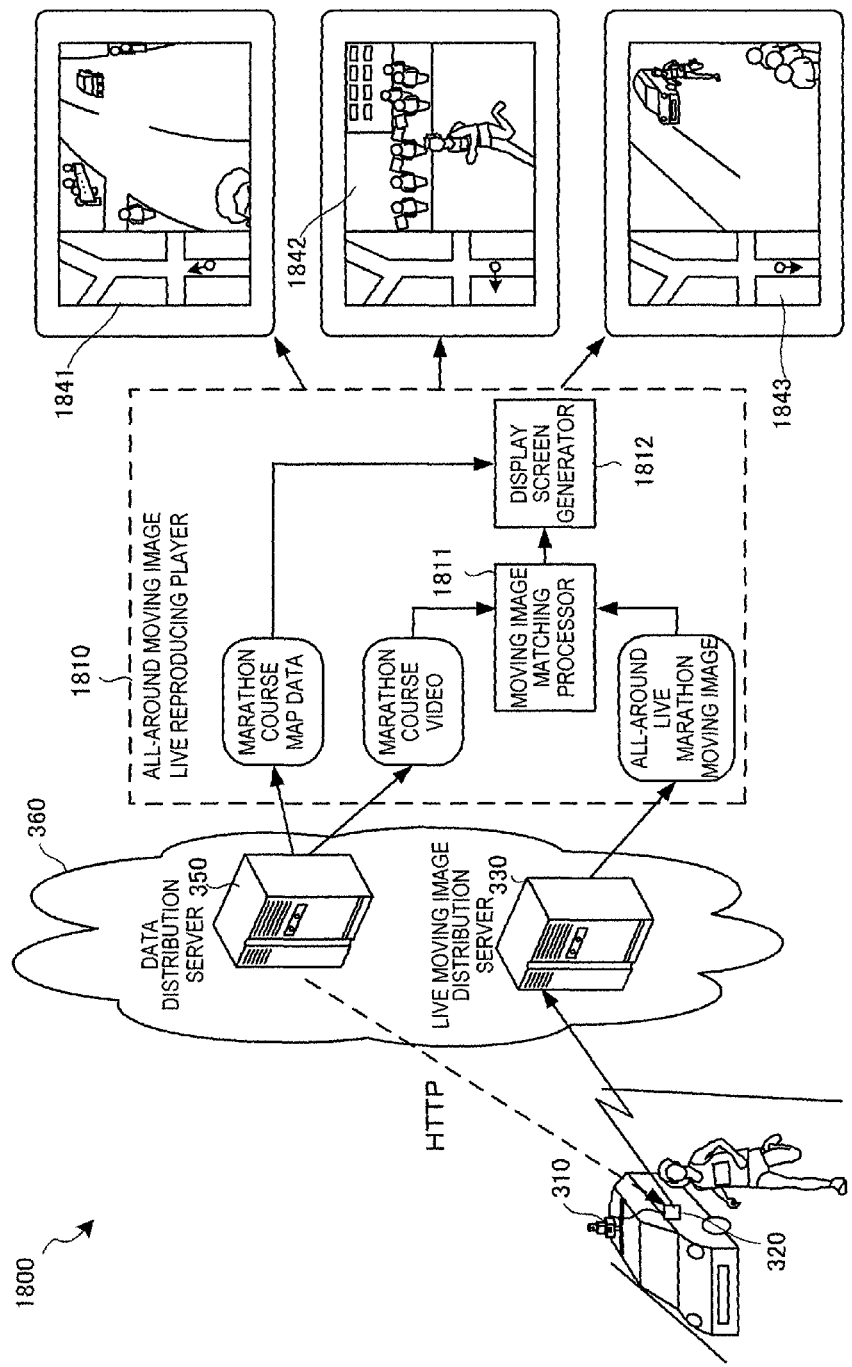
FIG. 18 is a view showing an outline of the processing of an all-around moving image live distribution system according to the third embodiment of the present invention.

FIG. 18 is a view showing an outline of the processing of an all-around moving image live distribution system 1800 according to this embodiment. Note that in FIG. 18, the same reference numerals as in FIG. 3A or 10 denote the same components and a description thereof will be omitted.

Referring to FIG. 18, an all-around camera 310 and an image capturing/distribution PC 320 are deployed in a vehicle and move. FIG. 18 shows an example in which live image capturing is performed by accompanying a marathon runner. Note that FIG. 18 illustrates no microphone but a live sound may be collected by a stereo microphone. In this case, an all-around moving image live reproducing player 1810 includes the same stereoscopic sound controller as that shown in FIG. 10, which controls output of a stereoscopic sound corresponding to an instruction direction and instruction range.

The all-around moving image live reproducing player 1810 is a player which takes the place of the all-around moving image live reproducing player 1010 shown in FIG. 10. Note that functional components associated with processing unique to this embodiment are shown in the all-around moving image live reproducing player 1810 of FIG. 18, and the functional components of the all-around moving image live reproducing player 1010 of FIG. 10 are not illustrated in order to avoid cumbersomeness. Each communication terminal selects the all-around moving image live reproducing player 1010 and the all-around moving image live reproducing player 1810 in correspondence with an all-around moving image content selected or viewed by the user. Alternatively, the all-around moving image live reproducing player 1010 and the all-around moving image live reproducing player 1810 including only the functions shown in FIG. 18 may be activated and made to cooperate with each other.

The all-around moving image live reproducing player 1810 includes a moving image matching processor 1811 and a display screen generator 1812. The moving image matching processor 1811 acquires, from a data distribution server 350, a moving image of a known marathon course as the moving path of the all-around camera 310. The moving image matching processor 1811 matches, with the moving image of the marathon course, an all-around live marathon moving image captured by the all-around camera 310 and distributed via a live moving image distribution server 330, and determines the current position of the all-around camera 310. The display screen generator 1812 acquires the map data of the marathon course from the data distribution server 350. Based on the information of the current position from the moving image matching processor 1811, the display screen generator 1812 adds, to the map data of the marathon course, the current position and the line-of-sight direction of a live moving image instructed by the user and displayed.

A live moving image 1841 is a moving image in front of the escort vehicle. A live moving image 1842 is a moving image of a street over the runner from the escort vehicle. A live moving image 1843 is a moving image of the next runner chasing behind the escort vehicle.

(Processing Data of Communication Terminal)

Figure 19:
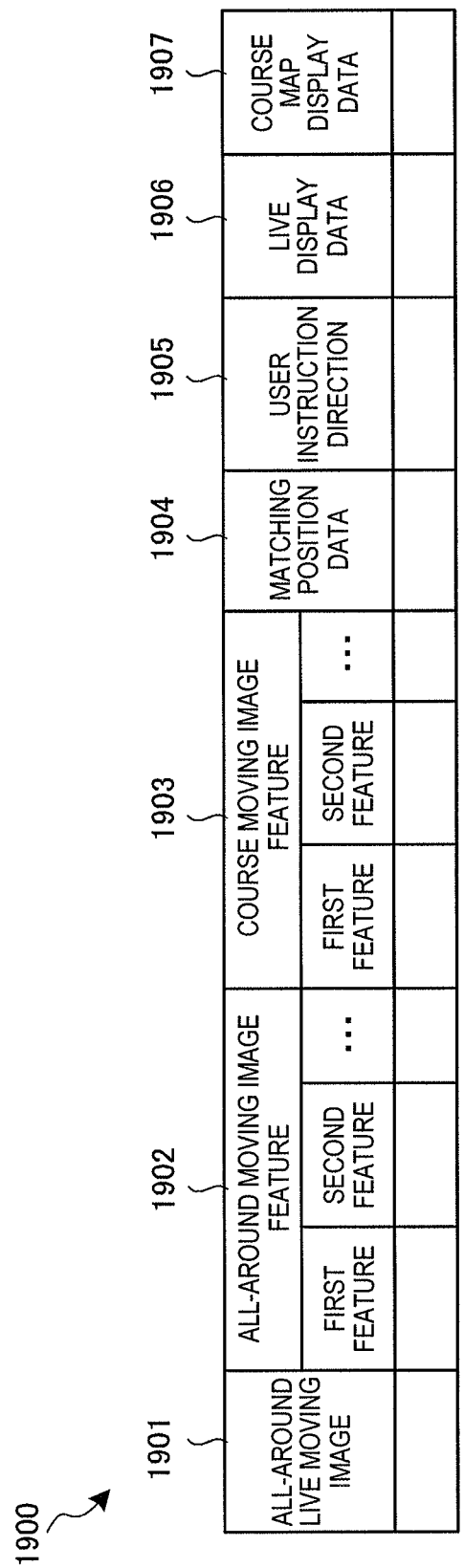
FIG. 19 is a table showing the structure of the processing data of a communication terminal according to the third embodiment of the present invention.

FIG. 19 is a table showing the structure of processing data 1900 of the communication terminal according to this embodiment. The processing data 1900 is data used to determine the current position at which an all-around live moving image is captured, and display the current position and the line-of-sight direction on a map. Note that the communication terminal also uses data shown in FIG. 11B. FIG. 19 shows no additional sound data but a sound can be added in the same manner.

The processing data 1900 stores an all-around live moving image 1901 reproduced from a live moving image distribution message distributed from the live moving image distribution server 330, a feature 1902 of the all-around live moving image 1901, and a feature 1903 of the marathon course moving image distributed from the data distribution server 350. The processing data 1900 also stores a current position 1904 determined by matching between the feature 1902 of the all-around live moving image 1901 and the feature 1903 of the marathon course moving image, and a line-of-sight direction 1905 instructed by the user. Furthermore, the processing data 1900 stores live display data 1906 in the line-of-sight direction 1905 instructed by the user, and course map display data 1907 obtained by displaying the current position 1904 on the map. Note that if a zoom-in or zoom-out operation is performed, the processing data 1900 also stores data of a user instruction range.

<<Processing Procedure of All-Around Moving Image Live Reproducing Player>>

Figure 20:
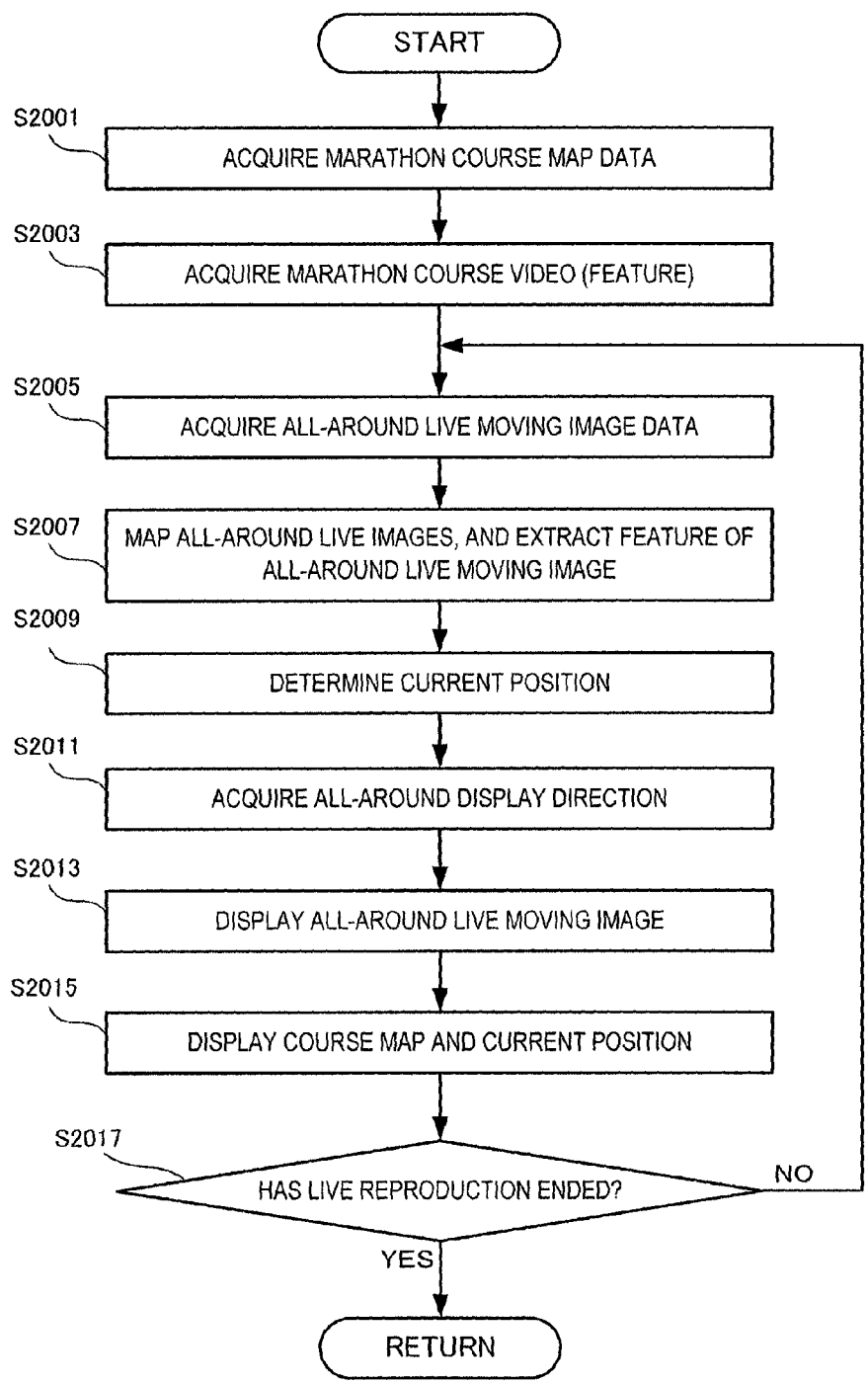
FIG. 20 is a flowchart illustrating the processing procedure of an all-around moving image live reproducing player according to the third embodiment of the present invention.

FIG. 20 is a flowchart illustrating the detailed procedure of the processing in step S1731 by the all-around moving image live reproducing player 1810 according to this embodiment. This flowchart is also executed by a CPU 1610 of FIG. 16 using a RAM 1640 but will be described below as the processing procedure of the all-around moving image live reproducing player 1810.

In step S2001, the all-around moving image live reproducing player 1810 acquires the map data of the marathon course from the data distribution server 350. In step S2003, the all-around moving image live reproducing player 1810 acquires the moving image of the marathon course from the data distribution server 350. Note that a feature calculated in advance by the data distribution server 350 may be acquired or a moving image may be acquired to calculate a feature in the communication terminal.

In step S2005, the all-around moving image live reproducing player 1810 acquires all-around live moving image data from the live moving image distribution server 330. In step S2007, the all-around moving image live reproducing player 1810 maps the all-around images of the respective frames of the all-around moving image in the acquired all-around live moving image data on a sphere surrounding the user's viewpoint by 360°. The all-around moving image live reproducing player 1810 extracts the features of the all-around images of the respective frames of the all-around moving image in the acquired all-around live moving image data. In step S2009, the all-around moving image live reproducing player 1810 matches the feature of the moving image of the marathon course with the features of the all-around images, thereby determining the current position at which the all-around camera 310 captures an image. Note that the current position may be determined not by all the communication terminals but by an image capturing/distribution PC or a current position determination player, and data obtained by linking the acquired position with a time stamp may be distributed from the data distribution server to each communication terminal.

In step S2011, the all-around moving image live reproducing player 1810 acquires the display direction of the all-around moving image instructed by the user. In step S2013, the all-around moving image live reproducing player 1810 displays the live moving image in the display direction instructed by the user in the all-around image sequence mapped on the sphere. If a stereoscopic sound is synchronously output, a stereoscopic sound when facing in the display direction is output in synchronism with the live moving image. At the same time, in step S2015, the all-around moving image live reproducing player 1810 displays the marathon course map on which the current position of the all-around camera 310 and the line-of-sight instruction direction are displayed. Note that if a display range (zoom-in/zoom-out) instruction is issued, the all-around moving image live reproducing player 1810 acquires, in step S2011, the display range of the all-around moving image instructed by the user, and displays, in step S2013, the live moving image of the instruction range in the instructed display direction, thereby outputting a stereoscopic sound corresponding to the display direction and display range.

In step S2017, the all-around moving image live reproducing player 1810 determines whether live reproduction has ended (the player has stopped). If live reproduction has not ended, the all-around moving image live reproducing player 1810 returns to step S2005 to repeat live reproduction of the all-around moving image.

According to this embodiment, by determining the current position of the moving all-around camera and displaying it on a map, the user can view a moving image with realism, and know the viewing direction and viewing position of the live moving image without GPS.

[Fourth Embodiment]

An all-around moving image live distribution system according to the fourth embodiment of the present invention will be described next. The all-around moving image live distribution system according to this embodiment is different from those of the second and third embodiments in that the user can select an all-around moving image from a desired one of a plurality of all-around cameras arranged at a plurality of points. The remaining components and operations are the same as those in the second and third embodiments. Hence, the same reference numerals denote the same components and operations, and a detailed description thereof will be omitted.

<<All-Around Moving Image Live Distribution System>>

Figure 21A:
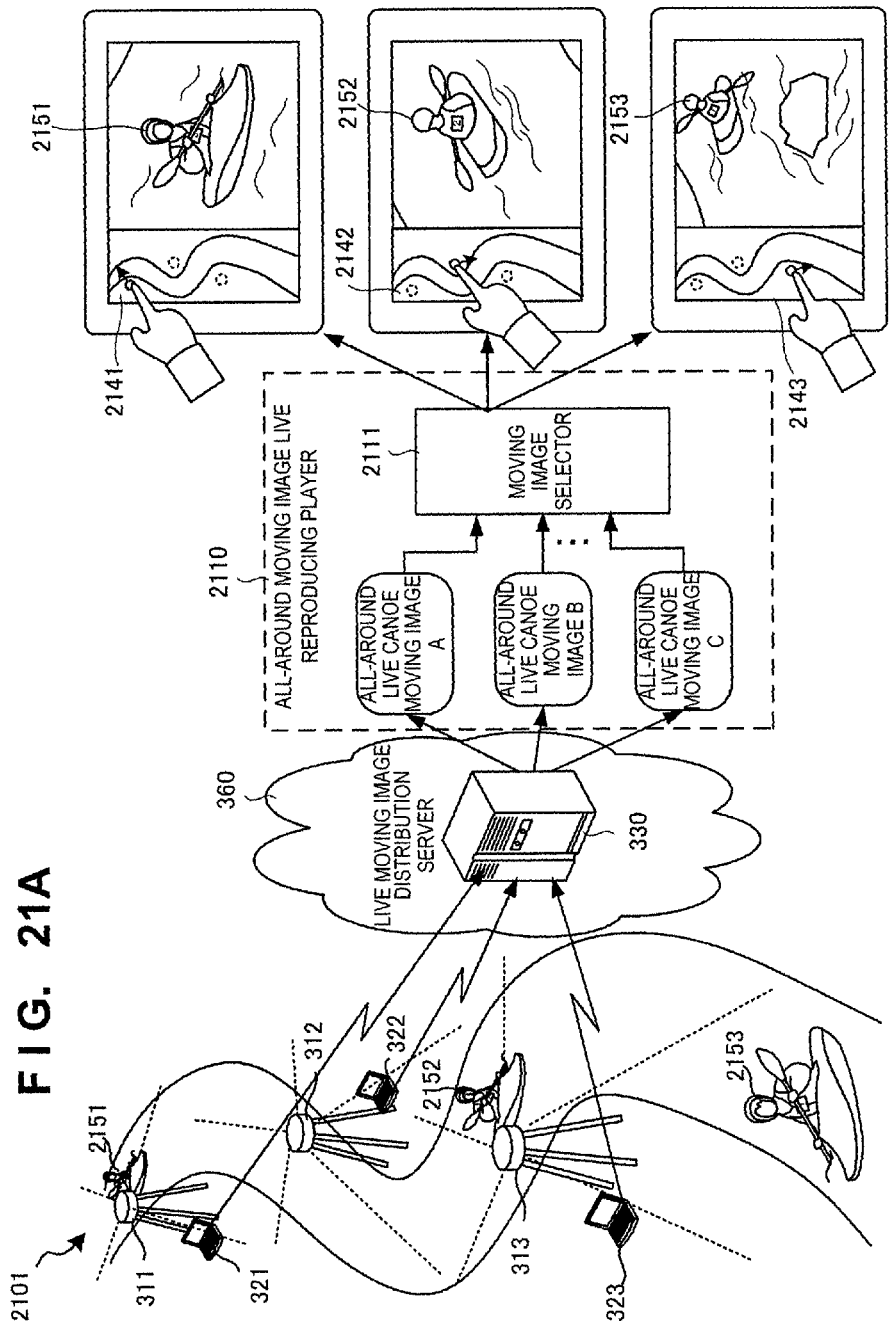
FIG. 21A is a view showing an outline of the processing of an all-around moving image live distribution system according to the fourth embodiment of the present invention.

FIG. 21A is a view showing an outline of the processing of an all-around moving image live distribution system 2101 according to this embodiment. Note that in FIG. 21A, the same reference numerals as in FIG. 3A, 10, or 18 denote the same components and a description thereof will be omitted. Each communication terminal selects all-around moving image live reproducing players 1010 and 1810 and the all-around moving image live distribution system 2101 in correspondence with an all-around moving image content selected or viewed by the user. Alternatively, the all-around moving image live reproducing player 1010, the all-around moving image live reproducing player 1810 having only the functions shown in FIG. 18, and the all-around moving image live distribution system 2101 having only functions shown in FIG. 21A may be activated in combination, and made to cooperate with each other.

Referring to FIG. 21A, a plurality of all-around cameras 311 to 313 and a plurality of image capturing/distribution PCs 321 to 323 corresponding to the all-around cameras are arranged at a plurality of points, and the user can select and view a plurality of all-around moving images. FIG. 21A shows an example in which live image capturing is performed for a canoe race at a plurality of points in a course. Note that FIG. 21A illustrates no microphone but a live sound may be collected by a stereo microphone. In this case, an all-around moving image live reproducing player 2110 includes the same stereoscopic sound controller as that shown in FIG. 10, which controls output of a stereoscopic sound corresponding to an instruction direction and instruction range.

The all-around moving image live reproducing player 2110 is a player which takes the place of the all-around moving image live reproducing player 1010 shown in FIG. 10 or the all-around moving image live reproducing player 1810 shown in FIG. 18. Note that a functional component associated with processing unique to this embodiment is shown in the all-around moving image live reproducing player 2110 of FIG. 21A, and the functional components of the all-around moving image live reproducing player 1010 of FIG. 10 or the all-around moving image live reproducing player 1810 of FIG. 18 are not illustrated in order to avoid cumbersomeness.

The all-around moving image live reproducing player 2110 includes a moving image selector 2111. The moving image selector 2111 selects one of all-around live canoe moving images A, B, and C in accordance with a user selection instruction, and distributes it to the communication terminal. All-around live canoe moving image A is a live moving image captured by the all-around camera 311 and distributed via a live moving image distribution server 330. All-around live canoe moving image B is a moving image captured by the all-around camera 312 and distributed via the live moving image distribution server 330. All-around live canoe moving image C is a moving image captured by the all-around camera 313 and distributed via the live moving image distribution server 330.

A live moving image 2141 is a moving image in the direction of a canoeist 2151 captured by the all-around camera 311. A live moving image 2142 is a moving image in the direction of a canoeist 2152 captured by the all-around camera 312. A live moving image 2143 is a moving image in the direction of a canoeist 2153 captured from the all-around camera 313. The user can select, from the three live moving images, an all-around moving image to view.

Figure 21B:
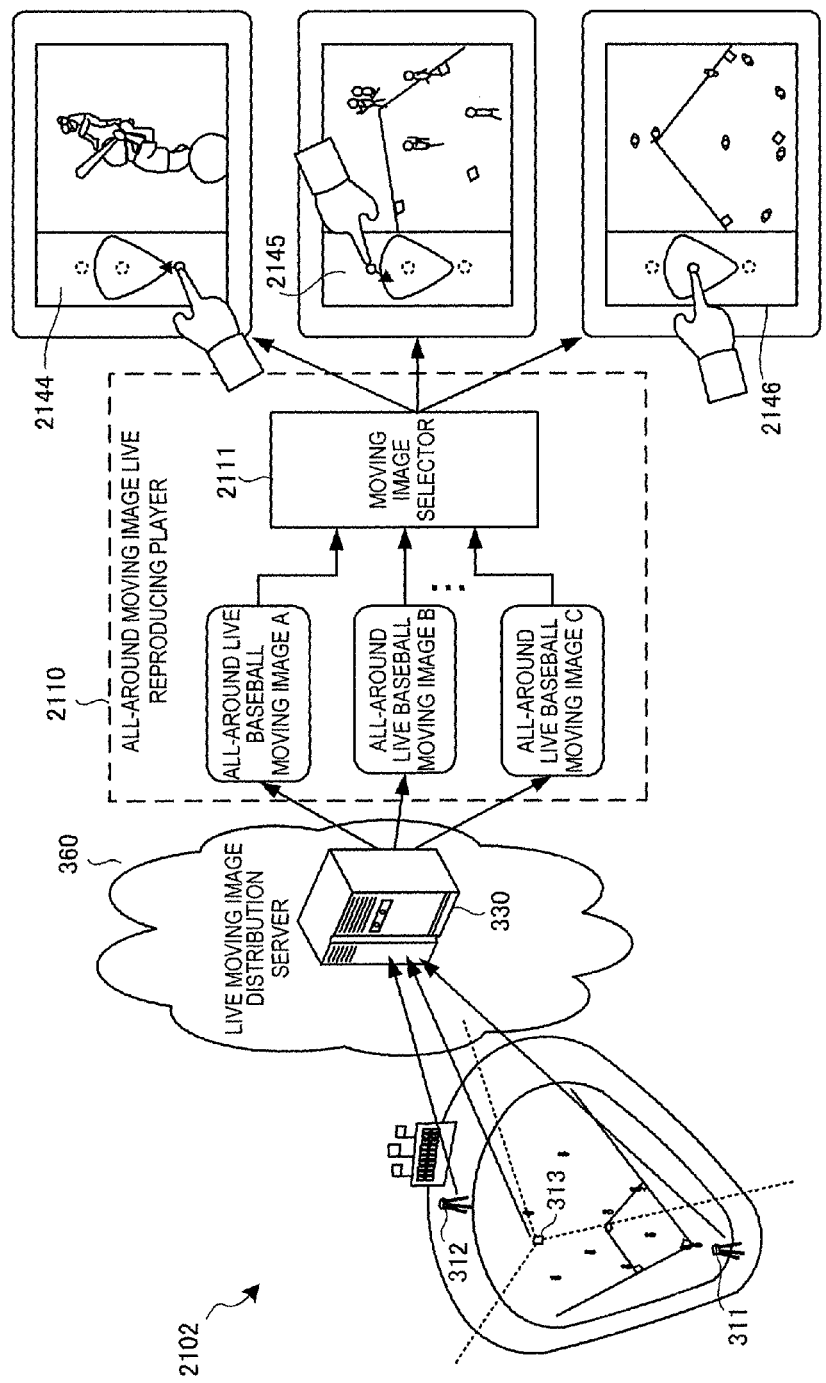
FIG. 21B is a view showing an outline of the processing of an all-around moving image live distribution system according to the fourth embodiment of the present invention.

FIG. 21B is a view showing an outline of the processing of an all-around moving image live distribution system 2102 according to this embodiment. Note that in FIG. 21B, the same reference numerals as in FIG. 3A, 10, 18, or 21A denote the same components and a description thereof will be omitted. Each communication terminal selects the all-around moving image live reproducing players 1010, 1810, and 2102 in correspondence with an all-around moving image content selected or viewed by the user. Alternatively, the all-around moving image live reproducing player 1010, the all-around moving image live reproducing player 1810 having only the functions shown in FIG. 18, and the all-around moving image live distribution system 2102 having only functions in FIG. 21B may be activated in combination, and made to cooperate with each other.

Referring to FIG. 21B, the plurality of all-around cameras 311 to 313 are arranged at a plurality of points, and the user can select and view a plurality of all-around moving images. FIG. 21B shows an example in which live image capturing is performed for a game at a plurality of points in a ballpark. Note that FIG. 21B shows no image capturing/distribution PC. FIG. 21B illustrates no microphone but a live sound may be collected by a stereo microphone. In this case, the all-around moving image live reproducing player 2110 includes the same stereoscopic sound controller as that shown in FIG. 10, which controls output of a stereoscopic sound corresponding to an instruction direction and instruction range.

The all-around moving image live reproducing player 2110 is a player which takes the place of the all-around moving image live reproducing player 1010 shown in FIG. 10 or the all-around moving image live reproducing player 1810 shown in FIG. 18. Note that a functional component associated with processing unique to this embodiment is shown in the all-around moving image live reproducing player 2110 of FIG. 21B, and the functional components of the all-around moving image live reproducing player 1010 of FIG. 10 or the all-around moving image live reproducing player 1810 of FIG. 18 are not illustrated in order to avoid cumbersomeness.

The all-around moving image live reproducing player 2110 includes the moving image selector 2111. The moving image selector 2111 selects one of all-around live baseball moving images A, B, and C in accordance with a user selection instruction via the display unit, and distributes it to the communication terminal. All-around live baseball moving image A is a live moving image from behind the backstop, which is captured by the all-around camera 311 and distributed via the live moving image distribution server 330. All-around live baseball moving image B is a moving image from the centerfield screen, which is captured by the all-around camera 312 and distributed via the live moving image distribution server 330. All-around live baseball moving image C is a moving image from the dome ceiling, which is captured by the all-around camera 313 and distributed via the live moving image distribution server 330.

A live moving image 2144 is a moving image captured by the all-around camera 311. A live moving image 2145 is a moving image captured by the all-around camera 312. A live moving image 2146 is a moving image captured by the all-around camera 313. The user can select, from the three live moving images, an all-around moving image to view.

(Processing Data of Communication Terminal)

FIG. 22 is a table showing the structure of processing data 2200 of the communication terminal according to this embodiment. The processing data 2200 indicates data for selecting a plurality of all-around moving images used for a canoe race shown in FIG. 21A. Note that FIG. 22 shows no stereoscopic sound but a stereoscopic sound can be reproduced by processing it in the same manner as a live moving image.

The processing data 2200 stores an all-around moving image acquisition source 2201, and a selection flag 2202 indicating selection from the acquisition sources by the user. The processing data 2200 stores an all-around live moving image 2203 reproduced from the live moving image distribution message distributed from the live moving image distribution server 330, and a line-of-sight direction 2204 instructed by the user. The processing data 2200 stores live display data 2205 in the line-of-sight direction 2204 instructed by the user, and course map display data 2206 obtained by displaying the selected all-around camera position on a map. Note that if a zoom-in or zoom-out operation is performed, the processing data 2200 also stores data of a user instruction range.

<<Processing Procedure of All-Around Moving Image Live Reproducing Player>>

Figure 23:
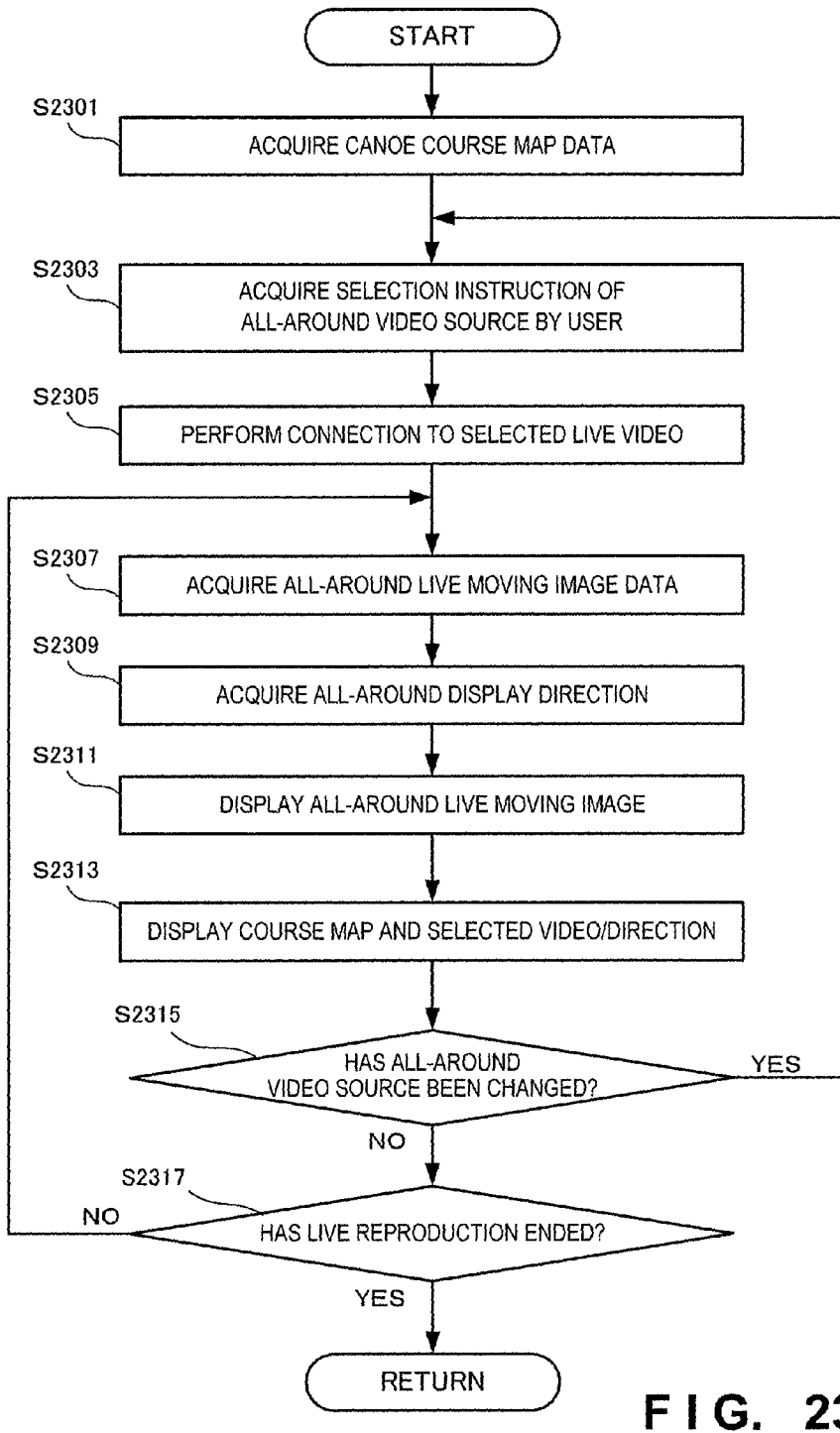
FIG. 23 is a flowchart illustrating the processing procedure of an all-around moving image live reproducing player according to the fourth embodiment of the present invention.

FIG. 23 is a flowchart illustrating the detailed procedure of the processing in step S1731 by the all-around moving image live reproducing player 2110 according to this embodiment. This flowchart is also executed by a CPU 1610 of FIG. 16 using a RAM 1640 but will be described below as the processing procedure of the all-around moving image live reproducing player 2110. Note that FIG. 23 is a flowchart in the canoe race shown in FIG. 21A.

In step S2301, the all-around moving image live reproducing player 2110 acquires map data of a canoe race course from a data distribution server 350.

In step S2303, the all-around moving image live reproducing player 2110 acquires a selection instruction of an all-around moving image distribution source by the user. In step S2305, the all-around moving image live reproducing player 2110 is connected to a live moving image from the distribution source instructed to be selected.

In step S2307, the all-around moving image live reproducing player 2110 acquires the all-around live moving image data of the selected distribution source from the live moving image distribution server 330, and maps it on a sphere. In step S2309, the all-around moving image live reproducing player 2110 acquires the display direction of the all-around moving image instructed by the user. In step S2311, the all-around moving image live reproducing player 2110 displays the live moving image in the display direction instructed by the user in the all-around image sequence mapped on the sphere. If a stereoscopic sound is synchronously output, a stereoscopic sound when facing in the display direction is output in synchronism with the live moving image. At the same time, in step S2313, the all-around moving image live reproducing player 2110 displays a canoe course map on which the selected all-around camera and line-of-sight instruction direction are displayed. Note that if a display range (zoom-in/zoom-out) is instructed, the all-around moving image live reproducing player 2110 acquires, in step S2309, the display range of the all-around moving image instructed by the user, and displays, in step S2311, the live moving image of the instruction range in the instructed display direction, thereby outputting a stereoscopic sound corresponding to the display direction and display range.

In step S2315, the all-around moving image live reproducing player 2110 determines whether a change instruction of the all-around moving image distribution source has been received from the user. If a change instruction of the all-around moving image distribution source has been received, the all-around moving image live reproducing player 2110 returns to step S2303 to display an all-around moving image from a new distribution source.

If no change instruction of the all-around moving image distribution source has been received, the all-around moving image live reproducing player 2110 determines in step S2317 whether live reproduction has ended (the player has stopped). If live reproduction has not ended, the all-around moving image live reproducing player 2110 returns to step S2307 to repeat live reproduction of the all-around moving image.

According to this embodiment, one of a plurality of all-around cameras is selected to display an image capturing position on a map, thereby making it possible to view an all-around moving image with realism from a position desired by the user.

[Fifth Embodiment]

An all-around moving image live distribution system according to the fifth embodiment of the present invention will be described next. The all-around moving image live distribution system according to this embodiment is different from those of the second to fourth embodiments in that desired information is added to live reproduction of an all-around moving image. This embodiment will describe an example in which a target is found in an all-around moving image currently reproduced live and a caption is added to it. Note that this embodiment is not limited to addition of a caption, and various techniques of additionally displaying other information to all-around moving image live reproduction are applicable. The remaining components and operations are the same as those in the second to fourth embodiments. Hence, the same reference numerals denote the same components and operations, and a detailed description thereof will be omitted.

<<All-Around Moving Image Live Distribution System>>

Figure 24:
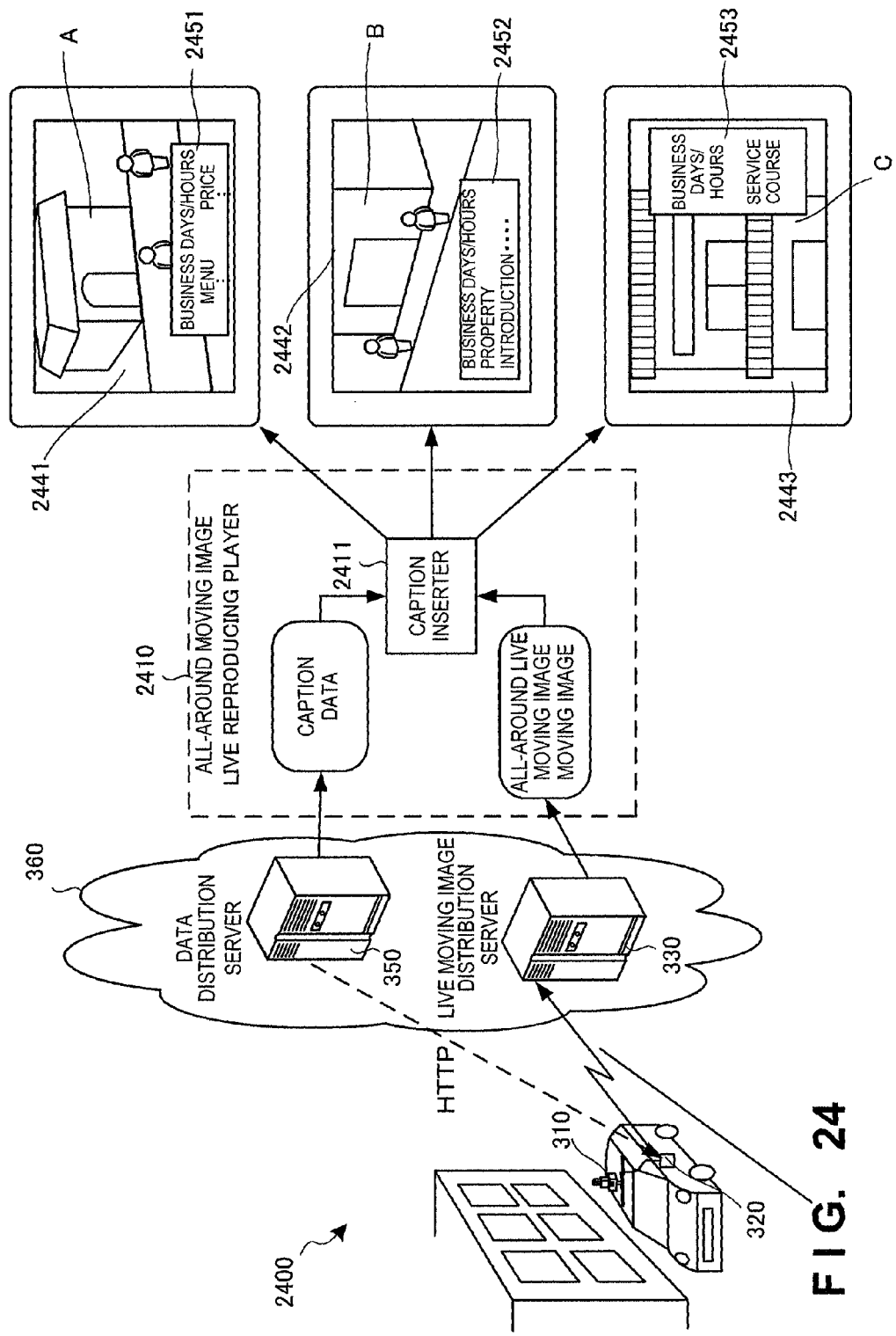
FIG. 24 is a view showing an outline of the processing of an all-around moving image live distribution system according to the fifth embodiment of the present invention.

FIG. 24 is a view showing an outline of the processing of an all-around moving image live distribution system 2400 according to this embodiment. Note that in FIG. 24, the same reference numerals as in FIG. 3A, 10, 18, 21A, or 21B denote the same components and a description thereof will be omitted. Each communication terminal selects all-around moving image live reproducing players 1010, 1810, 2101, and 2102, and the all-around moving image live distribution system 2400 in correspondence with an all-around moving image content selected or viewed by the user. Alternatively, the all-around moving image live reproducing player 1010, the all-around moving image live reproducing player 1810 having only the functions shown in FIG. 18, the all-around moving image live distribution system 2101 or 2102 having only the functions shown in FIG. 21A or 21B, and the all-around moving image live distribution system 2400 having only functions shown in FIG. 24 may be activated in combination, and made to cooperate with each other. For example, determination with a feature point may be performed not by all communication terminals but by an image capturing/distribution PC or a determination player, and data obtained by linking the presence/absence of a search target with a time stamp may be distributed from a data distribution server to each communication terminal.

Referring to FIG. 24, an all-around camera 310 and an image capturing/distribution PC 320 are deployed in a vehicle and move. FIG. 24 shows an example in which live image capturing is performed while moving through a town. Note that FIG. 24 illustrates no microphone but a live sound may be collected by a stereo microphone. In this case, an all-around moving image live reproducing player 2410 includes the same stereoscopic sound controller as that shown in FIG. 10, which controls output of a stereoscopic sound corresponding to an instruction direction and instruction range.

The all-around moving image live reproducing player 2410 is a player which takes the place of the all-around moving image live reproducing player of each of the above embodiments. Note that a functional component associated with processing unique to this embodiment is shown in the all-around moving image live reproducing player 2410 of FIG. 24, and the functional components of the all-around moving image live reproducing player of each of the above embodiments are not illustrated in order to avoid cumbersomeness.

The all-around moving image live reproducing player 2410 includes a caption inserter 2411. The caption inserter 2411 acquires, from a data distribution server 350, caption data to be added to all-around moving image live reproduction. The caption inserter 2411 overlays and displays the caption acquired from the data distribution server 350 at a predetermined position in an all-around live moving image of the town, which has been captured by the all-around camera 310 and distributed via a live moving image distribution server 330. Note that to add a caption at a desired position, the feature of a target to which the caption is added may be acquired from the data distribution server 350, and matched with the feature of an all-around moving image, thereby fining the target.

In a live moving image 2441, a caption 2451 for shop A is additionally displayed. In a live moving image 2442, a caption 2452 for shop B is additionally displayed. In a live moving image 2443, a caption 2453 for shop C is additionally displayed. Note that in FIG. 24, an explanation of a shop is additionally displayed. However, additional information is not limited to this. For example, additional information is not limited to display information and may be sound information.

(Processing Data of Communication Terminal)

FIG. 25 is a table showing the structure of processing data 2500 of the communication terminal according to this embodiment. The processing data 2500 is used to add additional data such as a caption to an all-around live moving image. Note that FIG. 25 shows no additional sound data but sound data can be added by performing processing in the same manner as a live moving image.

The processing data 2500 stores an all-around live moving image 2501 reproduced from a live moving image distribution message distributed from the live moving image distribution server 330, a line-of-sight direction 2502 instructed by the user, and live display data 2503 in the line-of-sight direction 2502 instructed by the user. Furthermore, the processing data 2500 stores features 2504, additional data 2505, and addition positions 2506 of one or a plurality of search targets for each all-around live moving image 2501. The processing data 2500 stores a matching flag 2507 of each feature and all-around live additional display data 2508 added with additional data. Note that if a zoom-in or zoom-out operation is performed, the processing data 2500 also stores data of a user instruction range.

<<Processing Procedure of All-Around Moving Image Live Reproducing Player>>

FIG. 26 is a flowchart illustrating the detailed procedure of the processing in step S1731 by the all-around moving image live reproducing player 2410 according to this embodiment. This flowchart is also executed by a CPU 1610 of FIG. 16 using a RAM 1640 but will be described below as the processing procedure of the all-around moving image live reproducing player 2410.

In step S2601, the all-around moving image live reproducing player 2410 acquires information of a search target from the data distribution server 350. The information may be the feature of the target.

In step S2603, the all-around moving image live reproducing player 2410 acquires the all-around live moving image data of a selected distribution source from the live moving image distribution server 330, and maps it on a sphere. In step S2605, the all-around moving image live reproducing player 2410 acquires the display direction of an all-around moving image instructed by the user.

In step S2607, the all-around moving image live reproducing player 2410 determines, by matching between features, whether there is the target in the direction instructed by the user. If it is determined that there is the target, the all-around moving image live reproducing player 2410 adds, in step S2609, related information (caption) to the target of the all-around live display data in the instruction direction. In step S2611, the all-around moving image live reproducing player 2410 displays the live moving image in the display direction instructed by the user in the all-around image sequence mapped on the sphere together with the added caption. If a stereoscopic sound is synchronously output, a stereoscopic sound when facing in the display direction is output in synchronism with the live moving image. If it is determined in step S2607 that there is no target, the all-around moving image live reproducing player 2410 advances to step S2611. Note that if an instruction of a display range (zoom-in/zoom-out) is issued, the all-around moving image live reproducing player 2410 acquires, in step S2605, the display range of the all-around moving image instructed by the user, and determines in step S2607 whether there is the target in the instructed display direction within the instruction range. If it is determined that there is the target, related information (caption) is added to the target of the all-around live display data of the instruction range in the instruction direction in step S2609, and the live moving image added with the caption is displayed in step S2611, thereby outputting a stereoscopic sound corresponding to the display direction and display range in synchronism with the displayed live moving image.

In step S2613, the all-around moving image live reproducing player 2410 determines whether the search target has been changed. If the search target has been changed, the all-around moving image live reproducing player 2410 returns to step S2601 to display an all-around moving image added with the new search target.

If the search target has not been changed, the all-around moving image live reproducing player 2410 determines in step S2615 whether live reproduction has ended (the player has stopped). If live reproduction has not ended, the all-around moving image live reproducing player 2410 returns to step S2603 to repeat live reproduction of the all-around moving image.

According to this embodiment, by adding information corresponding to a target to display of an all-around moving image captured by an all-around camera, it is possible to view an all-around moving image with realism including the information of the target from a position desired by the user.

[Sixth Embodiment]

An all-around moving image live distribution system according to the sixth embodiment of the present invention will be described next. The all-around moving image live distribution system according to this embodiment is different from those of the second to fifth embodiments in that a desired target is selected from live reproduction of an all-around moving image, and displayed. In this embodiment, a target player is selected from an all-around moving image of soccer, and reproduced live. Note that the features of a target (object) include a face, clothing, an accessory, and a pattern (including the uniform number of a player) for a person, and a shape, color, and pattern for an object. The present invention, however, is not limited to them. The remaining components and operations are the same as those in the second to fifth embodiments. Hence, the same reference numerals denote the same components and operations, and a detailed description thereof will be omitted.

<<All-Around Moving Image Live Distribution System>>

(Outline of Processing)

Figure 27A:
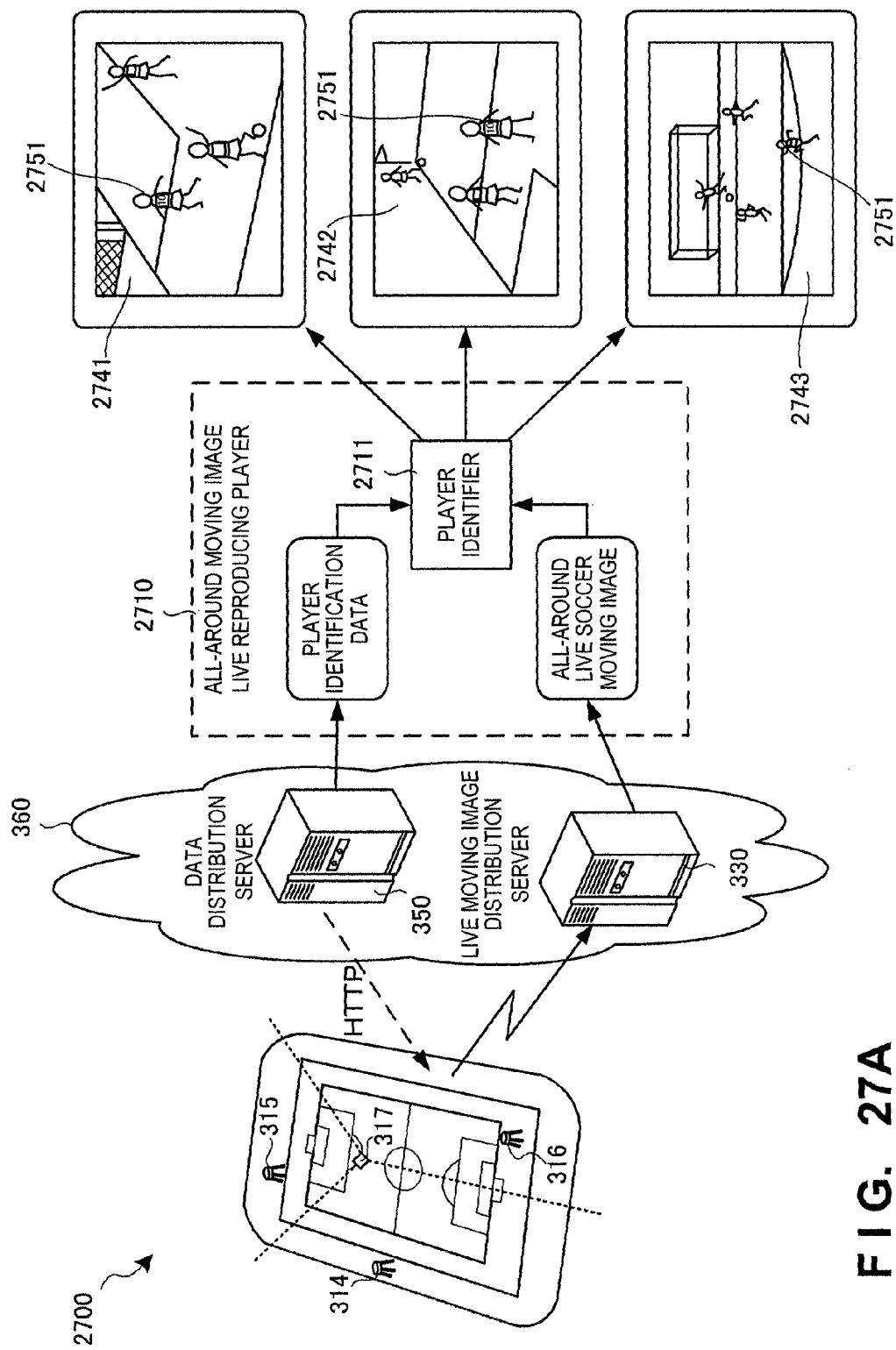
FIG. 27A is a view showing an outline of the processing of an all-around moving image live distribution system according to the sixth embodiment of the present invention.

FIG. 27A is a view showing an outline of the processing of an all-around moving image live distribution system 2700 according to this embodiment. Note that in FIG. 27A, the same reference numerals as in FIG. 3A, 10, 18, 21A, 21B, or 24 denote the same components and a description thereof will be omitted. Each communication terminal selects all-around moving image live reproducing players 1010, 1810, 2101 or 2102, and 2400, and the all-around moving image live distribution system 2700 in correspondence with an all-around moving image content selected or viewed by the user. Alternatively, the all-around moving image live reproducing player 1010, the all-around moving image live reproducing player 1810 having only the functions shown in FIG. 18, the all-around moving image live distribution system 2101 or 2102 having only the functions shown in FIG. 21A or 21B, the all-around moving image live distribution system 2400 having only the functions shown in FIG. 24, and the all-around moving image live distribution system 2700 having only functions shown in FIG. 27A may be activated in combination, and made to cooperate with each other. For example, determination with a feature point may be performed not by all communication terminals but by an image capturing/distribution PC or a determination player, and data obtained by linking data of all players with a time stamp may be distributed from a data distribution server to each viewing terminal.

Referring to FIG. 27A, a plurality of all-around cameras 314 to 317 are arranged at a plurality of points, and the user can select and view a plurality of all-around moving images. FIG. 27A shows an example in which live image capturing is performed for a game at a plurality of points in a soccer field. Note that FIG. 27A illustrates no image capturing/distribution PC. FIG. 27A illustrates no microphone but a live sound may be collected by a stereo microphone. In this case, an all-around moving image live reproducing player 2710 includes the same stereoscopic sound controller as that shown in FIG. 10, which controls output of a stereoscopic sound corresponding to an instruction direction and instruction range.

The all-around moving image live reproducing player 2710 is a player which takes the place of the all-around moving image live reproducing player of each of the above embodiments. Note that a functional component associated with processing unique to this embodiment is shown in the all-around moving image live reproducing player 2710 of FIG. 27A, and the functional components of the all-around moving image live reproducing player of each of the above embodiments are not illustrated in order to avoid cumbersomeness.

The all-around moving image live reproducing player 2710 includes a player identifier 2711. The player identifier 2711 finds a player by matching player selection data acquired from a data distribution server 350 with all-around moving images captured by the all-around cameras 314 to 317, and displays a predetermined direction of an all-around moving image including the player by desirably performing a zoom-in/out operation.

In this embodiment, the all-around cameras 314 to 317 are installed in the soccer field. The all-around camera 314 is arranged in the front stands. The all-around camera 315 is installed behind one of the goals. The all-around camera 316 is arranged behind the other goal. The all-around camera 317 captures the whole soccer field from the sky.

A live moving image 2741 is a moving image obtained by zooming in and capturing a target player 2751 from the all-around camera 314. A live moving image 2742 is a moving image obtained by zooming in and capturing the target player 2751 from the all-around camera 317. A live moving image 2743 is a moving image obtained by zooming out and capturing the target player 2751 from the all-around camera 316. The user can automatically select and track an all-around moving image of a player he/she wants to view. Note that if the same target player 2751 is captured by a plurality of all-around cameras among the all-around cameras 314 to 317, an all-around moving image to be displayed is selected under conditions such as the size of the tracking target and the reliability of feature determination as follows. For example, if the target player 2751 is tracked using his/her uniform number, an all-around image including the uniform number captured in the largest size is selected. If the target player 2751 is tracked using the features of his/her face, an all-around image including the face captured nearly from the front is selected. Alternatively, the user may designate a feature to be tracked or selection conditions, and then an all-around image for which the reliability of feature determination is high may be selected. The selection conditions may be individually applied, or a plurality of selection conditions may be applied in combination in consideration of weights and the like.

(Outline of Operation)

FIG. 27B is a view showing an outline of the operation of the all-around moving image live distribution system 2700 according to this embodiment. The left view of FIG. 27B shows screen transition of an operation of selecting a tracking player in the all-around moving image live reproducing player 2710. The right view of FIG. 27B shows an example in which all-around moving image live reproduction is performed not for the entire screen but for part of the screen. Note that the screen transition and partial display in FIG. 27B are the same in other embodiments.

<Screen Transition>

(1) A screen on which the live moving image 2741 of FIG. 27A is displayed is shown in the uppermost step in the left view of FIG. 27B.

(2) As shown in the second step in the left view, operation UIs 2761 and 2762 are displayed by a predetermined user operation of a mouse, touch panel, the buttons of a terminal, and the like. The operation UIs 2761 and 2762 include a tracking target selection menu display/non-display button 2762. The operation UI 2761 is used to select from all-around cameras and lines of sight and display the selected moving image.

(3) As shown in the third step in the left view, a tracking target selection menu 2763 is displayed by clicking the tracking target selection menu display/non-display button 2762 on the operation UI. The tracking target selection menu display/non-display button 2762 indicates a state in which the button has been pressed and the menu is being displayed. A special shortcut operation for transiting to this state may be prepared. A list of selectable targets (in this case, players, a head coach, a referee, and the like) is displayed on the tracking target selection menu 2763. If a tracking target has already been selected, a corresponding item is set in a selected state.

(4) A tracking target is selected by a user operation. The selected item is displayed to indicate that it is in the selected state by, for example, changing the color or displaying a special mark, as shown in the lowermost step in the left view. The image, uniform number, name, and the like of the selected tracking target may be simply displayed on the operation UI. An automatic tracking function is enabled and a result is reflected in a moving image being reproduced in a moving image area. This makes it possible to search for the target from a preferable angle while sequentially switching the tracking target as if the user switched the television channel.

(5) If the tracking target in the selected state is canceled by a user operation, the display of the target item is returned to the normal state and the display of the tracking target is removed from the operation UI, in contrast to (2) to (4). The automatic tracking function is disabled, and the result is reflected in the moving image being reproduced in the moving image area.

(6) If the tracking target selection menu display/non-display button 2762 on the operation UI is operated, the tracking target selection menu 2763 is removed. The tracking target selection menu display/non-display button 2762 is released to indicate a state in which no menu is displayed. If no user operation has been performed for a given time, the operation UIs 2761 and 2762 are removed.

<Partial Display>

The right view of FIG. 27B shows an example in which if a moving image is not displayed on the entire screen of the communication terminal, the tracking target selection menu 2763 is displayed outside the moving image area.

(Processing Data of Communication Terminal)

FIG. 28 is a table showing the structure of processing data 2800 of the communication terminal according to this embodiment. The processing data 2800 is used to track a target (object) desired by the user, select an all-around moving image and determine its display direction, and track and display the target (object) by zooming in/out the moving image, as needed. Note that FIG. 28 shows no stereoscopic sound data but a stereoscopic sound can be reproduced by performing processing in the same manner as a live moving image.

The processing data 2800 stores tracking target feature 2801, an all-around live moving image 2802 in which the target is found as a result of matching, and a direction 2803 in which the target is found. The processing data 2800 also stores all-around live display data 2804 in the direction 2803 in the all-around live moving image 2802, and zoom-in/out 2805.

<<Processing Procedure of All-Around Moving Image Live Reproducing Player>>

FIG. 29 is a flowchart illustrating the detailed procedure of the processing in step S1731 by the all-around moving image live reproducing player 2710 according to this embodiment. This flowchart is also executed by a CPU 1610 of FIG. 16 using a RAM 1640 but will be described below as the processing procedure of the all-around moving image live reproducing player 2710.

In step S2901, the all-around moving image live reproducing player 2710 acquires the information of the tracking target from the data distribution server 350. The information may be the feature of the target.

In step S2903, the all-around moving image live reproducing player 2710 acquires all-around live moving image data of a plurality of selection distribution sources from the live moving image distribution server 330 and maps them on a sphere.

In step S2905, the all-around moving image live reproducing player 2710 determines, by matching between features, whether there is the target in an all-around moving image. If it is determined that there is the target, the all-around moving image live reproducing player 2710 selects, in step S2907, the distribution source of the all-around live data including the tracking target. In step S2909, the all-around moving image live reproducing player 2710 selects the direction of the all-around live data including the tracking target. In step S2911, the all-around moving image live reproducing player 2710 displays the selected direction of the all-around live data including the tracking target. If a stereoscopic sound is synchronously output, a stereoscopic sound when facing in the display direction is output in synchronism with the live moving image. At this time, zoom-in/out processing is performed, as needed, and a stereoscopic sound corresponding to the zoom-in/out processing is output. If it is determined in step S2905 that there is no target, the all-around moving image live reproducing player 2710 continues, in step S2917, outputting the all-around live data while maintaining the all-around live moving image data being output until now and the current display direction. The all-around moving image live reproducing player 2710 advances to step S2913. Note that selection of the distribution source (or all-around camera) of the all-around live data in step S2907 and selection of the direction of the all-around live data in step S2909 are not separate processes, and are implemented at the same time by matching between the features. If it is determined that the all-around live data from the plurality of distribution sources include the same target, the distribution source of the all-around live data to be displayed is selected under conditions such as the size of the tracking target and the reliability of feature determination as follows. For example, if the tracking target is a player in a field, an all-around live data including the target player or his/her uniform number captured in the largest size is selected. If the tracking target is tracked using the features of his/her face, an all-around image including the face captured nearly from the front is selected. Alternatively, the user may designate features to be tracked or selection conditions, and then an all-around image for which the reliability of feature determination is high may be selected. The selection conditions may be individually applied, or a plurality of selection conditions may be applied in combination in consideration of weights and the like.

In step S2913, the all-around moving image live reproducing player 2710 determines whether the tracking target has been changed. If the tracking target has been changed, the all-around moving image live reproducing player 2710 returns to step S2901 to display an all-around moving image including the new tracking target.

If the tracking target has not been changed, the all-around moving image live reproducing player 2710 determines in step S2915 whether live reproduction has ended (the player has stopped). If live reproduction has not ended, the all-around moving image live reproducing player 2710 returns to step S2903 to repeat live reproduction of the all-around moving image.

According to this embodiment, by performing live reproduction of a moving image including the tracking target among all-around moving images captured by the all-around cameras, it is possible to view an all-around moving image with realism including the tracking target (object) desired by the user. Note that this embodiment has explained tracking and display of a player in live viewing of a soccer game. However, for example, the present invention is effectively applicable to a system of tracking and viewing a child of the user in a day care center or nursery school, a system of tracking and viewing elderly people in a nursing home, and the like.

[Seventh Embodiment]

An all-around moving image live distribution system according to the seventh embodiment of the present invention will be described next. The all-around moving image live distribution system according to this embodiment is different from those of the second to sixth embodiments in that an all-around moving image can be distributed live to a television to be viewed. The remaining components and operations are the same as those in the second to sixth embodiments. Hence, the same reference numerals denote the same components and operations, and a detailed description thereof will be omitted. Note that a description of zoom-in/out processing and stereoscopic sound reproduction processing will be omitted but the same processes as in the above embodiments are applicable.

<<All-Around Moving Image Live Distribution System>>

Figure 30:
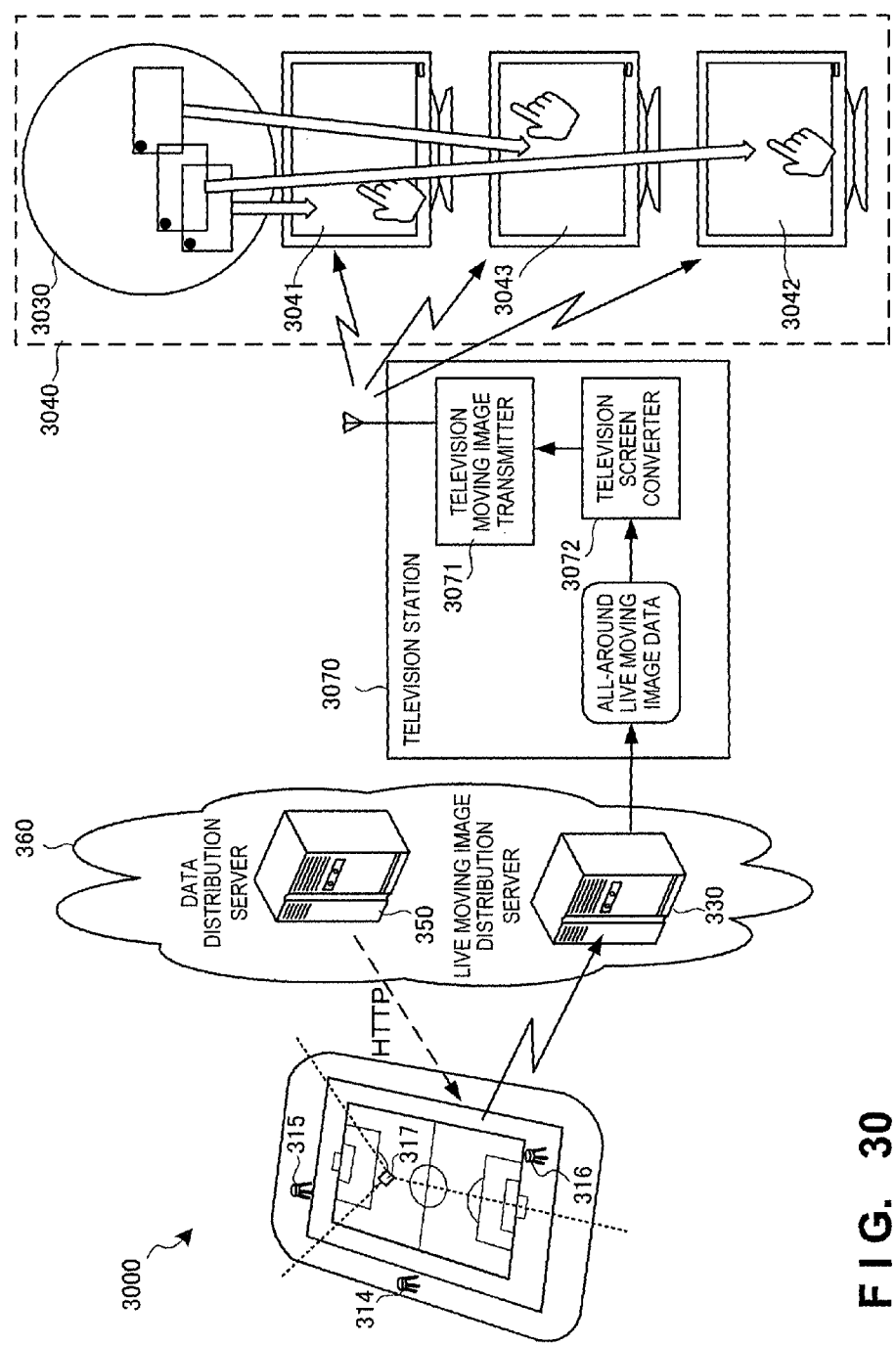
FIG. 30 is a view showing an outline of the processing of an all-around moving image live distribution system according to the seventh embodiment of the present invention.

FIG. 30 is a view showing an outline of the processing of an all-around moving image live distribution system 3000 according to this embodiment. Note that in FIG. 30, the same reference numerals as in FIG. 3A, 10, 18, 21A, 21B, 24, or 27A denote the same components and a description thereof will be omitted.

A live moving image distribution server 330 performs live distribution of an all-around moving image to a television station 3070. The television station 3070 broadcasts the all-around moving image live to a television set 3040. The television set 3040 receives the all-around moving image of this embodiment by a television broadcast signal.

The television station 3070 includes a television moving image transmitter 3071 and a television screen converter 3072. The television screen converter 3072 converts all-around live moving image data distributed from the live moving image distribution server 330 into television screen data which can undergo an all-around live broadcast. The television moving image transmitter 3071 transmits the converted television screen data which can undergo an all-around live broadcast.

The all-around moving image is thinned out, as needed, in consideration of a data amount, and transmitted to the television set 3040 by a television broadcast signal. The television set 3040 reconstructs the all-around moving image from the moving image data of the received television broadcast signal. The reconstructed all-around moving image is projected onto a sphere 3030. A moving image corresponding to a line-of-sight direction instruction of the user in the all-around moving image projected onto the sphere 3030 is selected, projected onto a television screen, and scanned and output.

Each of television moving image screens 3041 to 3043 indicates selection and display of the user instruction direction of the all-around moving image.

(Processing Data in Television Station)

FIG. 31 is a view showing conversion of processing data in the television station 3070 according to this embodiment.

If an all-around moving image captured by an all-around camera has, for example, 15 frames/sec, it is distributed from the live moving image distribution server 330 to the television station 3070 at 15 frames/sec. The all-around moving image captured by the all-around camera is divided in half, which is then broadcast at 30 frames/sec in the current digital broadcasting. The all-around moving image captured by the all-around camera is divided into four parts, which is then broadcast at 60 frames/sec in the current digital broadcasting. Note that if a broadcast bit rate and a corresponding resolution are enough to transfer all-around live moving image data, it is not necessary to divide the all-around moving image, and conversion into 30 frames/sec, 60 frames/sec, or another frame rate used in broadcasting may be performed by frame complementary processing (the same frame is repeated or an intermediate frame is combined). Note that the frame rate conversion processing can be performed by any one of an image capturing/distribution PC, live moving image distribution server, and television station but is considered to be most efficiently performed in a facility in the television station.

The television set 3040 reconstructs the all-around moving image, and also complements an intermediate frame. The television moving image screens 3041 to 3043 are respectively displayed by changing the line of sight in accordance with a user instruction from the reproduced all-around live image.

According to this embodiment, by performing live reproduction of the all-around moving image captured by the all-around camera in the television set by television broadcasting, the user can view the all-around moving image with realism on television.

[Eighth Embodiment]

An all-around moving image live distribution system according to the eighth embodiment of the present invention will be described next. The all-around moving image live distribution system according to this embodiment is different from those of the second to seventh embodiments in that live reproduction of an all-around moving image is viewed, especially three-dimensionally viewed using a head mounted display (to be referred to as an HMD hereinafter). The remaining components and operations are the same as those in the second to seventh embodiments. Hence, the same reference numerals denote the same components and operations, and a detailed description thereof will be omitted.

<<All-Around Moving Image Live Distribution System>>

Figure 32:
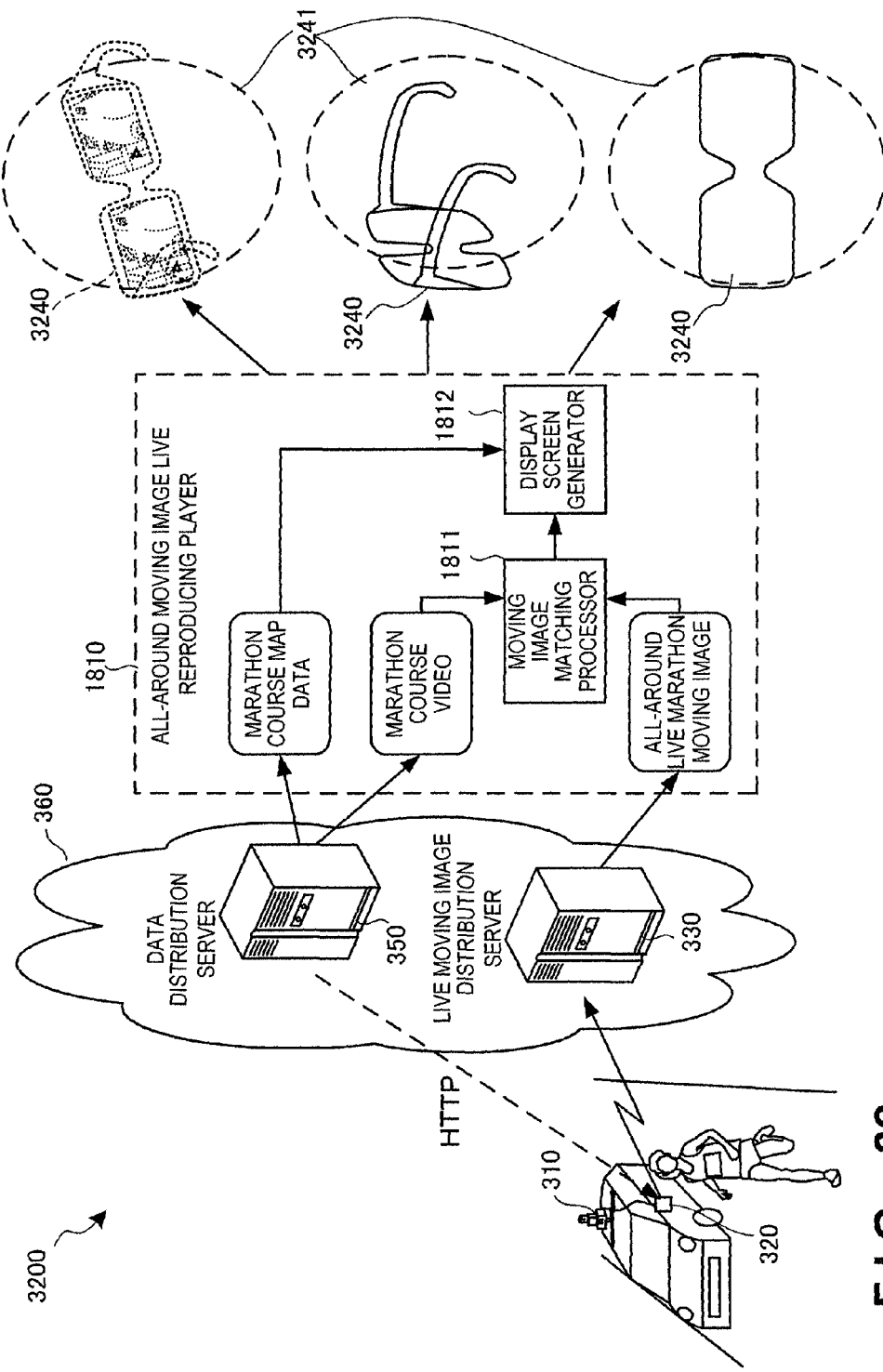
FIG. 32 is a view showing an outline of the processing of an all-around moving image live distribution system according to the eighth embodiment of the present invention.

FIG. 32 is a view showing an outline of the processing of an all-around moving image live distribution system 3200 according to this embodiment. Note that in FIG. 32, the same reference numerals as in FIG. 3A, 10, 18, 21A, 21B, 24, and 27A denote the same components and a description thereof will be omitted.

The all-around moving image live distribution system 3200 shows an example of an all-around moving image of a marathon race in FIG. 18. Referring to FIG. 32, a user 3241 views the all-around moving image using an HMD 3240. The line-of-sight direction is changed in accordance with a change in orientation of the head of the user 3241 detected by the acceleration sensor of the HMD 3240. Therefore, if the user 3241 rotates once, he/she can view the whole all-around moving image. Note that FIG. 32 illustrates no image capturing/distribution PC. Furthermore, FIG. 32 illustrates no microphone but a live sound may be collected by a stereo microphone. In this case, an all-around moving image live reproducing player 1810 includes the same stereoscopic sound controller as that shown in FIG. 10, which controls output of a stereoscopic sound corresponding to an instruction direction and instruction range.

According to this embodiment, by viewing, using an HMD including a sensor for detecting the rotation of the head, an all-around moving image captured by an all-around camera, the user can view, on television, the all-around moving image with realism, which matches his/her movement instead of an instruction by a finger.

[Other Embodiments]

Note that in the above-described embodiments, an all-around camera has been exemplified as a camera including five cameras for capturing 360° in the periphery and one camera for capturing the sky. However, the number of cameras is not limited to this, and is determined based on the precision (resolution) of a moving image and a processing speed for live reproduction. If the lens of the all-around camera is formed from one super wide angle lens or the like, all-around image combining processing becomes unnecessary. If the all-around camera includes one lens and an all-around moving image is acquired by capturing a conical mirror surface by a mirror surface capturing method, all-around image generation processing is different from that in this embodiment. The present invention is applicable regardless of the structure of an all-around camera, and this also falls within the scope of the invention.

In the above-described embodiments, an example in which spherical mapping is performed as mapping on a mapping solid in a player has been explained. The mapping solid is not limited to the sphere, and cylindrical mapping or polyhedral mapping may be adopted. In the case of polyhedral mapping, an image corresponding to each surface is extracted on the distribution side or the server side (or player side).

The above-described embodiments have explained an example in which matching for finding the image capturing position of the all-around camera or a target (object) from all-around moving images or matching for adding a caption or sound to an all-around moving image to be reproduced is implemented by the all-around moving image live reproducing player. However, an arrangement may be adopted in which an image capturing/distribution PC acquires a moving image or image or its feature from a data distribution server to execute selection of an all-around camera, tracking of a target (object), and addition of a caption or sound, and distributes the result to the communication terminal of the user via the live moving image distribution server or the data distribution server. In this case, as indicated by broken lines in FIGS. 3A, 18, 21A, 21B (the data distribution server is not illustrated), 24, 27A, 30, and 32, the image capturing/distribution PC acquires a moving image or image or its feature from the data distribution server.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

This application claims the benefit of Japanese Patent Applications No. 2014-102673 filed on May 16, 2014 and No. 2014-205993 filed on Oct. 6, 2014, which are hereby incorporated by reference herein in its entirety.

The invention claimed is:

1. An all-around moving image distribution system comprising:
   an all-around camera;
   an all-around image generator that acquires an all-around moving image captured by said all-around camera and generates time-series all-around frame image data;
   microphones that acquire a stereoscopic sound in synchronism with image capturing of said all-around camera;
   a stereoscopic sound data generator that generates time-series stereoscopic sound data from the stereoscopic sound, and uploads the time-series stereoscopic sound data;
   an all-around moving image data generator that encodes the time-series all-around frame image data, generates all-around moving image data, and uploads the all-around moving image data;
   a distribution server that distributes the all-around moving image data uploaded from said all-around moving image data generator and the stereoscopic sound data uploaded from said stereoscopic sound data generator; and
   an all-around moving image reproducer that reproduces the all-around moving image data distributed from said distribution server, displays a moving image of a range selected from a reproduced all-around moving image in accordance with an instruction of changing a line-of-sight by a user, and reproduces and outputs a stereoscopic sound corresponding to a display direction of the moving image from the stereoscopic sound data distributed from said distribution server,
   wherein said all-around moving image reproducer performs one of a zoom-in operation and a zoom-out operation of the moving image, and reproduces and outputs a stereoscopic sound corresponding to one of the zoom-in operation and the zoom-out operation of the moving image from the stereoscopic sound data.

2. The all-around moving image distribution system according to claim 1, wherein said all-around moving image reproducer includes an all-around moving image developer that decodes the all-around moving image data received from said distribution server, and develops, for each all-around frame image, the decoded all-around moving image data onto a three-dimensional mapping surface including a viewpoint inside, and selects and displays a moving image of a line-of-sight direction from the viewpoint, and
   the zoom-in operation of the moving image is performed by moving the viewpoint closer to the mapping surface, and the zoom-out operation of the moving image is performed by moving the viewpoint away from the mapping surface.

3. The all-around moving image distribution system according to claim 1, wherein
   said all-around camera comprises at least two all-around cameras fixed, and
   said all-around moving image reproducer includes a moving image selector that selects the all-around moving image data distributed from said distribution server in accordance with a selection instruction of the at least two all-around cameras from the user.

4. The all-around moving image distribution system according to claim 1, wherein
   said all-around camera comprises a moving all-around camera,
   said all-around moving image distribution system further comprises a position determiner that determines, based on matching between a feature of the all-around moving image and a feature of an image captured in advance from a known position, a position at which the all-around moving image is captured, and
   said all-around moving image reproducer displays the moving image of the range corresponding to the instruction of changing the line-of-sight by the user, and the position determined by said position determiner.

5. The all-around moving image distribution system according to claim 1, further comprising:
   an acquirer that acquires information including at least one of display information and sound information corresponding to a known target; and
   a determiner that determines, based on matching between a feature of all-around moving image data of the range according to the instruction of changing the line-of-sight by the user and a feature of image data of the known target, whether the all-around moving image data includes the known target,
   wherein if the all-around moving image data includes the known target, said all-around moving image reproducer combines the information in correspondence with the known target, and outputs the all-around moving image.

6. The all-around moving image distribution system according to claim 1, further comprising:
   a television station that generates television moving image data from the all-around moving image data distributed from said distribution server, and transmits the television moving image data,
   wherein said all-around moving image reproducer is included in a television set, scans and displays a moving image of a range selected from an all-around moving image based on the television moving image data transmitted from said television station in accordance with the instruction of changing the line-of-sight by the user, and reproduces and outputs a stereoscopic sound corresponding to a display direction of the moving image from the stereoscopic sound data transmitted from said television station.

7. An all-around moving image distribution method comprising:
   acquiring an all-around moving image captured by an all-around camera, and generating, time-series all-around frame image data, by an all-around image generator;
   generating time-series stereoscopic sound data from a stereoscopic sound acquired by microphones in synchronism with image capturing of the all-around camera, and uploading the time-series stereoscopic sound data, by a stereoscopic sound data generator;

generating all-around moving image data by encoding the time-series all-around frame image data, and uploading the all-around moving image data, by an all-around moving image data generator;

distributing the uploaded all-around moving image data and the uploaded stereoscopic sound data, by a distribution server; and reproducing the all-around moving image data distributed from the distribution server, displaying a moving image of a range selected from a reproduced all-around moving image in accordance with an instruction of changing a line-of-sight by a user, and reproducing and outputting a stereoscopic sound corresponding to a display direction of the moving image from the stereoscopic sound data distributed from the distribution server, by an all-around moving image reproducer, wherein, in said moving image displaying and stereoscopic sound outputting step, one of a zoom-in operation and a zoom-out operation of the moving image is performed, and a stereoscopic sound corresponding to one of the zoom-in operation and the zoom-out operation of the moving image is reproduced and output from the stereoscopic sound data.

8. A communication terminal apparatus comprising:

an all-around moving image data receiver that receives all-around moving image data from a distribution server distributing an all-around moving image;

a stereoscopic sound data receiver that receives, from the distribution server, stereoscopic sound data generated from a stereoscopic sound acquired in synchronism with the all-around moving image data;

an all-around moving image developer that decodes the received all-around moving image data, and develops, for each all-around frame image, the received all-around moving image data onto a three-dimensional mapping surface including a viewpoint inside; and an all-around moving image reproducer that selects moving image data in a display range selected from the developed all-around frame image in accordance with an instruction of changing a line-of-sight by a user, and displays the selected moving image in the display range, and reproduces and outputs, from the stereoscopic sound data, a stereoscopic sound corresponding to a direction in the all-around frame image of the display range, wherein said all-around moving image reproducer performs one of a zoom-in operation and a zoom-out operation of the moving image, and reproduces and outputs a stereoscopic sound corresponding to one of the zoom-in operation and the zoom-out operation of the moving image from the stereoscopic sound data.

9. The communication terminal apparatus according to claim 8, wherein said all-around moving image reproducer includes a head mounted display that implements three-dimensional viewing.

10. A control method of a communication terminal apparatus, comprising:

receiving all-around moving image data from a distribution server distributing an all-around moving image, by an all-around moving image data receiver of the communication terminal apparatus;

receiving, from the distribution server, stereoscopic sound data generated from a stereoscopic sound acquired in synchronism with the all-around moving image data, by a stereoscopic sound data receiver of the communication terminal apparatus;

decoding the received all-around moving image data, and developing, for each all-around frame image, the received all-around moving image data onto a three-dimensional mapping surface including a viewpoint inside, by an all-around moving image mapper of the communication terminal apparatus; and selecting moving image in a display range from the developed all-around frame image in accordance with an instruction of changing a line-of-sight by a user, and displaying the selected moving image in the display range, and reproducing and outputting, from the stereoscopic sound data, a stereoscopic sound corresponding to a direction in the all-around frame image of the display range by an all-around moving image reproducer of the communication terminal apparatus, wherein in said moving image displaying and stereoscopic sound outputting step, one of a zoom-in operation and a zoom-out operation of the moving image is performed, and a stereoscopic sound corresponding to one of the zoom-in operation and the zoom-out operation of the moving image is reproduced and output from the stereoscopic sound data.

11. A non-transitory computer-readable storage medium storing a control program of a communication terminal apparatus, for causing a computer of the communication terminal apparatus to execute a method, comprising:

receiving all-around moving image data from a distribution server that distributes an all-around moving image;

receiving, from the distribution server, stereoscopic sound data generated from a stereoscopic sound acquired in synchronism with the all-around moving image data;

decoding the received all-around moving image data, and developing, for each all-around frame image, the received all-around moving image data onto a three dimensional mapping surface including a viewpoint inside; and selecting moving image in a display range from the developed all-around frame image in accordance with an instruction of changing a line-of-sight by a user, and displaying the selected moving image in the display range, and reproducing and outputting, from the stereoscopic sound data, a stereoscopic sound corresponding to a direction in the all-around frame image of the display range, wherein in moving image displaying and stereoscopic sound outputting step, one of a zoom-in operation and a zoom-out operation of the moving image is performed, and a stereoscopic sound corresponding to one of the zoom-in operation and the zoom-out operation of the moving image is reproduced and output from the stereoscopic sound data.

* * * * *